United States Patent
Gury et al.

(10) Patent No.: US 11,402,857 B2
(45) Date of Patent: Aug. 2, 2022

(54) UNMANNED AERTIAL VEHICLE WITH ROTATABLE NET ASSEMBLY

(71) Applicant: PERFORMANCE DRONE WORKS LLC, Huntsville, AL (US)

(72) Inventors: Ryan Gury, Mount Vernon, NY (US); Florent Arnoux, Jersey City, NJ (US); Michael Dornisch, Lawrenceville, NJ (US); Max Tubman, Philadelphia, PA (US); Matthew Hernandez, Princeton, NJ (US)

(73) Assignee: Performance Drone Works LLC, Huntsville, AL (US)

( * ) Notice: Subject to any disclaimer, the term of this patent is extended or adjusted under 35 U.S.C. 154(b) by 254 days.

(21) Appl. No.: 16/777,607

(22) Filed: Jan. 30, 2020

(65) Prior Publication Data

US 2021/0240207 A1   Aug. 5, 2021

(51) Int. Cl.
| | |
|---|---|
| *G05D 1/12* | (2006.01) |
| *B64C 39/02* | (2006.01) |
| *B64D 47/08* | (2006.01) |
| *B64D 7/00* | (2006.01) |
| *G05D 1/10* | (2006.01) |

(52) U.S. Cl.
CPC ............. *G05D 1/12* (2013.01); *B64C 39/024* (2013.01); *B64D 7/00* (2013.01); *B64D 47/08* (2013.01); *G05D 1/101* (2013.01); *B64C 2201/027* (2013.01); *B64C 2201/042* (2013.01); *B64C 2201/108* (2013.01); *B64C 2201/127* (2013.01); *B64C 2201/182* (2013.01)

(58) Field of Classification Search
CPC ........ G05D 1/12; G05D 1/101; B64C 39/024; B64C 2201/027; B64C 2201/042; B64C 2201/108; B64C 2201/127; B64C 2201/182; B64D 7/00; B64D 47/08
See application file for complete search history.

(56) References Cited

U.S. PATENT DOCUMENTS

| | | |
|---|---|---|
| 7,273,195 B1 | 9/2007 | Golliher |
| 9,896,221 B1 * | 2/2018 | Kilian ..................... B64F 1/027 |
| (Continued) | | |

FOREIGN PATENT DOCUMENTS

| | | | |
|---|---|---|---|
| CN | 109747838 A | | 5/2019 |
| CN | 111955438 A | * | 11/2020 |
| (Continued) | | | |

OTHER PUBLICATIONS

Gury, et al., "Unmanned Aerial Vehicle With Net Assembly," U.S. Appl. No. 16/777,583, filed Jan. 30, 2020.

(Continued)

*Primary Examiner* — Peter D Nolan
*Assistant Examiner* — Kenneth M Dunne
(74) *Attorney, Agent, or Firm* — Vierra Magen Marcus LLP

(57) ABSTRACT

An example of a drone includes a drone chassis extending along a plane, a plurality of motors attached to the drone chassis and a plurality of propellers coupled to the plurality of motors. The drone includes net assembly mounted to the drone chassis. The net assembly includes a net enclosure rotatably mounted such that an outward facing opening of the enclosure is rotatable about an axis of rotation that is parallel to the drone chassis.

19 Claims, 32 Drawing Sheets

(56) References Cited

U.S. PATENT DOCUMENTS

| | | |
|---|---|---|
| 10,124,893 B1 | 11/2018 | Aalund et al. |
| 10,155,587 B1 | 12/2018 | Tang |
| 10,458,757 B1 | 10/2019 | Kearney-Fischer et al. |
| 11,054,224 B1 * | 7/2021 | Stephens .................. F41H 11/02 |
| 11,064,184 B2 * | 7/2021 | Choi .................. G06K 9/00671 |
| 2010/0181424 A1 | 7/2010 | Goossen et al. |
| 2010/0224723 A1 | 9/2010 | Apkarian |
| 2012/0187243 A1 | 7/2012 | Goldie et al. |
| 2015/0360797 A1 | 12/2015 | Melish et al. |
| 2016/0376029 A1 | 12/2016 | Sekiya |
| 2017/0144756 A1 * | 5/2017 | Rastgaar Aagaah .......................... G05D 1/0094 |
| 2017/0253348 A1 * | 9/2017 | Ashdown .................. H04K 3/65 |
| 2017/0355461 A1 * | 12/2017 | Naito ....................... G05D 1/12 |
| 2018/0105271 A1 * | 4/2018 | Wypyszynski ....... B64C 39/024 |
| 2018/0162530 A1 * | 6/2018 | Klein ..................... F41B 11/80 |
| 2018/0244401 A1 | 8/2018 | Kilian et al. |
| 2018/0257780 A1 * | 9/2018 | Sassinsky ............. B64F 1/0297 |
| 2018/0335779 A1 | 11/2018 | Fisher et al. |
| 2019/0078859 A1 | 3/2019 | Theiss et al. |
| 2019/0100315 A1 * | 4/2019 | Theiss .................. B64C 39/024 |
| 2019/0112045 A1 | 4/2019 | Zhang |
| 2020/0108922 A1 * | 4/2020 | Smith .................... B64D 47/04 |
| 2020/0108924 A1 * | 4/2020 | Smith .................... B64D 1/00 |
| 2020/0189712 A1 | 6/2020 | Briod et al. |
| 2020/0290737 A1 | 9/2020 | Ivans et al. |
| 2020/0331607 A1 | 10/2020 | Yamada et al. |
| 2020/0398986 A1 | 12/2020 | Toner et al. |

FOREIGN PATENT DOCUMENTS

| | | | |
|---|---|---|---|
| DE | 102015003323 A1 | 3/2022 | |
| GB | 2538827 A | 11/2016 | |
| JP | 2016215874 A * | 12/2016 | ......... F41H 13/0006 |
| UA | 94799 U * | 11/2014 | |
| WO | WO2016/170367 A1 | 10/2016 | |
| WO | WO2019/035014 A1 | 2/2019 | |

OTHER PUBLICATIONS

Gury, et al., "Unmanned Aerial Vehicle With Latched Net Assembly," U.S. Appl. No. 16/777,595, filed Jan. 30, 2020.

Gury, et al., "Unmanned Aerial Vehicle With Collapsible Net Assembly," U.S. Appl. No. 16/777,619, filed Jan. 30, 2020.

Non-final Office Action dated Jan. 4, 2022, U.S. Appl. No. 16/777,583, filed Jan. 30, 2020.

Non-final Office Action dated Jan. 5, 2022, U.S. Appl. No. 16/777,595, filed Jan. 30, 2020.

Response to Office Action dated Mar. 17, 2022, U.S. Appl. No. 16/777,583, filed Jan. 30, 2020.

Response to Office Action dated Mar. 24, 2022, U.S. Appl. No. 16/777,595, filed Jan. 30, 2020.

Notice of Allowance dated Apr. 4, 2022, U.S. Appl. No. 16/777,583, filed Jan. 30, 2020.

Notice of Allowance dated Apr. 25, 2022, U.S. Appl. No. 16/777,619, filed Jan. 30, 2020.

Notice of Allowance dated May 13, 2022, U.S. Appl. No. 16/777,595, filed Jan. 30, 2020.

* cited by examiner

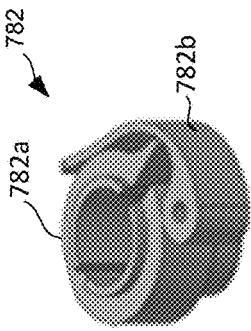
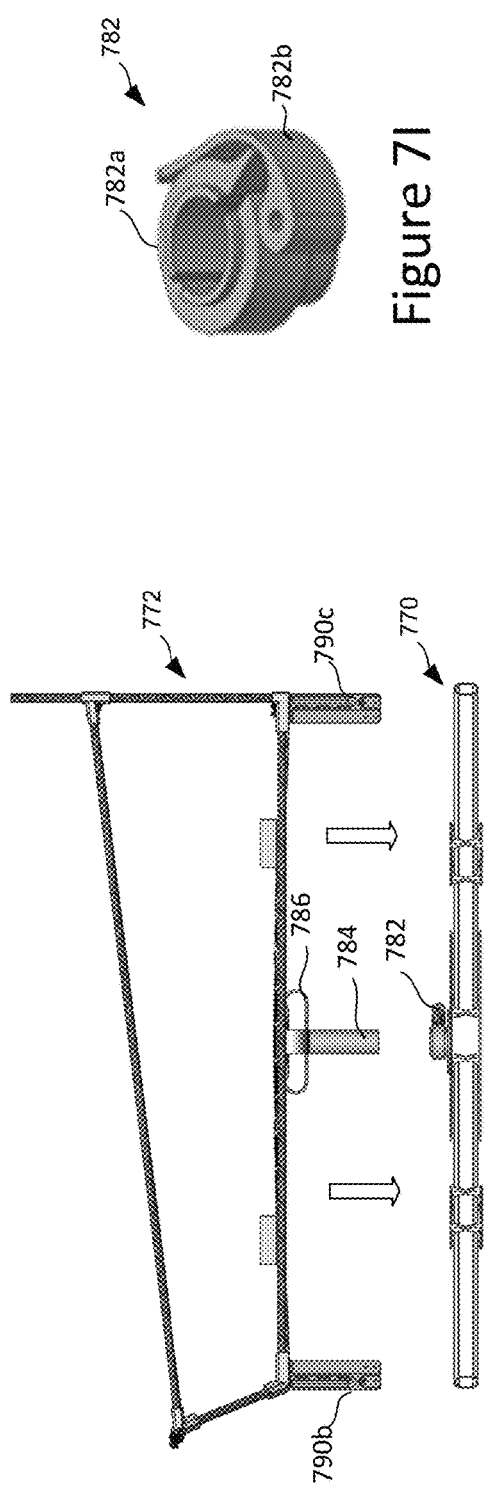
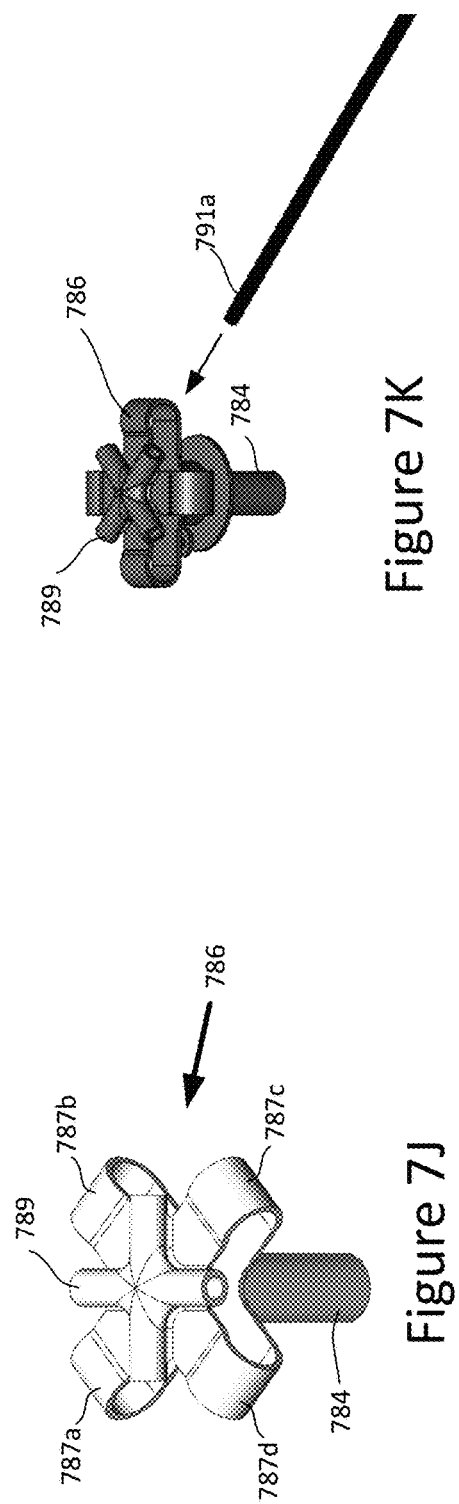

UNMANNED AERTIAL VEHICLE WITH ROTATABLE NET ASSEMBLY

CROSS-REFERENCE TO RELATED APPLICATIONS

This application is related to U.S. application Ser. No. 16/777,583, entitled "Unmanned Ariel Vehicle With Net Assembly," published as US 2021/0237897 on Aug. 5, 2021, U.S. application Ser. No. 16/777,595, entitled "Unmanned Ariel Vehicle With Latched Net Assembly," published as US 2021/0237898 on Aug. 5, 2021, and U.S. application Ser. No. 16/777,619, entitled "Unmanned Ariel Vehicle with Collapsible Net Assembly," published as US 2021/0239434 on Aug. 5, 2021, all filed on the same day as the present application and which are hereby incorporated by reference in their entirety.

BACKGROUND

Radio controlled unmanned aerial vehicles or UAVs (e.g. drones, such as quadcopters) can move at high speed and make rapid changes in direction when remotely piloted by a skilled user. A camera view from a drone may be relayed to a user to allow a First Person View (FPV) so that the user can see where the drone is going and steer it accordingly in the manner of a pilot sitting in the cockpit of an aircraft.

A drone may include a flight controller that provides output to motors and thus controls propeller speed to change thrust (e.g. in response to commands received from a user via a communication channel such as a Radio Frequency (RF) communication channel established between a user's remote-control and a drone). For example, a quadcopter has four motors, each coupled to a corresponding propeller above the motor, with propellers mounted to generate thrust substantially in parallel (e.g. their axes of rotation may be substantially parallel). The flight controller may change speeds of the motors to change the orientation and velocity of the drone and the propellers may remain in a fixed orientation with respect to the chassis of the quadcopter (i.e. without changing the angle of thrust with respect to the quadcopter) and may have fixed-pitch (i.e. propeller pitch may not be adjustable like a helicopter propeller so that each motor powers a corresponding fixed-pitch propeller in a fixed orientation with respect to a drone chassis).

SUMMARY OF THE DRAWINGS

FIGS. 7A-M illustrate aspects of examples of a C-UAV with a static top-mount configuration.

DETAILED DESCRIPTION

Figure 1:
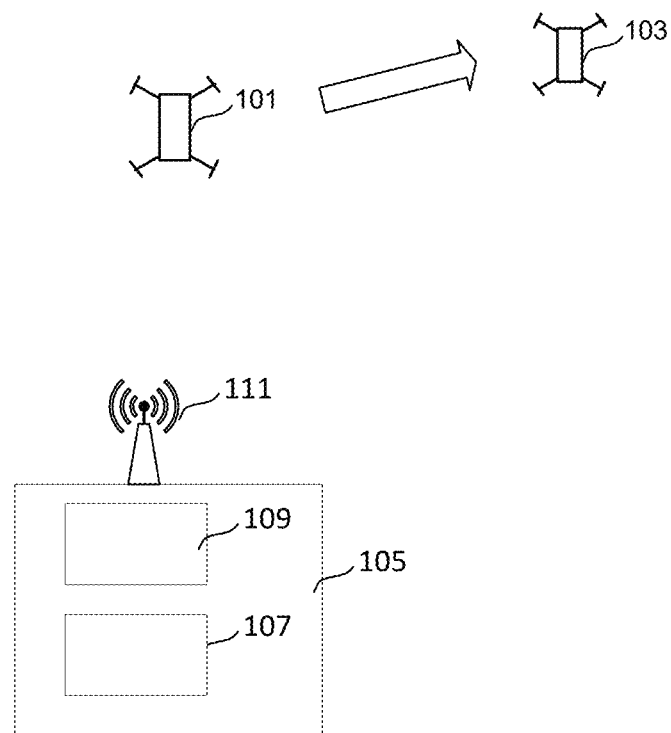
FIG. 1 is an example of a counter-UAV drone.

The following presents systems and methods associated with UAVs or drones. In an example, a counter-UAV drone (e.g. quadcopter) may be configured to intercept a target UAV in a safe manner (e.g. a substantially non-destructive manner that does not result in the target UAV being destroyed or falling to the ground).

In some situations, unidentified UAVs may be undesirable (e.g. for security reasons). In situations where large crowds gather that may be terrorist targets, political events that include high profile individuals that may be targets of assassination, no-fly areas near airports or locations where emergency service aircraft need access (e.g. post-disaster areas), and militarily sensitive areas, unidentified UAVs may be prohibited and some measures may be taken against any unidentified UAVs that are observed. It may be desirable to disable and/or destroy any such unidentified UAV. In some situations, a target UAV may be destroyed by gunfire, missile, or other highly destructive method. However, this may create a dangerous situation over inhabited areas or crowds. Furthermore, in some cases it may be desirable to use less destructive techniques so that a target UAV may be recovered with little or no damage (e.g. to be used to investigate the source of the UAV, determine what technology is used in the UAV, and/or perform reverse engineering to obtain the technology used). Therefore, destruction of unidentified UAVs is not always desirable and less destructive technologies may be preferable in some situations. While electronic measures (e.g. jamming a signal from a remote-control to a target UAV) may not be directly destructive, they may lead to a UAV crashing and thereby may cause damage to the target UAV and/or to people and/or property on the ground.

In some examples of the present technology, a drone may be configured as a counter-UAV (C-UAV) drone that can intercept a target UAV and capture it in a non-destructive manner or in a manner that causes low levels of damage that leave the target drone substantially intact and avoid or reduce any potential impact on people and/or property on the ground. While some damage may occur to a target UAV resulting in some debris from the UAV, the UAV and some or all debris may be captured to reduce or eliminate potential harm to people and/or property on the ground.

Aspects of the present technology may be implemented using a wide range of UAVs including, but not limited to drones (e.g. quadcopter drones). Such drones may be controlled by a user using a remote control and/or may be controlled with little or no human input (e.g. using an autopilot to fly a predetermined flightpath and/or using Artificial Intelligence (AI) or other technology for autonomous flight).

Although the following description is primarily given the context of drones (e.g. quadcopters) moving along a three-dimensional flightpath to intercept and capture another drone moving along a three-dimensional flightpath, certain concepts presented can be applied more generally. For example, the systems and techniques can be applied to non-drone aircraft and/or ground-based vehicles, watercraft and the like.

FIG. 1 shows an example of a counter-UAV drone 101 (C-UAV drone) intercepting a target UAV or target drone 103 (e.g. another drone that is unwanted in the location where it is found and is therefore targeted for interception). C-UAV drone 101 is controlled by remote control 105 in this example. Remote control 105 includes a user input interface 107 (e.g. one or more joysticks, buttons, touchpads, touchscreens, keyboards, or other input device(s) configured to receive a user's input). User input interface 107 allows a user to provide appropriate input to control C-UAV drone 101 (e.g. by using joysticks to control direction and speed of C-UAV drone). Remote control 105 also includes a user output interface 109 (e.g. one or more visual displays, lights, indicators, speakers, or other output devices configured to provide output to a user). For example, a display may show one or more views from camera(s) located on C-UAV drone 101 (e.g. a camera providing a pilot's view from C-UAV drone 101 to allow FPV operation of C-UAV drone 101). A C-UAV drone such as C-UAV drone 101 may be piloted (e.g. by remote control) to intercept a target drone (e.g. target drone 103) and capture it in a non-destructive or low-destructive manner. In some examples, a C-UAV drone may be configured for autonomous operation so that some or all piloting is performed autonomously (e.g. without input from a remote control such as remote control 105). For example, C-UAV drone 101 may include one or more cameras (e.g. cameras that are paired to form stereoscopic cameras) that may allow C-UAV drone 101 to locate and intercept target drone 103.

Figure 2:
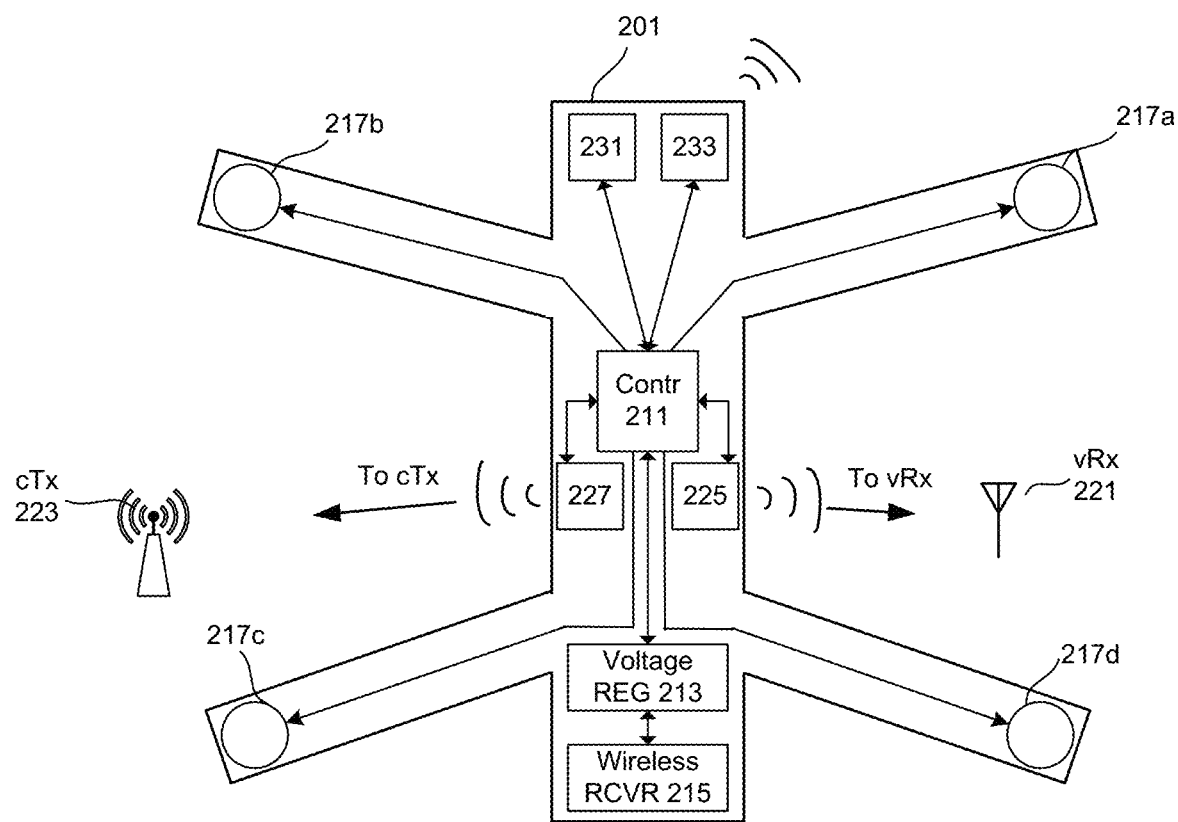
FIG. 2 is simplified representation of some of the components for one embodiment of a quadcopter.

FIG. 2 is simplified representation of some of the components for one example of a drone 201, which is a remote-controlled quadcopter in this example. Drone 201 may be configured for as a C-UAV such as C-UAV drone 101 according to some examples below. FIG. 2 shows flight controller 211 connected to motors 217a-d (which turn respective propellers, not shown in this view), the voltage source and regulator 213, wireless receiver 215, video camera 231 and altitude sensor 233, and the transmitters 225 and 227. In this embodiment, extending on an arm from each of the corners of the drone is a motor 217a-d, each of which is controlled by the flight controller 211 to thereby control thrust generated by propellers attached to motors 217a-d. A voltage source (e.g. battery) and regulator 213 supplies power. A pilot's commands are transmitted from control signal transceivers such as cTx 223, received by wireless receiver 215. Control signal transceiver cTx 223 may be in a remote-control operated by a pilot (remote-control user) to fly drone 201. The flight controller 211 uses power from the voltage source 213 to drive the motors 217a-d according to the pilot's signals.

The drone also includes video camera 231 and altitude sensor 233 that supply data to the flight controller 211. An FM or other type video transmitter 225 transmits data from the video camera 231 to a video monitor receiver vRx 221 (external to the drone, such as on the ground) that monitors the video signals and passes on the video data to the pilot. Data can also be sent back to the control signal transceiver cTx 223 by the transmitter 227. Although the transmitter 227 and wireless receiver 215 are shown as separate elements in FIG. 2, in many embodiments these will be part of a single transceiver module. And control signal transceiver cTx 223 and video monitor receiver vRx 221 may be part of a single transceiver module. For example, a remote-control, such as remote control 105, may include both a control signal transceiver and a video monitor receiver to allow a remote-control user to see video from video camera 231 while piloting drone 201.

Figure 3:
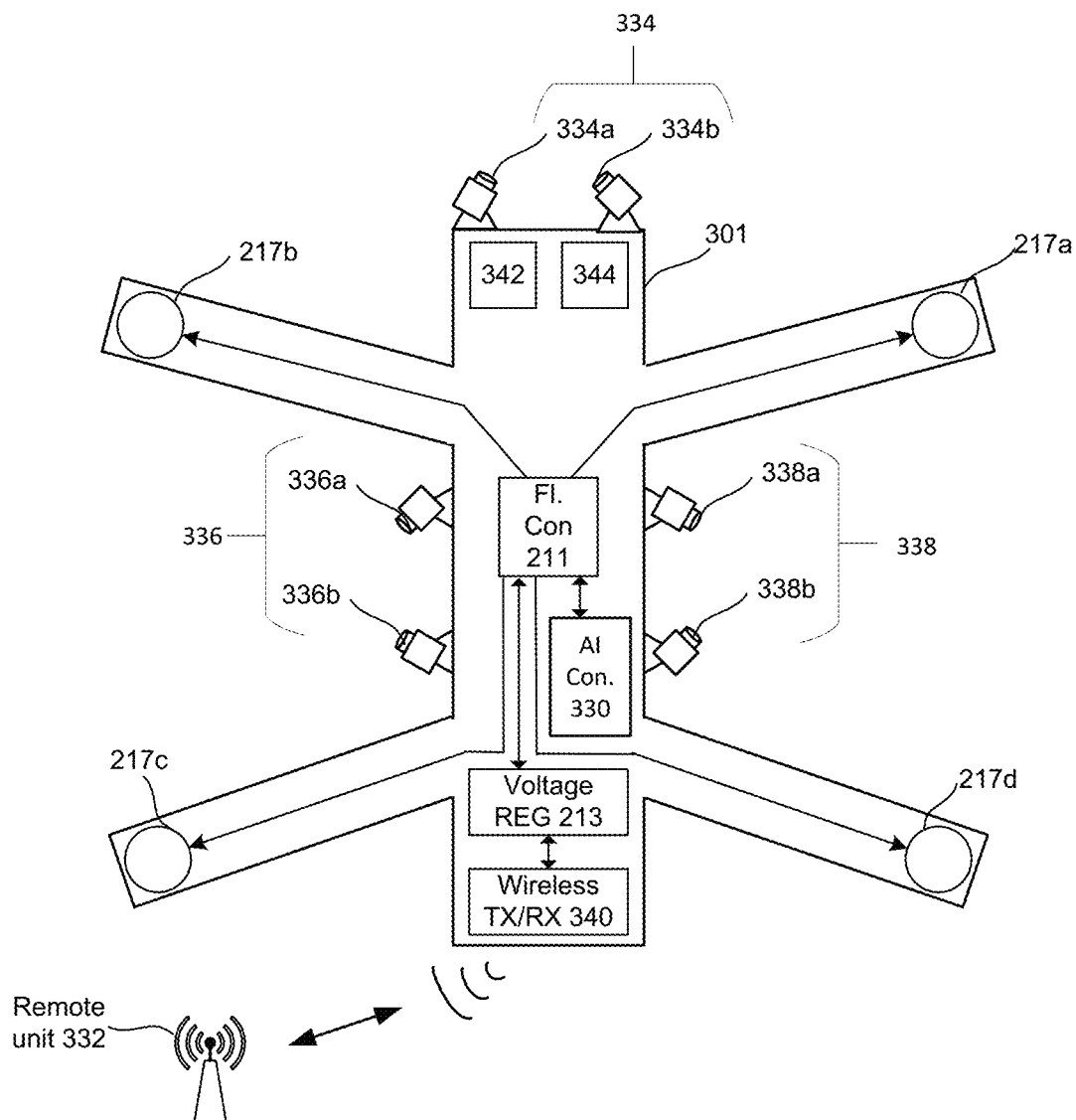
FIG. 3 shows an example of some components of an autonomous quadcopter.

FIG. 3 shows an example of an autonomous drone 301 (autonomous quadcopter in this example), which is different to drone 201 in that it is configured for autonomous operation, instead of, or in addition to receiving commands from a remote user. Autonomous drone 301 may be configured as a C-UAV for intercepting target UAVs. For example, autonomous drone 301 may be configured to determine a flightpath to intercept the flightpath of a target UAV, and to adjust its flightpath as the target UAV changes direction, speed and/or orientation (e.g. in evasive maneuvers) without commands from a remote user. Instead of receiving commands via RF communication from a remote-control, when in autonomous mode, autonomous drone 301 may operate according to commands generated by an Artificial Intelligence (AI) controller 330, which is coupled to the flight controller 211 (components of autonomous drone 301 that are common to drone 201 are similarly labeled). In this arrangement, AI controller 330 selects a flightpath and generates commands according to the same command set used by a remote-control. Thus, remote unit 332 may send commands to flight controller 211 according to a predetermined command set when autonomous drone 301 is in a remote-control mode. AI controller 330 may send commands to flight controller 211 according to the same predetermined command set when autonomous drone 301 is in an autonomous mode. In this way, flight controller 211 may operate similarly in both remote-control mode and autonomous modes and does not require reconfiguration (e.g. can change from remote-control to autonomous operation dynamically in-flight). This allows drones developed for remote-control to be easily adapted for autonomous operation, thus taking advantage of preexisting components and shortening development time for autonomous quadcopter development. In other examples, a flight controller and AI controller may be combined in a single physical unit that is customized for autonomous flight control.

In an example, AI controller 330 may be implemented in an AI module that may be considered as a bolt-on component that may be added to a fully functional drone (e.g. instead of, or in addition to a remote-control). For example, AI controller 330 may be implemented by a controller module, such as an NVIDIA Jetson AGX Xavier module, which includes a Central Processing Unit (CPU), Graphics Processing Unit (GPU), memory (e.g. volatile memory such as DRAM or SRAM), data storage (e.g. non-volatile data storage such as flash), and Vision accelerator. Other suitable controller hardware may also be used. The AI controller 330 may be connected to flight controller 211 and other quadcopter components through a physical connector to allow it to be connected/disconnected for configuration for AI control/remote-control. AI controller 330 may be physically attached to autonomous drone 301 by being clipped on, bolted on, or otherwise attached (e.g. to the chassis of drone 301) in a manner that makes physical removal easy.

While a human pilot may fly a drone based on video sent to the pilot from the drone, an AI pilot, such as embodied in AI controller 330 may pilot a drone based on different input including sensor input and/or input from multiple cameras (e.g. using Computer Vision (CV) to identify and locate features in its environment including target UAVs). While human pilots may rely on a single camera to provide a single view (first person view, or "FPV"), an AI pilot may use a plurality of cameras that cover different areas (e.g. a wider field of view, more than 180 degrees and as much as 360 degrees). In an example, cameras may be arranged in pairs, with a pair of cameras having overlapping fields of view. This allows such a pair of cameras to form a stereoscopic camera so that depth of field information may be extracted by a CV unit. FIG. 3 illustrates an example of camera 334a and camera 334b, which are arranged with overlapping fields of view to form a stereoscopic camera 334. Similarly, cameras 336a and 336b form stereoscopic camera 336 and cameras 338a and 338b form stereoscopic camera 338. It will be understood that the orientations (different angles corresponding to different views) and locations of cameras shown in FIG. 3 are illustrative and that the number, location, arrangement, and pairing of such cameras may be varied according to requirements (e.g. more than three stereoscopic cameras may be used). In the example of FIG. 3, video outputs of all cameras, 334a, 334b, 336a, 336b, 338a, and 338b (and any other cameras) are sent to AI controller 330. While one or more video output may be transmitted to an external location (e.g. transmitted by transmitter/receiver 340 to remote unit 332), in some cases no such transmission is performed when autonomous drone 301 is in autonomous mode. In some cases, an autonomous drone such as autonomous drone 301 is configurable to receive commands from a remote-control such as remote unit 332 (e.g. may be remote-controlled at certain times, e.g. according to selection by a remote user) through a communication circuit. These commands may use the same command set so that commands from AI controller 330 and remote unit 332 are interchangeable. Transmitter/receiver 340 may be considered an example of a Radio Frequency (RF) communication circuit coupled to the flight controller 211, the RF communication circuit (e.g. RF receiver) is configured to receive external commands from a remote-control (e.g. remote unit 332) and provide the external commands to the flight controller 211 to direct the flight controller to follow a remotely-selected flightpath, the external commands and the commands provided by the AI controller 330 from a common command set.

AI controller 330 includes computer vision (CV) capability to interpret input from cameras 334a, 334b, 336a, 336b, 338a, and 338b to gain information about the environment around drone 301 (e.g. object identification and location that may be applied to target UAVs and/or other objects). Stereoscopic cameras 334, 336, 338 are configured to obtain different stereoscopic views to allow depth of field analysis so that the proximity of objects (including target UAVs) may be accurately determined. AI controller 330 may use CV capability to generate a three-dimensional (3-D) picture of the surrounding of autonomous drone 301, or a portion of the surroundings (e.g. generally ahead of autonomous drone 301 along its direction of travel). In some cases, multiple cameras may be used to collectively provide a full 360-degree field of view. In other cases, cameras may cover less than 360 degrees but may still collectively cover a larger field of view than a human pilot could effectively monitor. Video output from cameras 334a, 334b, 336a, 336b, 338a, and 338b may be directly provided to AI controller 330 without conversion to RF and transmission as used by remote-controlled drones (e.g. remote-controlled quadcopters). This may allow rapid reaction as drone 301 moves and video output reflects changing surroundings (e.g. reduced latency may allow faster response than with remote-control).

AI controller 330 is coupled to the plurality of cameras 334a, 334b, 336a, 336b, 338a, and 338b to receive input from the plurality of cameras, determine a flightpath for the autonomous quadcopter (e.g. drone 301) according to the input from the plurality of cameras, and provide commands to the flight controller 211 to direct the flight controller 211 to follow the flightpath. Thus, the role of flight controller 211 is to execute commands from AI controller 330 (as it would from a remote-control user), while AI controller makes piloting decisions based on video input (and, in some cases, other input, e.g. from sensors). AI controller 330 may be considered an example of an Artificial Intelligence (AI) controller coupled to a plurality of cameras (e.g. cameras 334, 336, 338) to receive input from the plurality of cameras, determine a flightpath for the autonomous drone 301 according to the input from the plurality of cameras, and provide commands to the flight controller 211 to direct the flight controller to follow the flightpath. Flight controller 211 is coupled to the four motors 217a-d to provide input to the four motors to control flight of the autonomous drone 301.

In addition to cameras 334a, 334b, 336a, 336b, 338a, and 338b, autonomous drone 301 includes Inertial Measurement Unit (IMU) sensors 342 and rangefinder 344. IMU sensors 342 may measure one or more of specific force, angular rate, and magnetic field using a combination of accelerometers (acceleration sensors), gyroscopes (gyroscopic sensors), and magnetometers to generate motion data (e.g. autonomous quadcopter motion data). For example, IMU sensors 342 may be used as a gyroscope and accelerometer to obtain orientation and acceleration measurements. Rangefinder 344 (which may be considered a distance or range sensor) measures the distance from autonomous drone 301 to an external feature (e.g. the ground, obstacle or gate along a racecourse, target UAV, etc.). Rangefinder 344 may use a laser to determine distance (e.g. pulsed laser, or Light Detection and Ranging "LiDAR"). Outputs from sensors 342 and 344 are provided to AI controller 330 in this example. Outputs from such sensors may also be provided to a flight controller (e.g. flight controller 211) in some cases. In addition to the sensors illustrated, an autonomous drone may include other sensors such as a barometer, or altimeter, to determine height of a drone above ground, and/or LIDAR sensors using lasers to generate 3-D representations of surroundings. In some cases, a Global Positioning System (GPS) module may be provided to provide position information based on communication with GPS satellites.

AI controller 330 may be in the form of a removable module that is added to a drone to provide capacity for autonomous operation. Within AI controller 330, certain modules may be provided with different functions. In an example, different AI technologies may be compared side-by-side by loading AI controllers with different AI code and flying drones using the different AI code (e.g. in a race) to compare AI technologies. In such an example, certain basic functions of AI controller 330 may be provided by standard modules that are common to multiple AI controllers while other functions may be customized by a particular module, or modules, that are then compared by flying drones with identical drone hardware, AI controller hardware, and some identical modules within AI controllers provide a comparison of AI technologies without effects of different hardware and/or software differences unrelated to AI piloting. Examples of autonomous drones, including autonomous quadcopters are described in U.S. patent application Ser. No. 16/360,999, filed on Mar. 21, 2019, which is hereby incorporated by reference in its entirety.

Figure 4A:
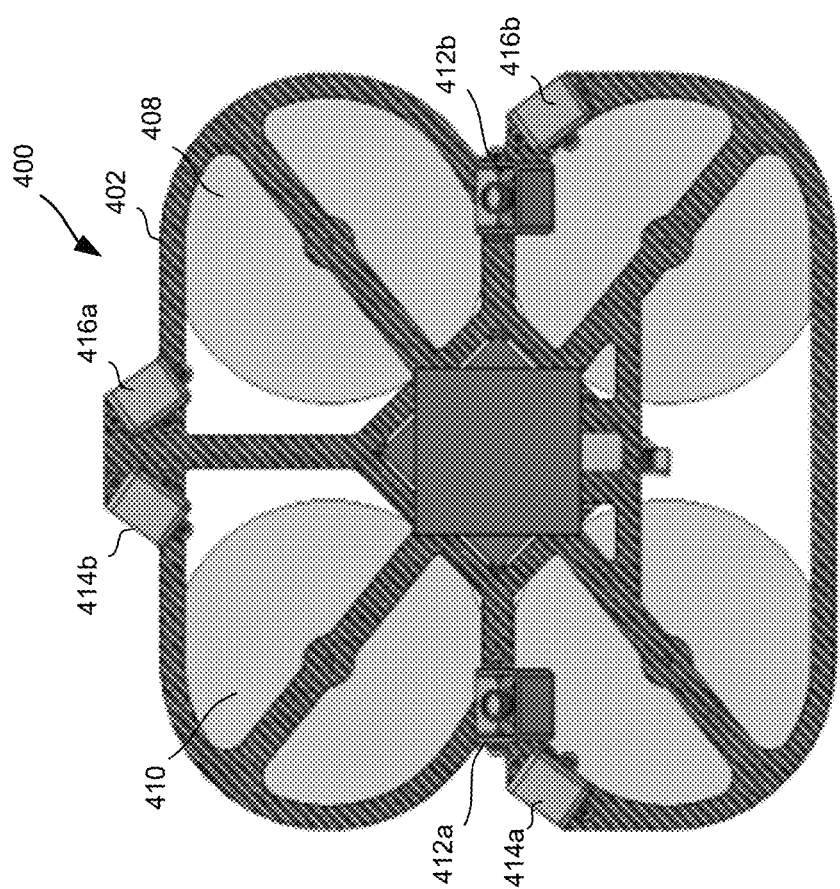
FIG. 4A-B show another example of a quadcopter.

FIG. 4A shows a bottom-up view of an example of a drone 400, which may be configured as a C-UAV that may be controlled by remote control and/or may operate autonomously using CV and/or other systems. Drone 400 includes cameras 412a, 412b, 414a, 414b, 416a, 416b mounted to the underside of frame or chassis 402 (the term "chassis" is used to avoid confusion with a frame used in a net assembly). In this example propellers 410 and 408 are protected by respective propeller guards (portions of chassis 402 that extend to protect propellers) so that chassis 402 extends laterally beyond the propellers (unlike the examples of FIGS. 2 and 3, which showed propellers extending beyond chassis). The extent of 402 (beyond propellers) may facilitate configuration as a C-UAV drone in some examples. In other examples, a C-UAV drone may have a smaller chassis (e.g. as shown in FIGS. 2 and 3).

Figure 4B:
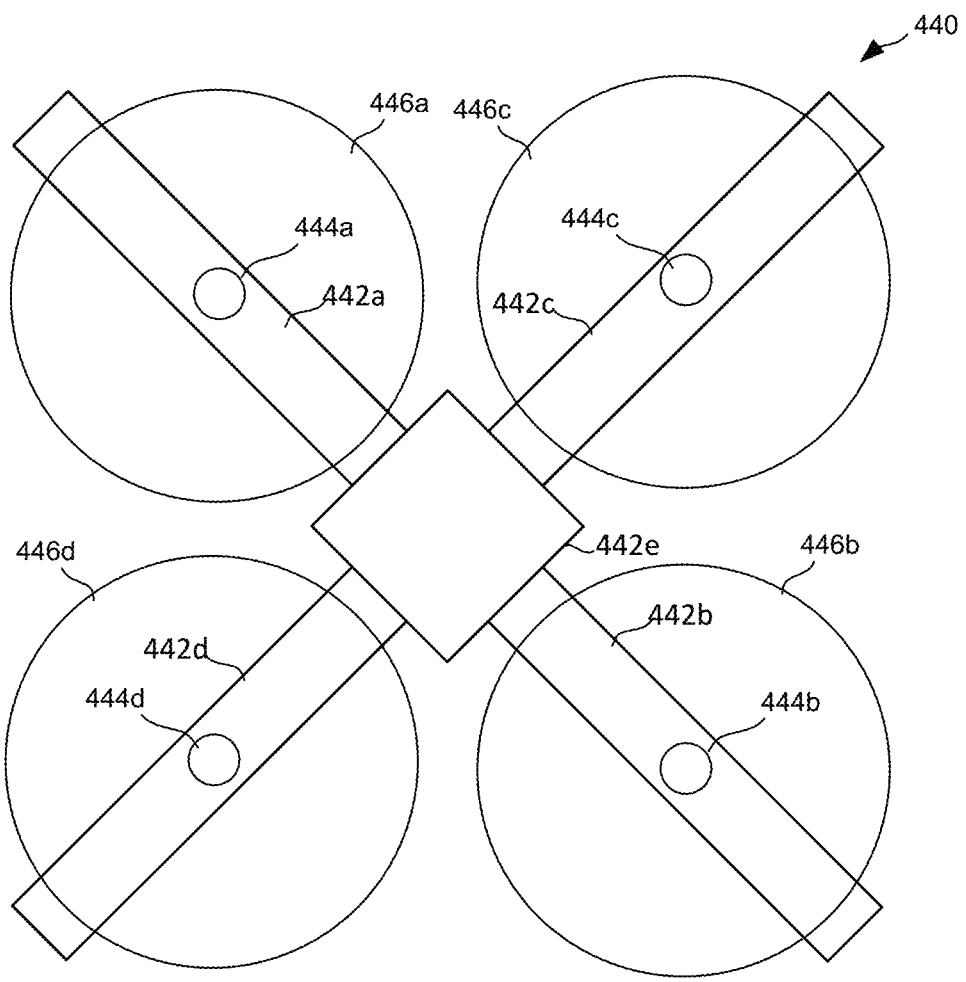

FIG. 4B shows another example of a quadcopter drone 440 that does not include propeller guards so that chassis 442 includes four separate arms 442a-d that extend from a central portion 442e. Each arm 442a-d has a corresponding motor 444a-d mounted to it to turn a corresponding propeller 446a-d. Arms 442a-d extend beyond propellers 446a-d, which may facilitate implementation of some aspects of the present technology.

According to examples of the present technology, a drone such as a quadcopter may be equipped with one or more net to configure it as a C-UAV, with the net(s) configured to capture a target UAV while both the C-UAV and target UAV are flying. A C-UAV may be guided to intercept a target UAV by a user via remote control (e.g. as illustrated in FIG. 1) and/or autonomously (e.g. using an AI controller and cameras).

When a C-UAV equipped with one or more net intercepts a target UAV, the net(s) may engage the target UAV thereby preventing the target UAV from flying away and thereby capturing the target UAV. For example, one or more propellers of a target UAV may become entangled in portions of one or more nets of the C-UAV. In an example, one or more nets may be configured for entanglement (e.g. by appropriate selection of dimensions and material of strands, mesh spacing between strands, mesh configuration and tension). In an example, one or more nets may form a cage-like structure that may extend about a target UAV to form an enclosure to contain a target UAV and/or contain debris from a target UAV (e.g. debris that may result from impact between portions of a net or C-UAV and/or from entanglement of spinning propellers with a net). In an example, a combination of net(s) configured for entanglement and net(s) configured to form an enclosure may be used together.

Figure 5A:
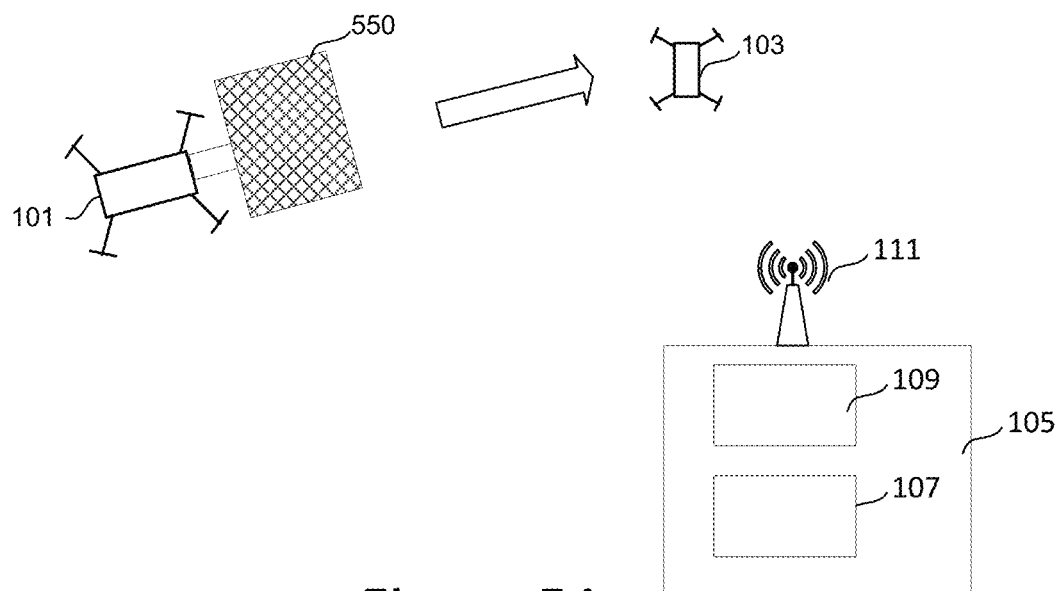
FIGS. 5A-B illustrate interception of a target drone by a C-UAV.

FIG. 5A illustrates an example of C-UAV drone 101 having a net assembly 550 attached. C-UAV drone 101 is flown to intercept target drone 103. A C-UAV drone may be flown by a user via remote control 105 using one or more cameras on C-UAV drone 101 and/or net assembly 550 (e.g. displayed on a screen of user output interface 109) to provide FPV and/or other visual information to a user. The orientation of net assembly 550 when approaching target drone 103 may be controlled (e.g. using user input interface 107) to ensure entanglement and/or enclosure of target drone 103 in net assembly 550 and to avoid collision between C-UAV drone 101 and target drone 103. Alternatively, C-UAV drone 101 may operate autonomously to intercept target drone 103 (e.g. using CV technology to "see" and intercept target drone 103).

Figure 5B:
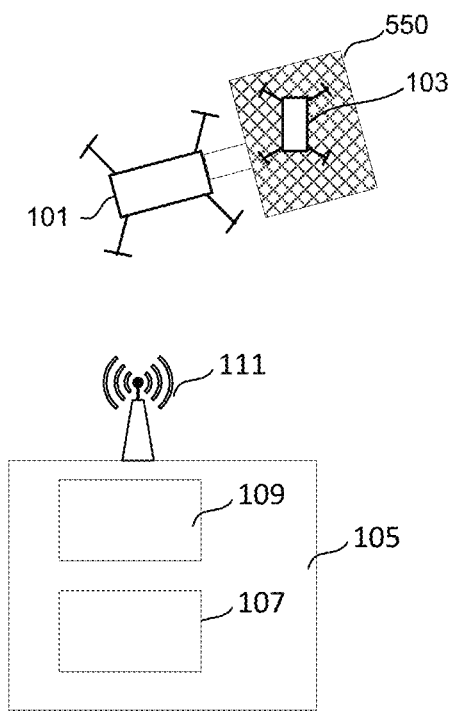

FIG. 5B shows C-UAV drone 101, net assembly 550 and target drone 103 after interception of target drone 103. Target drone 103 is entangled and/or enclosed by elements of net assembly 550 so that it is no longer free to continue independently along its own flightpath and is a captive of C-UAV drone 101 (e.g. propellers of target drone 103 may be entangled so that they cannot turn and thus cannot generate thrust). In general, capturing a target drone in this manner changes flying characteristics of C-UAV drone 101, which may be configured to rapidly adapt to such a change and continue flying while supporting the additional weight of a target drone and adapting to the different center of mass and different aerodynamic characteristics of the combined drones and net assembly. Configuration may include mechanical components to facilitate interception and subsequent flight and electronic components (e.g. one or more control circuits) that are configured to facilitate flight prior to, during, and after interception in a manner that allows rapid adaptation to the capture of a target drone so that stable flight is maintained throughout.

Attachment of a net assembly such as net assembly 550 to a C-UAV drone such as C-UAV drone 101 may have various configurations and operation of a net-equipped C-UAV may be adapted accordingly. In some examples, a net assembly may be passive, with no moving parts. In some examples, a net assembly may include dynamic components (e.g. electrical, mechanical, pneumatic, or other actuators) that facilitate entanglement and/or enclosure of a target drone.

A net assembly may include a frame to maintain netting in a desired configuration during flight and during interception of a target drone. A frame may be made of a lightweight material that is sufficiently strong (e.g. injection molded plastic, metal, carbon fiber, or other strong lightweight material). A variety of different net assemblies using different frames are described in the present disclosure. It will be understood that aspects of the present technology are applicable to a range of different net assemblies, using a range of different frames, nets and other components, and that the present disclosure is not limited to any particular configuration or configurations of frame(s) and net(s).

A net assembly (e.g. net assembly 550) may be physically coupled to a C-UAV drone (e.g. C-UAV drone 101) using a quick-release mechanism. This may facilitate rapidly attaching and removing net assemblies from a C-UAV. For example, where multiple net assemblies are adapted for different situations (e.g. for intercepting different types of target drones or operating in different weather or other conditions), a quick-release mechanism may allow rapid configuration of a C-UAV so that it is rapidly launched with a desired configuration for a given situation. A quick-release mechanism may also facilitate rapid removal of a net assembly that has been used for interception. For example, a net assembly that contains a target drone may be rapidly removed from a C-UAV, which may allow the C-UAV to be returned to service (e.g. with new net assembly) and may allow a target drone to be removed to another location where it can be safely examined and/or destroyed. A quick-release mechanism may be manually actuated (e.g. a hand-operated clamping mechanism) or may be at least partially automated or remote-controlled. For example, actuated using an electro-mechanical quick-release, which may release a net assembly from a C-UAV in response to a command from a user (via remote control) or a command from software based on some condition being met (e.g. the C-UAV and net assembly being away from people and/or property where dropping a net assembly has little or no risk of injuring people and/or property).

Attachment of a net assembly (e.g. net assembly 550) and C-UAV drone (e.g. C-UAV drone 101) may include one or more components configured to manage the effects on the C-UAV of an impact with a target drone and subsequent flying with the target drone in a net assembly. For example, some dampening and/or shock absorbing components may be included in a C-UAV and/or net assembly so that when a target drone impacts the net assembly, the shock of impact is not transmitted to the C-UAV in a way that might cause damage (is dampened to reduce effects). Some physical shock may be absorbed by appropriate components (e.g. using springs, cushions, elastic, and/or pneumatic components or other structures to dampen impact and/or vibration) so that the risk of damage to the chassis or other parts of the C-UAV is reduced. After interception of a target drone, a dampener may help to reduce shock and/or vibration from a captured target drone and thereby facilitate flying the C-UAV.

One or more strain gauge may be coupled to a net assembly and/or C-UAV (e.g. net assembly 550 and/or C-UAV drone 101) to measure strain of one or more components during and after interception. This may allow a C-UAV to detect when a target drone has been captured (e.g. entangled and/or enclosed) and determine certain information regarding the captured target drone (e.g. weight, location in a net assembly and drag as the C-UAV, net assembly and captured drone fly). This information may be used to modify flight so that it is adapted to the captured target drone. For example, information from one or more strain gauges may be provided to control circuits (e.g. flight controller 211 and/or AI controller 330) that adapt flight control according to the information received from strain gauges. Strain gauge information may also be sent to a remote control (e.g. remote control 105) so that a user may be provided with information about the captured target drone. Strain gauge information may be combined with other information (e.g. from one or more cameras and/or other sensors) for flight control.

In addition to strain gauges, other sensors may be provided as part of a net assembly and/or C-UAV (e.g. net assembly 550 and/or C-UAV drone 101). For example, optical sensors may be used to rapidly determine when a target drone is intercepted or is about to be intercepted. For example, one or more light source (e.g. Light Emitting Diode or LED) may emit light that is received by one or more light detector (e.g. optical sensors such as photodiodes) as long as the path between light source and detector is uninterrupted. In some cases, one or more reflective surfaces may be provided so that the light path between source and detector may include one or more reflectors that change the direction of the light path. Using a system of one or more light sources, reflectors, and detectors allows a light curtain to be formed so that any object passing through the light curtain interrupts one or more light paths and is detected by at least one detector. The use of optical sensors may allow the presence and/or location of a target drone near or within a net assembly to be detected so that C-UAV can adapt in real-time during and after impact. Information from one or more optical sensors may be used to modify flight so that it is adapted to the captured target drone. For example, information from one or more optical sensors may be provided to control circuits (e.g. flight controller 211 and/or AI controller 330) that adapt flight control according to the information received from optical sensors. Optical sensor information may also be sent to a remote control (e.g. remote control 105) so that a user may be provided with information about the captured target drone. Optical sensor information may be combined with other information (e.g. from one or more strain gauges, cameras and/or other sensors) for flight control.

Figure 6:
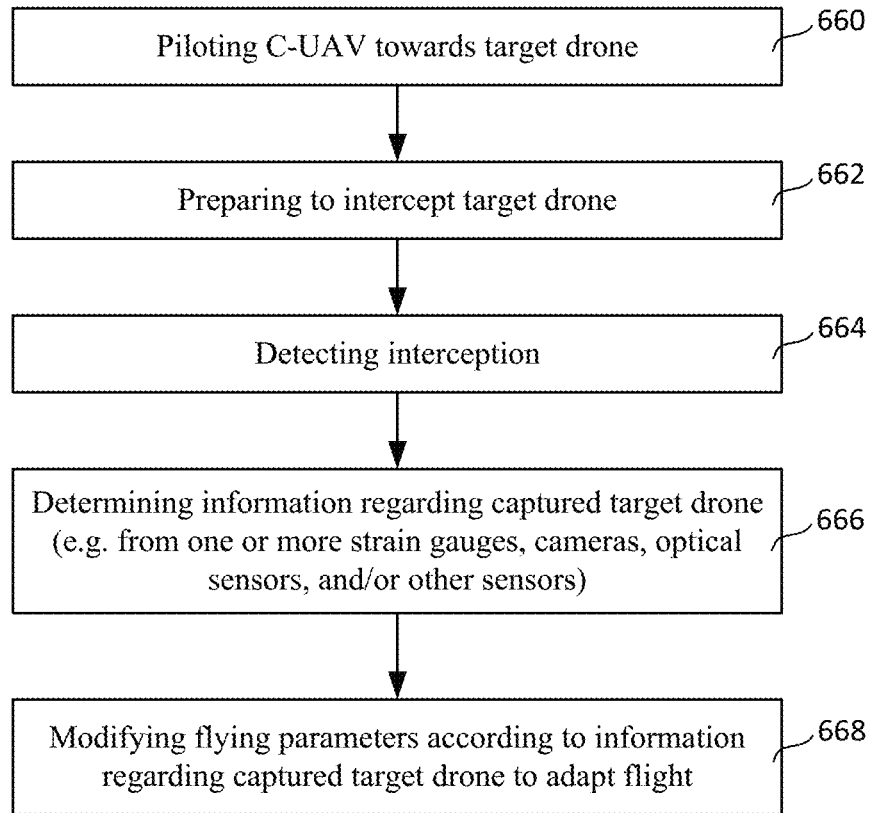
FIG. 6 illustrates a method of operating a C-UAV.

FIG. 6 illustrates a method of operating a C-UAV (e.g. C-UAV drone 101 with net assembly 550) to safely intercept a target drone (e.g. target drone 103). This method and variations of this method may be used with net assemblies as shown in the examples below or other net assemblies. The method includes piloting the C-UAV towards the target drone 660 (e.g. by a user via remote control and/or autonomously using appropriate control circuits). In some cases, this may be done by a user using one or more cameras that provide FPV or other views. This may be assisted by other guidance (e.g. GPS, radar, lidar or other location or detection system). In some cases, different systems may be used at different times to guide a C-UAV towards a target drone. For example, a C-UAV may obtain an approximate location of a target drone and may use GPS to select a flightpath to the approximate location and may then proceed along the flightpath until it is at or near the approximate location. Then, the C-UAV may switch to visual or other systems that determine the location of the target drone. For example, a camera may provide visual identification of a target drone that allows the C-UAV to home in on the target drone. Similarly, radar, lidar, acoustic or other systems may allow the C-UAV to locate the target drone once it is in range. Information from such systems may be provided to a user who pilots the C-UAV to intercept the target drone or the information may be sent to an AI controller that determines a flightpath to intercept the target drone or some combination of user input and AI input may pilot the C-UAV to intercept the target drone.

The method includes preparing to intercept the target drone 662 as the C-UAV approaches the target drone. For example, orientation of the C-UAV may be adjusted to align a net assembly (e.g. net assembly 550) with the target drone prior to interception. In some cases, the net assembly may be attached to the C-UAV in a manner that is rigid and not configurable in flight so that the C-UAV aligns the net assembly by changing its orientation (e.g. by changing C-UAV orientation about the pitch, roll, and/or yaw axes). In some cases, the speed of the C-UAV may be changed prior to interception to a speed close to the speed of the target drone. In this way, the impact from intercepting the target drone may be reduced (i.e. a reduction in relative velocity may reduce impact). A C-UAV may move at a higher speed to get close to a target drone rapidly and then move at a lower speed close to the target drone so that impact is reduced. The flightpath of the C-UAV may be changed according to the flightpath of the target drone so that the C-UAV maintains an intercepting trajectory even if the target drone changes course (e.g. attempts to evade capture).

The method includes detecting interception 664. This may include detecting that a target drone has been entangled and/or enclosed in a net assembly using one or more of a camera, strain gauge, optical sensor, or other sensor that provides an output indicating capture of a target drone. For example, strain on net assembly or C-UAV components may increase as a target drone is intercepted and is held in the net assembly. A strain gauge may detect such a change and may provide a signal to control circuits of the C-UAV accordingly.

The method includes determining information regarding the captured target drone 666. For example, strain gauges, cameras, optical sensors and/or other sensors may provide output that provides information regarding the target drone. In addition to detecting the capture of a target drone, appropriately located strain gauges may provide quantitative information that allows the mass of a target drone to be estimated. The location of a target drone within a net assembly may also be determined (e.g. if captured target drone is on one side or in a corner of a net assembly, this may be indicated by different readings from different strain gauges, different optical sensor outputs, and/or camera outputs). Increased drag caused by a target drone may also be measured by strain gauges.

Information obtained in step 666 may be used in modifying flying parameters according to information regarding the captured target drone to adapt flight 668. For example, the mass, location, and/or drag of a captured target drone may be used by control circuits of the C-UAV to adjust operation of the C-UAV according to the information obtained. A C-UAV may adjust to the added mass from a captured target drone, for example, by increasing power to motors according to the detected mass of the target drone so that additional thrust is generated to counteract the weight of the target drone. A C-UAV may adjust according to the location of a captured drone, for example, by increasing power to motors on one side if the captured target drone is on that side. Where a net assembly extends horizontally from a C-UAV (e.g. in front) the added mass of the captured target drone may provide a turning force that tends to cause the C-UAV to increase pitch (pushing the front downwards). Power to front motors may be increased according to the mass and location of such a captured target drone to counteract the turning force (e.g. in proportion to the turning moment caused by the captured target drone). A C-UAV may adjust to increased drag caused by capture of a target drone by increasing pitch and/or thrust according to the increased drag to compensate for the increased drag and maintain airspeed.

Various configurations of net assemblies are described below. Any of these assemblies may be attached to a UAV (e.g. to drone 201, 301, 400) appropriately configured to form a C-UAV to intercept a target drone (e.g. as illustrated in FIGS. 5A-6).

Static Top Mount Configuration

Figure 7A:
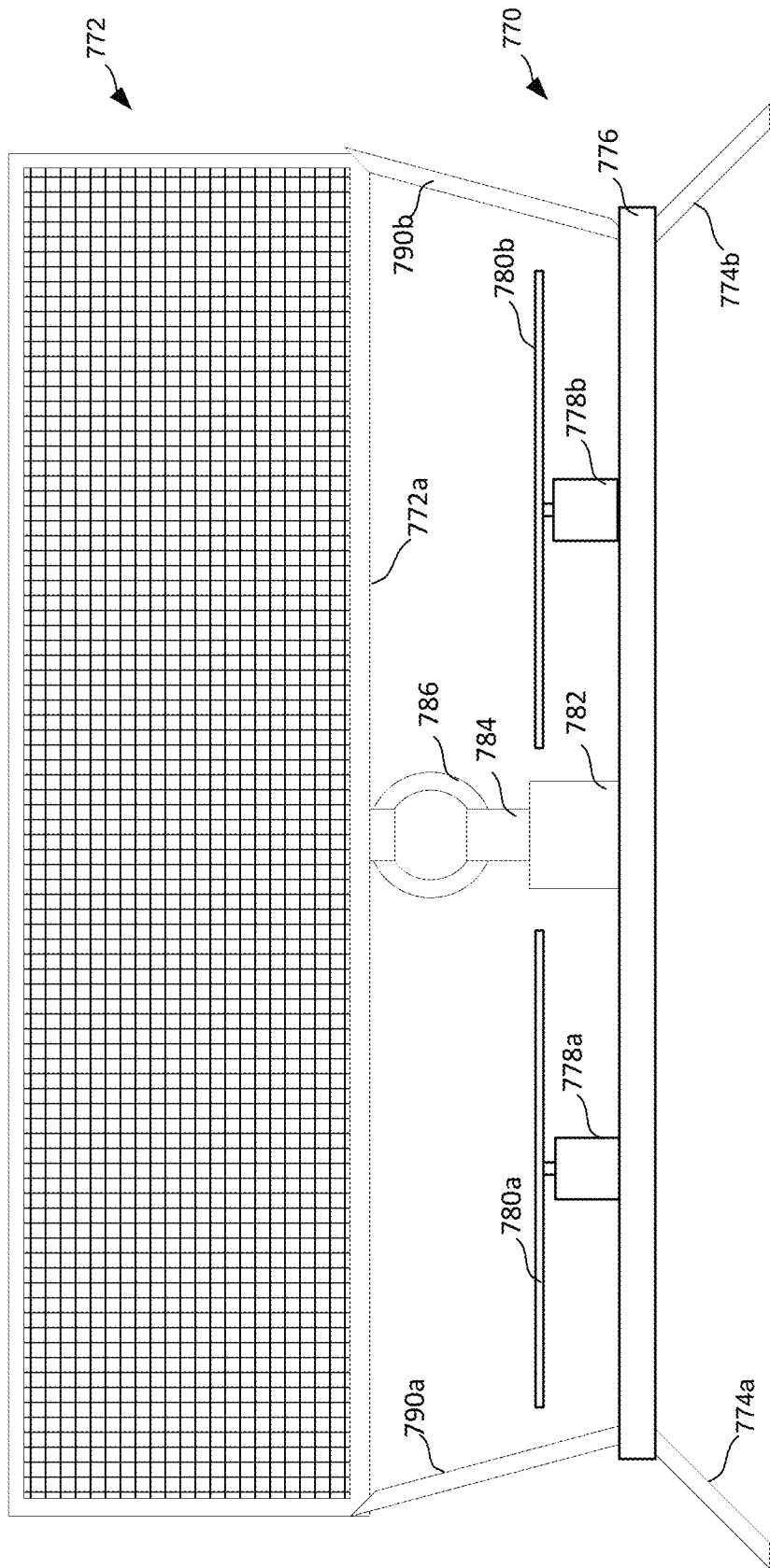

FIG. 7A shows a first example of a C-UAV that includes UAV 770 (configured as a C-UAV) with net assembly 772, which is mounted on top of UAV 770. UAV 770 (shown in side-view) includes legs 774*a-b* (two of four legs are visible in this view) that are attached to the bottom surface of chassis 776 and support chassis 776 when on the ground. Electric motors 778*a-b* (two of four motors are visible in this view) are mounted to the top surface of chassis 776 and drive propellers 780*a-b* respectively. At the center of the top surface of chassis 776, a quick-release component 782 is coupled to a corresponding quick-release component 784 of net assembly 772 to allow rapid attachment and detachment of UAV 770 and net assembly 772. A dampener 786 is coupled between quick-release component 784 and net assembly 772. Dampener 786 is formed by four semicircular spring elements that provide flexibility in the coupling between net assembly 772 and UAV 770. This flexible coupling may allow the angle of net assembly 772 with respect to UAV 770 to change during and after impact. Thus, while net assembly 772 is shown parallel to chassis 776 of UAV 770, this may change when a target drone impacts net assembly 772. In addition, elastic elements 790*a-b* extend between net assembly 772 and chassis 776 of UAV 770. While two elastic elements are shown in this view, different numbers of elastic elements may be used. For example, four elastic elements may be provided, attached between corresponding corners of net assembly 772 and UAV 770. The combination of dampener 786 and elastic elements 790 may provide flexibility between net assembly 772 and UAV 770 so that the effects on UAV 770 of an impact of a target UAV and net assembly 772 is reduced (e.g. the shock of impact is substantially absorbed by dampener 786 and elastic elements 790). Vibration may also be substantially absorbed by dampener 786 and elastic elements 790. Sufficient clearance is provided between net assembly 772 and propellers 780*a-b* to ensure that no contact occurs between propellers 780*a-b* and bottom portion 772*a* of net assembly 772 even during impact. In some cases, elastic elements 790 may be formed of suitable elastic material (e.g. molded plastic, rubber, synthetic rubber, or suitable elastomer) and configuration to have elastic limits that ensure sufficient clearance (e.g. elastic limit of at least one elastic element is reached before contact between bottom portion 772*a* and propellers 780*a-b*).

Figure 7B:
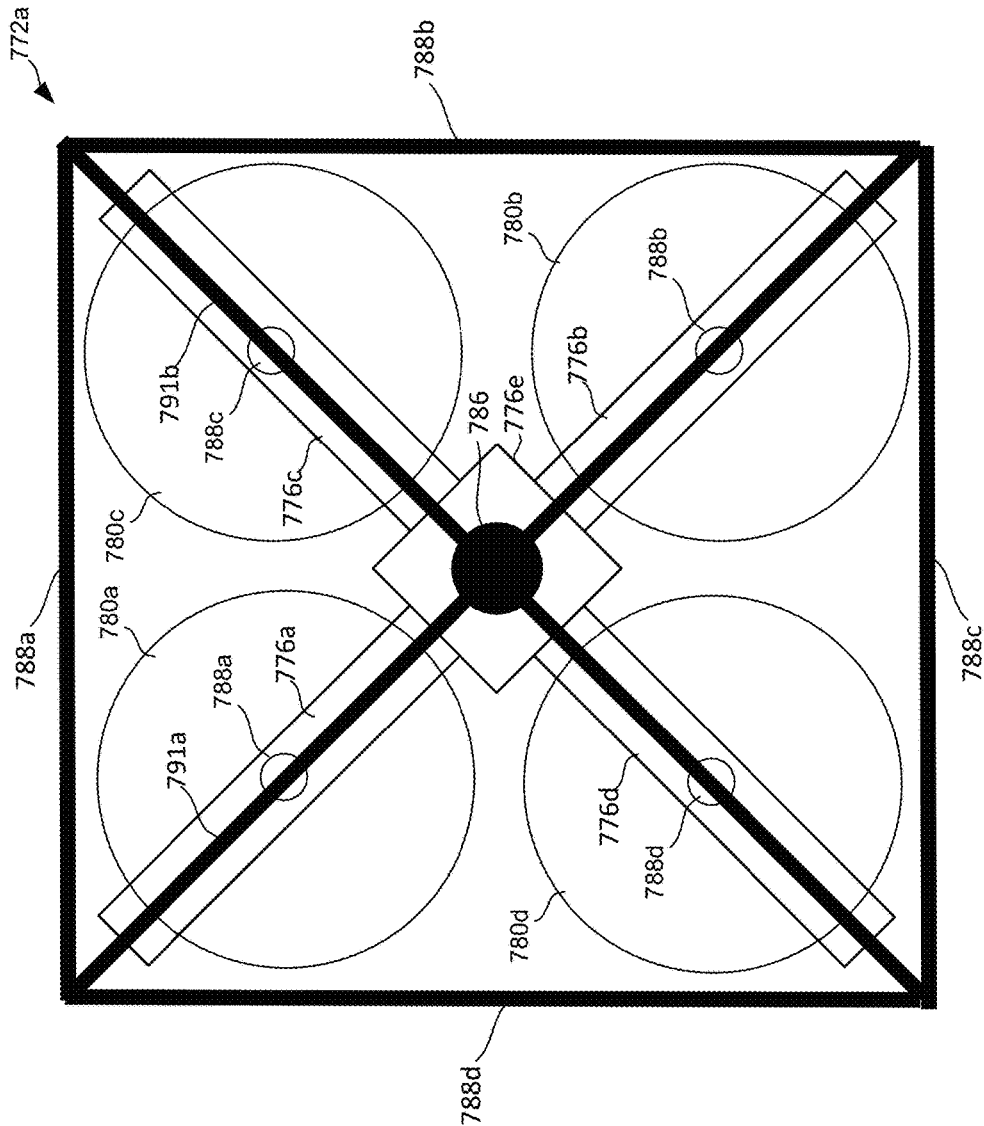

FIG. 7B illustrates a top-down view of fame elements of a bottom portion 772*a* (floor portion or floor) of net assembly 772 in relation to UAV 770 showing how UAV chassis 776 and components of bottom portion 772*a* are configured. In this view, it can be seen that UAV 770 is similar to quadcopter drone 440. UAV 770 includes UAV chassis 776 formed of arms 776*a-d* and central portion 776*e*. Each arm 776*a-d* has a corresponding motor 778*a-d* coupled to a corresponding propeller 780*a-d*. Bottom portion 772*a* is aligned with arms 776*a-d* so that the corners of bottom portion 772*a* are aligned with, and can be coupled to, arms 776*a-d* by elastic elements 790 as previously shown (not shown in this view). Bottom portion 772*a* includes a square formed of frame members 788*a-d* with two additional frame members, cross bars 791*a-b*, forming an X-shape that overlies the X-shape formed by arms 776*a-d*. At the intersection of cross bars 791*a-b*, dampener 786 is attached to bottom portion 772*a*. Dampener 786 is also attached, through a quick-release mechanism (not shown in this view) to central portion 776*e* of UAV 770. Bottom portion 772*a* may include a net (e.g. a square panel of netting may extend throughout the square of bottom portion 772*a* formed by frame members 788*a-d*). Such a net (or shroud) may be attached to frame members 788*a-d* around the perimeter of bottom portion 772*a* to protect propellers 780*a-d* from damage (e.g. during and after impact of a target drone) by enclosing the captured target drone and preventing the target drone or fragments of the target drone from reaching propellers 780*a-d* or other components of UAV 770. An example of suitable netting for bottom portion 772*a* is formed of monofilament nylon strands that may be configured for protecting propellers 780*a-d* using strands having a relatively large diameter (e.g. 1.5 mm) and may have relatively small spacing (e.g. ¼ inch spacing) between strands. These strands may be tightly strung nylon strands so that there is some tension on each strand and strands may cross at 90 degrees to form a pattern of squares (e.g. similar to a tennis racquet) or at some other angle to form a pattern of diamonds.

While FIG. 7B shows bottom portion 772*a* (floor) of net assembly 772 that protects UAV 770, additional components of net assembly 772 extend upwards from this portion to enclose and/or entangle a target drone. Back, front and side portions of net assembly 772 may extend up from the perimeter of bottom portion 772*a* to form an enclosure with the top open (or substantially open) to allow a target drone to enter. FIGS. 7A-B show the size of net assembly 772 being approximately the same as UAV 770 (e.g. a two-foot-wide net assembly attached to a two-foot wide UAV) in some cases these dimensions may be different. In general, the size of a net assembly may be selected according to a target drone size while the size of a UAV used with the net assembly may be selected to be sufficient to fly with the net assembly both before and after interception (e.g. may be selected to have sufficient power to support the net assembly and a captured target drone).

Figure 7C:
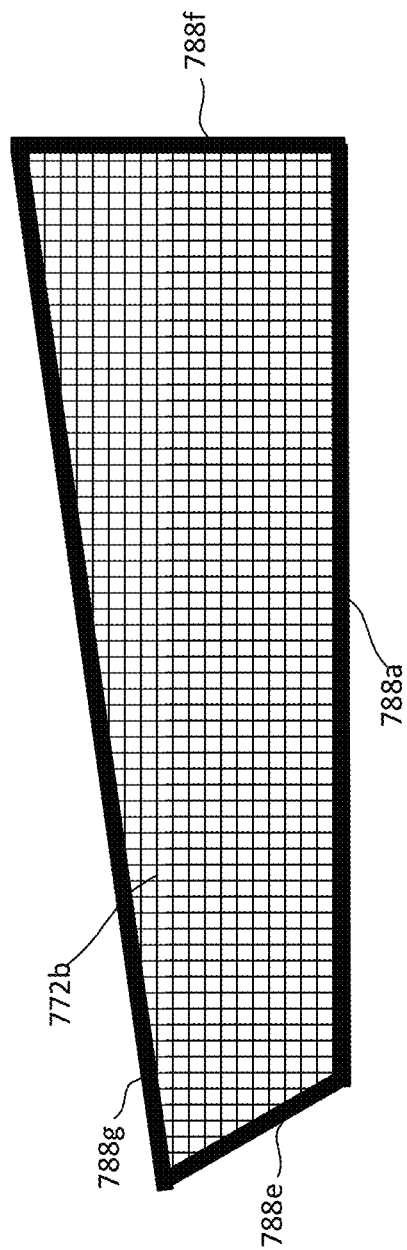

FIG. 7C shows first side portion 772b of net assembly 772 according to an example. First side portion 772b extends up from bottom portion 772a along one side of net assembly 772. First side portion 772b is formed by frame member 788a, which is shared with bottom portion 772a, upright frame members 788e-f, top frame member 788g, and netting extending between frame members. These frame members (and all frame members) may be formed of bars of a suitable material such as carbon fiber, injection molded plastic, metal, or other material and may have any suitable shape (e.g. circular cross-section, I-beam, square, rectangular) and may be solid, hollow, or some combination of hollow and solid. A second side portion may be substantially identical to first side portion 772b.

Figure 7D:
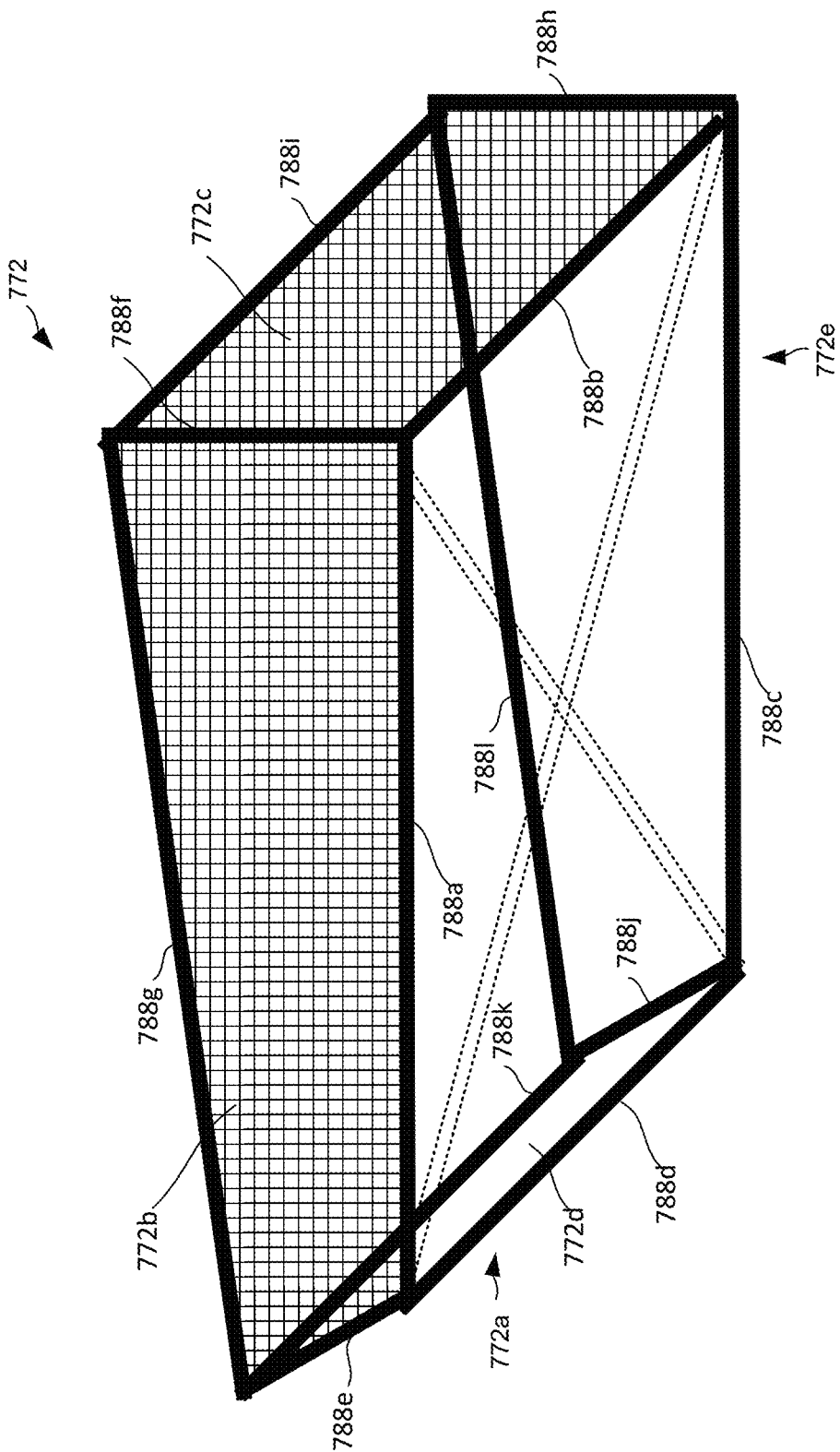

FIG. 7D shows first side portion 772b (including netting) forming one side of net assembly 772 and back portion 772c (also including netting). Back portion 772c includes frame member 788b (shared with bottom portion 772a) upright frame members 788f, 788h and top frame member 788i. Bottom portion 772a is shown without netting and with cross bars 791a-b in outline for clarity. Netting is also omitted for clarity from front portion 772d which includes frame member 788d, upright frame members 788e, 788j and top frame member 788k, and from second side portion 772e, which includes frame member 788d, upright frame members 788j, 788h, and top frame member 788i. Bottom portion 772a, first side portion 772b, second side portion 772e, front portion 772d, and back portion 772c form an enclosure that can enclose a target drone to prevent the target drone or portions of the target drone (e.g. fragments resulting from impact) from damaging the C-UAV or falling to the ground. Top frame members 788g, 788i, 788k and 788l form a rectangular opening that may allow a target drone to enter the enclosure. In some examples, the front, back, and sides may use similar enclosure netting to that used for the bottom portion as described above. In or examples, different netting may be used. For example, netting of first side portion 772b, second side portion 772e, front portion 772d, and back portion 772c may use a smaller-diameter monofilament nylon strand with a larger spacing than that of bottom portion 772a. In an example, netting of first side portion 772b, second side portion 772e, front portion 772d, and back portion 772c is formed of monofilament nylon strands having a diameter of 0.5 mm with a spacing of 2 inches between strands and with strands crossing at 90 degrees to form a pattern of squares, or crossing obliquely to form a pattern of diamonds. Netting of side portions may be considered entanglement netting in some cases or as a hybrid between entanglement netting and enclosure netting and may be configured accordingly.

It can be seen that frame members in FIG. 7D form a structure in the shape of a truncated wedge with front portion 772d lower than the back portion 772c, and with front portion 772d inclined forward to facilitate capture when net assembly travels in the forward direction (right to left in the view of FIG. 7D). In other examples, different shaped enclosures may be used and the example of 7D is for illustration. For example, a net assembly may be triangular, circular or elliptical instead of substantially square in cross section along a horizontal plane. Upright frame members may extend at different angles than those shown. Curved frame members may be used instead of the straight frame members illustrated.

In addition to the enclosure netting that forms the enclosure illustrated in FIG. 7D, entanglement netting may be provided so that a target drone becomes entangled in the entanglement netting and thus becomes captured by a net assembly. For example, entanglement netting may extend across the opening at the top of net assembly 772 or at some level between the top and bottom portion 772a so that a target drone that enters net assembly 772 tends to intersect the entanglement netting when intercepted by a net assembly 772.

Figure 7E:
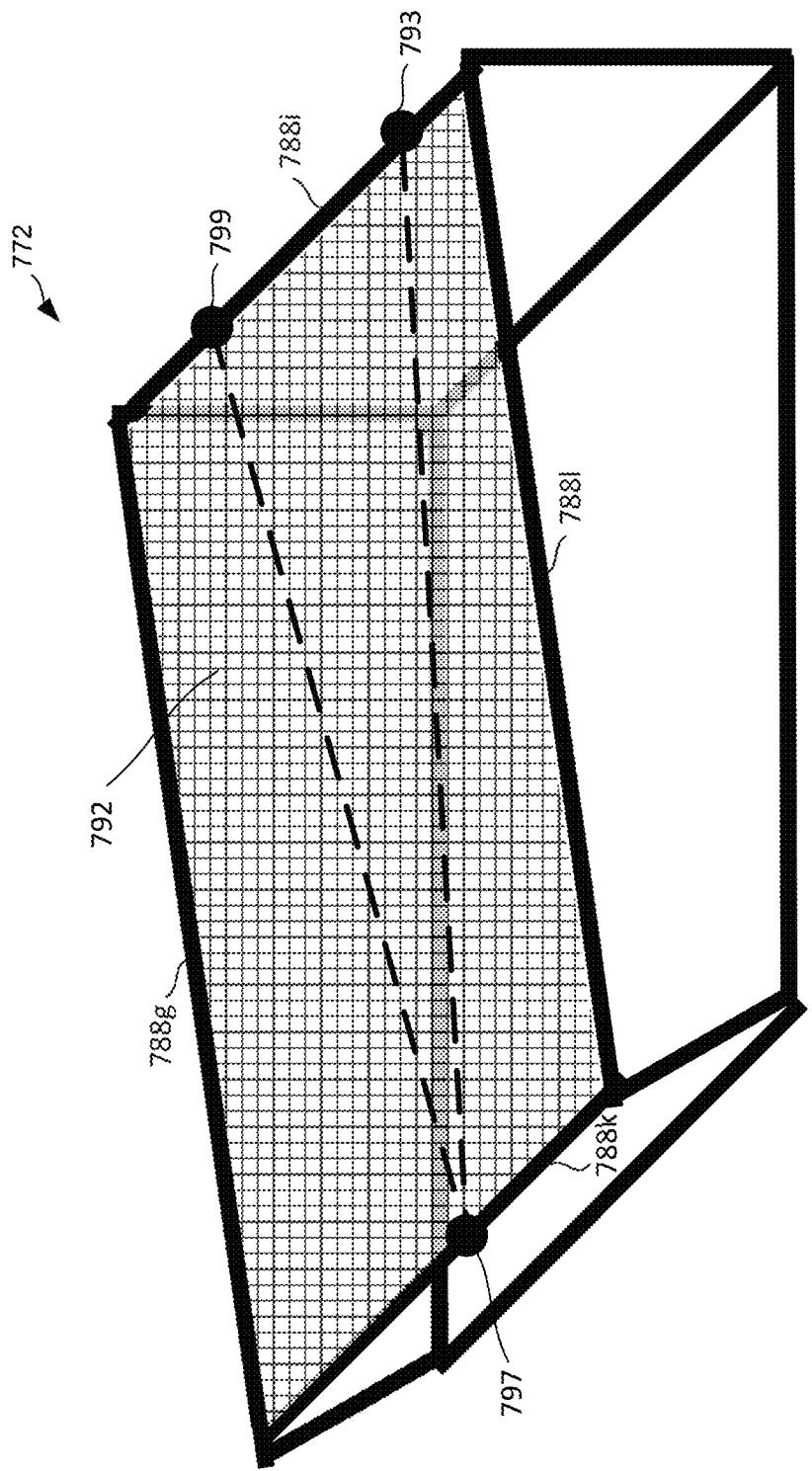

FIG. 7E shows entanglement netting 792 extending across the top opening formed by top frame members 788g, 788i, 788k, 788l (enclosure netting of first side portion 772b, second side portion 772e, front portion 772d, and back portion 772c are omitted for clarity of illustration). A light source 799 (e.g. LED) and a light sensor 793 (e.g. photodiode) are shown attached to top frame member 788i. A reflector 797 is shown attached to top frame member 788k to reflect light from light source 799 back to light sensor 793. Interruption of this beam (indicated by dashed line), for example, when a target drone is entangled in entanglement netting 792, may be indicated by an output of light sensor 793, which may be provided to control circuits of UAV 770 and/or to a remote control.

Entanglement netting may be similar to enclosure netting or may be different so that it is better configured for entanglement of a target drone. For example, while enclosure netting may be tight (e.g. not sagging under its own weight and generally having some tension in strands that are stretched between frame members), entanglement netting may be loose (e.g. hanging down under its own weight and with strands relaxed and hanging from frame members instead of being stretched between frame members). Entanglement netting may be formed of suitable material such as monofilament nylon strands with a diameter of 0.5 mm and a spacing of 4 inches. Strands may cross at 90 degrees to form a pattern of squares or may cross obliquely to form a pattern of diamonds.

According to an aspect of the present technology, one or more strain gauges may be placed along one or more frame members of a net assembly to measure strain of frame members (e.g. during impact with a target drone). Such measurements may give an indication that a target drone has been captured and may provide qualitative information about the target drone that may be used by the C-UAV drone and/or user.

Figure 7F:
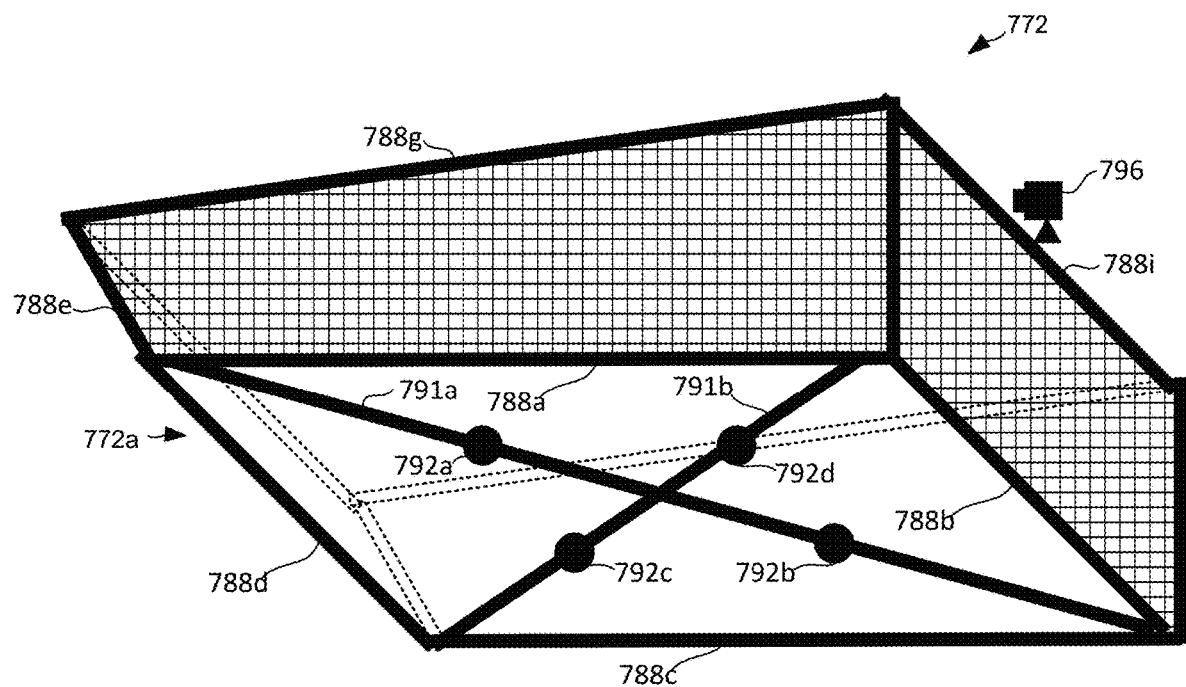

FIG. 7F illustrates an example of strain gauges attached to and measuring strain in cross bars 791a, 791b. In this example, strain gauges 792a-b are attached to cross bar 791a while strain gauges 792c-d are attached to cross bar 791b. Strain gauges may be located at appropriate locations (e.g. half way between the center of bottom portion 772a where cross bars 791a and 790b intersect and corners of bottom portion 772a). In other examples, more or fewer than four strain gauges may be used (e.g. one strain gauge may be attached to each cross bar, or additional gauges may be attached). Strain gauges may be attached to other frame members such as frame members 788a-d, upright frame members, and/or top frame members (either instead of or in addition to strain gauges attached to cross bars 791a-b). Strain gauges may be coupled by wire to one or more circuits of a UAV (e.g. through a connector that allows strain gauges to be connected rapidly and disconnected rapidly).

FIG. 7F also shows a camera 796 mounted to top frame member 788i to provide a view of interception of a target drone as a C-UAV approaches the target drone. Camera 795 may provide a video feed that is used by a user (FPV) to pilot a C-UAV so that net assembly 772 aligns with and impacts the target drone (e.g. so that the target drone is captured in the enclosure illustrated and becomes entangled in entanglement netting that may extend across the enclosure. By mounting camera 796 on net assembly 772 in this orientation, a pilot may use the video feed from camera 796 to align net assembly 772 with the target drone and adjust to any change in the target drone's flightpath. In another example, two such cameras may form a stereoscopic camera used with CV components to provide target drone information to a processor (e.g. AI processor) for autonomous interception.

Figure 7G:
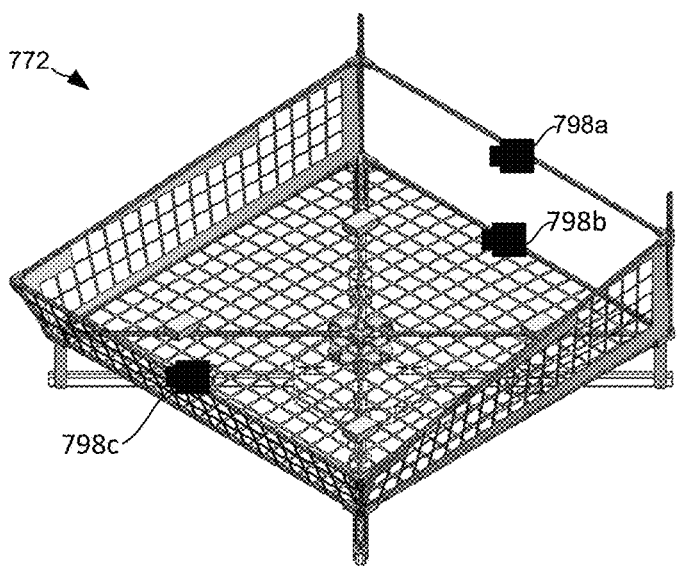

FIG. 7G shows some other locations for FPV cameras 798a-c that may be alternative locations or additional locations (e.g. one camera may be placed at one of the locations shown or more than one camera may be placed at more than one of the locations shown). Cameras placed at multiple locations may provide a stereoscopic view of a target drone before and during interception that may be used by a human pilot or AI pilot to guide net assembly 772 to interception the target drone. In some cases, multiple camera views may be provided to a remote control for display at the same time to a user. In some cases, one camera view may be provided at a time with the camera view selected by a user as desired (e.g. switching from a first camera used for takeoff and initial period of flight to a second camera used for interception, where the second camera may be mounted on a net assembly).

FIGS. 7H-J illustrate examples of how a net assembly such as net assembly 772 may be coupled to a UAV in a manner that provides dampening of impact and/or vibration and allows quick attachment and detachment. Dampening is provided by dampener 786 in combination with elastic elements 790b-c. FIG. 7H illustrates net assembly 772 separated from UAV 770 with quick release component 784 exposed. In this example, quick release component 784 is a cylindrical portion of material (e.g. injection molded plastic) that fits in corresponding quick release component 782 on the top surface of UAV 770 when net assembly 772 is coupled to UAV 770 (coupled by insertion of quick release component 784 in corresponding quick release component 782 as indicated by arrows).

Quick release component 782 is shown in greater detail in FIG. 7I and includes a flexible ring 782a that is adapted to fit around quick release component 784 (i.e. has an inner diameter that in the open position is greater than outer diameter of the cylinder of quick release component 784) to allow insertion. A cam lever 782b allows the diameter of the flexible ring to be reduced so that quick release component 784 is captured. Cam lever 782 may remain in the closed position until it is manually flipped open to release quick release component 784 and thus allow separation of net assembly 772 from UAV 770. In an example, quick release component 782 and/or quick release component 784 include one or more sensors to detect attachment/detachment of net assembly 772. In addition to the coupling shown, some electrical couplings may be made using one or more connectors. For example, one or more strain gauges, cameras, sensors, actuators and/or other electronic devices of net assembly 772 may be coupled to circuits of UAV 770 using connectors such as JST connectors to allow rapid attachment and detachment.

FIG. 7H shows the location of dampener 786 and FIG. 7J shows dampener 786 in more detail. It can be seen that, in this example, dampener 786 includes four semi-circular springs 787a-d that are coupled to quick release component 784 and also coupled to a cross-shaped portion 789 with holes for cross bars 791a-b that form the bottom portion of net assembly 772. The structure shown in FIG. 7J may be formed of a single piece of molded injection molded plastic for simplicity. An integrated dampener such as dampener 786 helps restrain vibratory motions like mechanical oscillations coming from capturing a target drone. The integrated dampener design has attributes including high damping and large range of elastic characteristics to absorb energy dissipated by the captured target drone. Also, with its great energy dissipation coefficient and flexibility on deformation amplitude, it reduces the noise transferred unto the C-UAV which may impact the flight dynamics during steady flight and aggressive flight.

FIG. 7K illustrates dampener 786 in more detail. In this example, dampener 786 and quick release component 784 are formed of a single piece of material (e.g. injection molded plastic) and cross bar 791a (which forms part of bottom portion 772a) is inserted in a hole formed in the material (formed in cross-shaped portion 789). Thus, bottom portion 772a is integrated with dampener 786 and quick release component 784.

One advantage of a quick release mechanism for a net assembly is interchangeability of net assemblies and UAVs. For example, different net assemblies may be used with the same UAV (e.g. according to the target drone to be intercepted, according to weather conditions, or other external factors) and different UAVs may be used with the same net assembly.

Figure 7L:
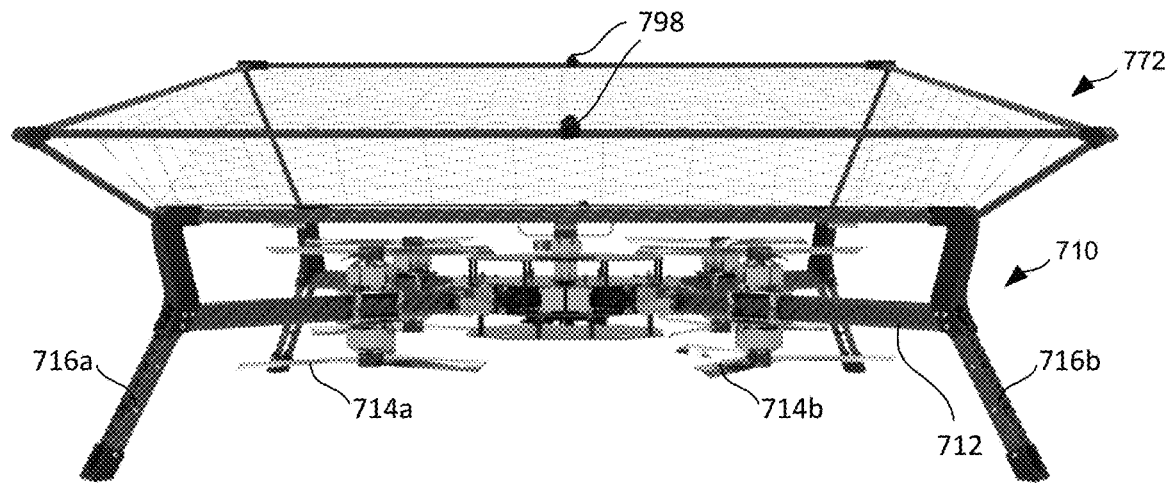

FIG. 7L illustrates an example of net assembly 772 mounted to UAV 710, which is different to UAV 770. For example, UAV 710 includes motors and propellers mounted on both an upper surface and lower surface of chassis 712. Upper motors and propellers may be mounted to arms of chassis 710 as shown in FIG. 7B with lower motors and propellers mounted below in the same arrangement (e.g. at each point along a chassis arm where an upper motor is mounted to the upper surface a lower motor is mounted to the lower surface). Lower propellers 714a-b are shown below chassis 712 (two additional lower propellers are not visible in this view). Legs 716a-b are sufficiently long to ensure some clearance between lower propellers 714a-b and a landing surface when UAV 710 is at a landing point.

FIG. 7L shows a view from the front of net assembly 772 and UAV 710 (i.e. with UAV 710 flying towards the viewer) showing cameras 798a-c attached to net assembly 772 (and generally directed forwards along the direction of travel. Additional cameras may be provided at additional locations on net assembly 772 and/or UAV 710 as needed.

Figure 7M:
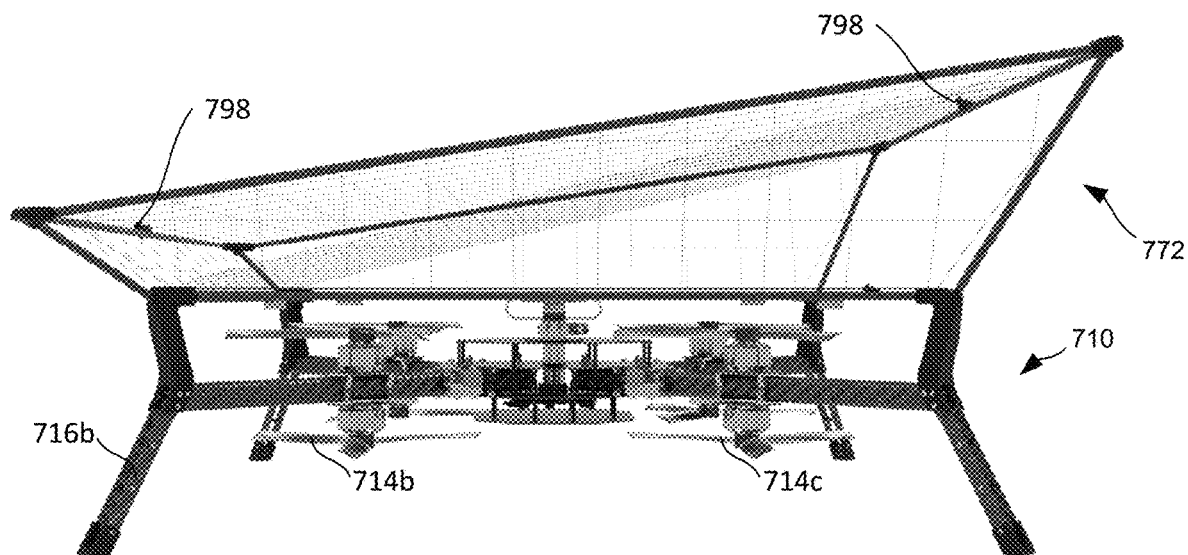

FIG. 7M shows a side-view of net assembly 772 and UAV 710 including lower propellers 714b and 714c (which was hidden in FIG. 7L) and cameras 798a-c.

An example of a drone includes a drone chassis; a plurality of motors attached to the drone chassis; a plurality of propellers coupled to the plurality of motors, the plurality of propellers extending above the drone chassis; and a net assembly mounted to the drone chassis, the net assembly extending above the plurality of propellers, the net assembly including a frame and one or more portions of netting.

The net assembly may include a bottom portion, a first side portion, a second side portion, a front portion, and a back portion each having enclosure netting to form an enclosure. The bottom portion may include netting formed of monofilament nylon strands of a first diameter having a first spacing, the first side portion, the second side portion, the front portion and the back portion may include netting formed of monofilament nylon strands of a second diameter that is less than the first diameter and have a second spacing that is greater than the first spacing. The net assembly may further include an entanglement net extending across the enclosure, the entanglement net formed of strands of monofilament nylon having a third spacing that is greater than the second spacing. The monofilament nylon strands of the bottom portion, the first side portion, the second side portion, the front portion and the back portion may be tightly strung, and the monofilament nylon strands of the entanglement net may be loosely strung. The drone may include a quick-release mechanism coupling the net assembly to the drone chassis. The drone may include one or more strain gauges attached to members of the frame to measure strain of one or more frame members. The drone may include a dampener coupled to dampen shock or vibration between the net assembly and the drone chassis. The drone may include a plurality of elastic elements coupled between the net assembly and the drone chassis.

An example of a method of intercepting a target drone with a counter-unmanned aerial vehicle (C-UAV) drone includes: piloting the C-UAV drone towards the target drone; orienting the C-UAV drone to align a net assembly mounted above propellers of the C-UAV drone with the target drone while flying towards the target drone; intercepting the target drone with the net assembly; detecting interception of the target drone; determining information regarding the target drone; and modifying flying parameters of the C-UAV drone according to the information regarding the target drone.

Intercepting the target drone may include entangling propellers of the target drone in an entanglement net of the net assembly. The net assembly may include one or more enclosure nets around the entanglement net and intercepting the target drone may include enclosing the target drone within the enclosure nets to prevent contact between the target drone and propellers of the C-UAV drone. The net assembly may include one or more strain gauges and detecting interception of the target drone may include detecting changes in output of the one or more strain gauges. The method of may further include subsequently piloting the C-UAV drone with the target drone to a landing point and detaching the net assembly with the captured target drone from the C-UAV using a quick-release mechanism. The net assembly may include a camera and orienting the C-UAV drone to align the net assembly with the target drone may include using a First-Person View (FPV) provided by the camera.

An example of a Counter-Unmanned Aerial Vehicle (C-UAV) quadcopter includes: a quadcopter chassis; a first motor, a second motor, a third motor, and a fourth motor attached to the quadcopter chassis; a first propeller, a second propeller, a third propeller, and a fourth propeller coupled to the respective first, second, third, and fourth motors above the quadcopter chassis; and a net assembly mounted to the quadcopter chassis by a quick-release mechanism, the net assembly extending above the first, second, third, and fourth propellers, the net assembly including an entanglement net to entangle a target drone and an enclosure about the entanglement net to protect the first, second, third, and fourth propellers from the target drone.

The C-UAV quadcopter may include a plurality of strain gauges attached to components of the net assembly to detect presence of the target drone in the net assembly. The C-UAV quadcopter of may include one or more cameras mounted to the net assembly. The C-UAV quadcopter may include control circuits configured to receive outputs of the plurality of strain gauges and outputs of the one or more cameras and to adjust flying parameters of the C-UAV quadcopter in response to the outputs. The entanglement net may be formed of loosely strung nylon strands having a wide spacing and the enclosure may be formed by tightly strung nylon strands that having a narrow spacing.

Entrapment Top-Mount Configuration

While the above Figures show particular examples of a top-mount net assembly (a net assembly configured to be mounted above the chassis and propellers of a UAV), aspects of the present technology are applicable to other net assemblies including top-mounted net assemblies that may be differently configured. Some examples may include only static or passive components (e.g. a frame and net) while other examples may include one or more dynamic components that are actuated in some manner during interception of a target drone to entrap or enclose the target drone.

Figure 8A:
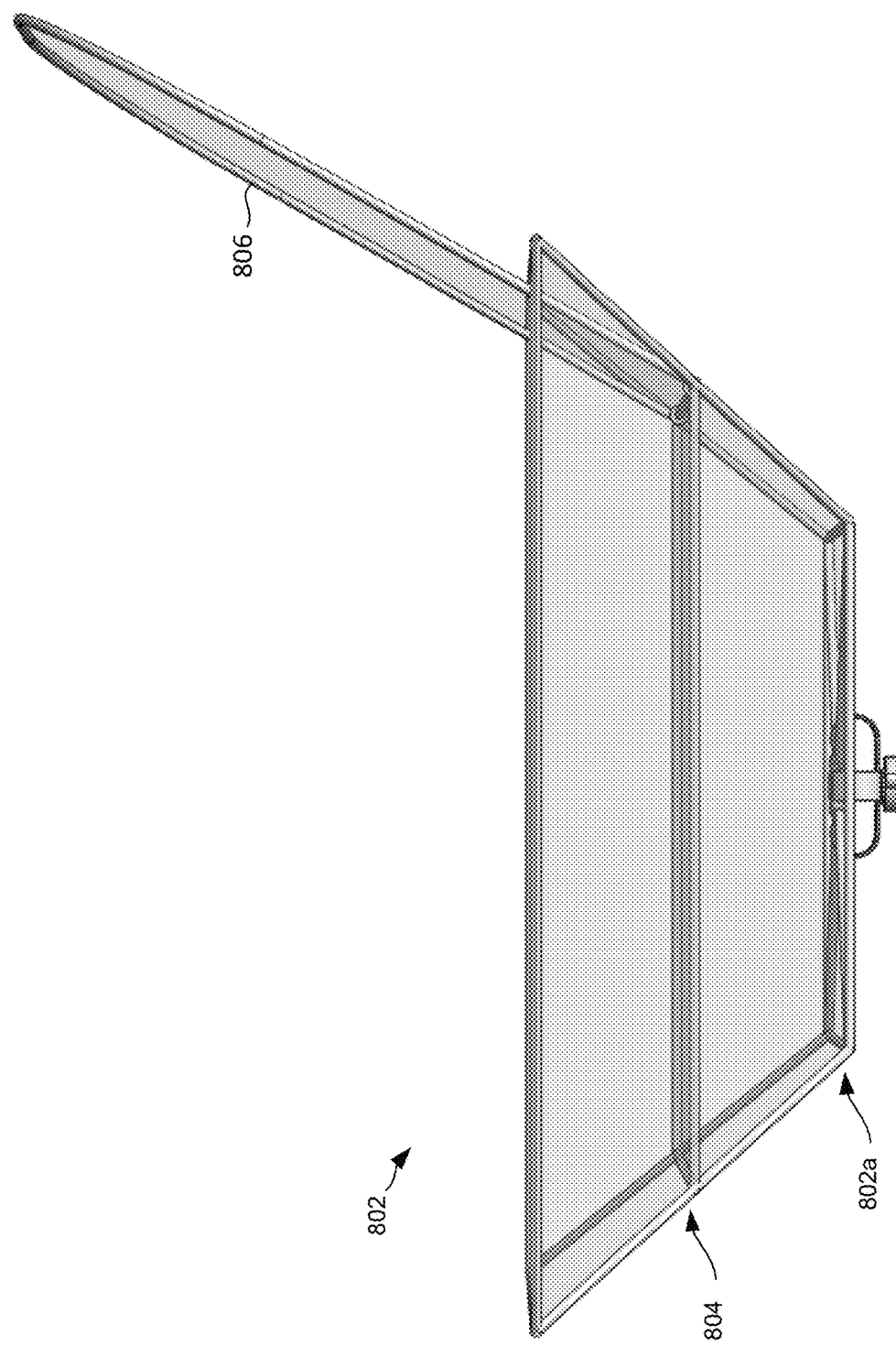
FIGS. 8A-F illustrate aspects of examples of a C-UAV with entrapment top-mount configuration that includes a latch.

FIG. 8A shows an example of a top-mounted net assembly 802 that may be mounted to a UAV configured for C-UAV operation (e.g. UAV 770 or UAV 710, not shown in FIG. 8A) so that it extends above propellers of the UAV (e.g. in a manner similar to net assembly 722 and UAV 770). Net assembly 802 includes a bottom portion 802a (floor) that is similar to bottom portion 772a as previously shown and may include frame members forming a square with cross bars between corners of the square in an X configuration (e.g. as shown in FIG. 7B). One or more strain gauges may be attached to cross bars of bottom portion 802a (e.g. as illustrated in FIG. 7F) and/or other frame members of net assembly 802. Bottom portion 802a may be similarly aligned with a UAV and may be similarly attached using a dampener (e.g. like dampener 786), elastic elements, and a quick release component (like quick release component 784) as illustrated in FIGS. 7H-I. Net assembly 802 is generally symmetric from front to back and from side to side so that (unlike net assembly 722) the front, back, and side portions are similar in size and shape. In addition to upright frame members and top frame members (which may be similar to those of net assembly 772) net assembly 802 includes intermediate frame members that form a frame 804 parallel to bottom portion 802a. An entanglement net (not visible in FIG. 8A) may be attached to frame 804 so that it extends across net assembly 802 at an intermediate height (e.g. about halfway between bottom portion 802a and the top of net assembly 802.

FIG. 8A also shows a hinged portion or latch 806 (catcher) in an open position in which it extends upwards from net assembly 802. This presents a large area to a target drone being intercepted so that the probability of interception is high. Latch 806 may be formed of a single frame member with an opening that has netting extending across it. The frame member may be formed of similar material to other frame members (e.g. carbon fiber, plastic, or metal).

Figure 8B:
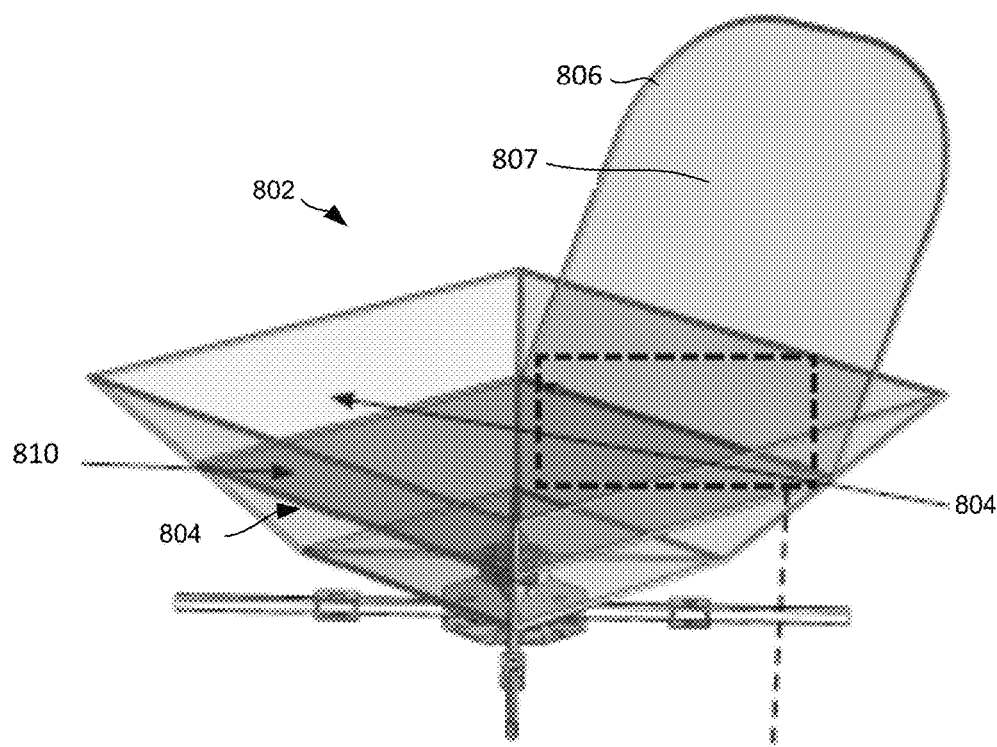

FIG. 8B shows another view of net assembly 802 with latch 806 in the open position. FIG. 8B shows enclosure netting along sides of net assembly 802 (e.g. stretched across frame members to form front, back, and side portions of net assembly 802). Entanglement net 810 can be seen extending across frame 804 at an intermediate height. Net 807 of latch 806 may be similar to one or more other nets described above. For example, net 807 may be an entanglement net that is similar to entanglement net 792 described above (e.g. both entanglement nets 810 and 807 may be formed of strands of monofilament nylon) so that a target drone colliding with latch 806 becomes entangled in net 807.

Figure 8C:
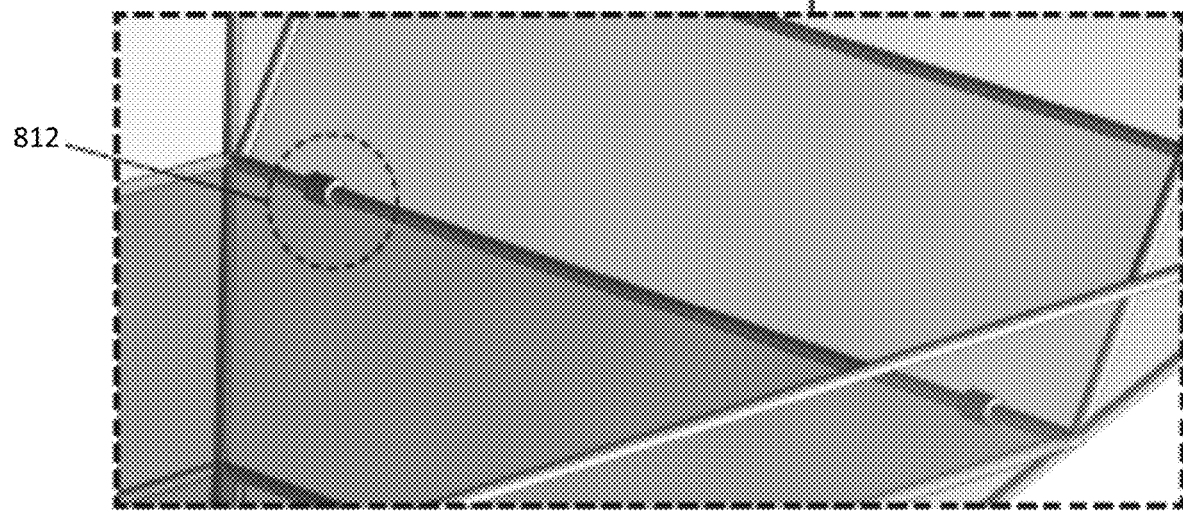

FIG. 8C shows a detailed view of a portion of net assembly 802 including hinge mechanism 812 coupling latch 806 to the frame of net assembly 802 so that it can rotate between the open position shown and a closed position. In some examples, hinge mechanism is a passive mechanism (e.g. a simple hinge) so that latch 806 may move from the open position to the closed position as a result of impact with a target drone and/or the resulting weight of the target drone when it becomes entangled in net 807. In other examples, a hinge mechanism such as hinge mechanism 812 may be actuated to close (e.g. may be spring loaded, pneumatically actuated, electrically actuated, or otherwise moved by some mechanical force). A hinged portion or latch may be spring loaded and latched so that it is unlatched by collision of the target drone and the hinged portion closes or folds down on a target drone (e.g. it may snap closed in the manner of a mouse trap). A closing mechanism (e.g. pneumatic or electromechanical mechanism) may be actuated in response to a signal, for example, a signal from a sensor and/or control circuits, where the signal is generated in response to detection of impact of latch 806 with a target drone. Such a signal may be generated by control circuits of a UAV (e.g. UAV 770), which may generate the signal in response to input from one or more strain gauges, cameras, optical sensors, and/or other sensors. Latch 806 may latch closed (e.g. there may be some mechanism to prevent latch 806 from opening without manual intervention so that it remains closed until it reaches a landing point) and a sensor may detect when it is in the closed or open position so that this information is provided to a user and/or AI circuits.

Figure 8D:
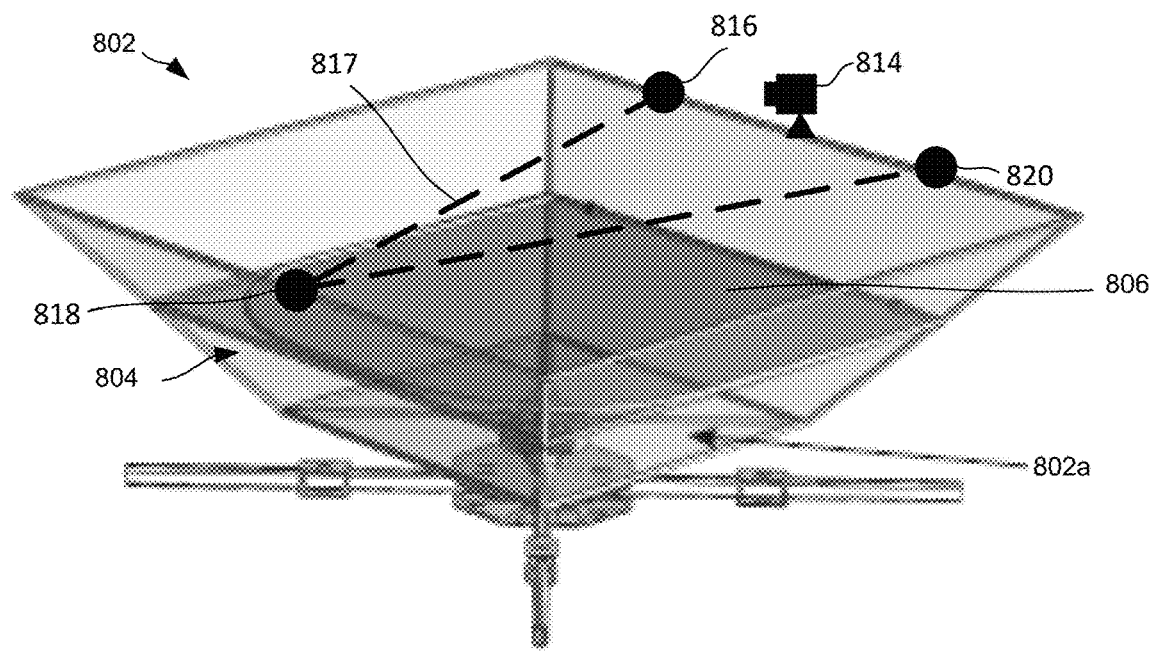

FIG. 8D illustrates net assembly 802 with latch 806 in the closed position lying parallel to bottom portion 802*a* and frame 804. Latch 806 may lie on frame 804 and/or net 810 that extends across frame 804. Thus, when latch 806 closes with a target drone entangled in net 807, the target drone may become further entangled in net 810 and may be enclosed by sides of net assembly 802 and between net 810 below and net 807 of latch 806 above to reduce the probability that the target drone, or fragments of the target drone, could escape and cause damage.

FIG. 8D also shows an example of a camera 814 attached to net assembly 802 to provide FPV flying capability to facilitate capture of a target drone by net assembly 802 attached to a UAV. Camera 814 may look through net 807 when latch 806 is in the open position to facilitate alignment of latch 806 with a target drone. A camera may be mounted at one or more alternative or additional locations (e.g. at the front of net assembly 802 where reflector 818 is located and/or on bottom portion 802*a*.

FIG. 8D also shows light source 816 (e.g. LED) generating a light beam 817 which extends to reflector 818 and is reflected back to light sensor 820 (e.g. photodiode). Interruption of beam 817 may occur when a target drone blocks beam 817 (e.g. when entangled in net 807 and/or entanglement net 810 and this interruption be indicated by an output of light sensor 820, which may be provided to control circuits of UAV 770 and/or to a remote control. In another example, latch 806 may include a reflector so that a target drone impacting latch 806 blocks a beam, which is detected by and optical sensor (light sensor 820) and in response, control circuits may trigger closing of latch 806 by an actuator.

Figure 8E:
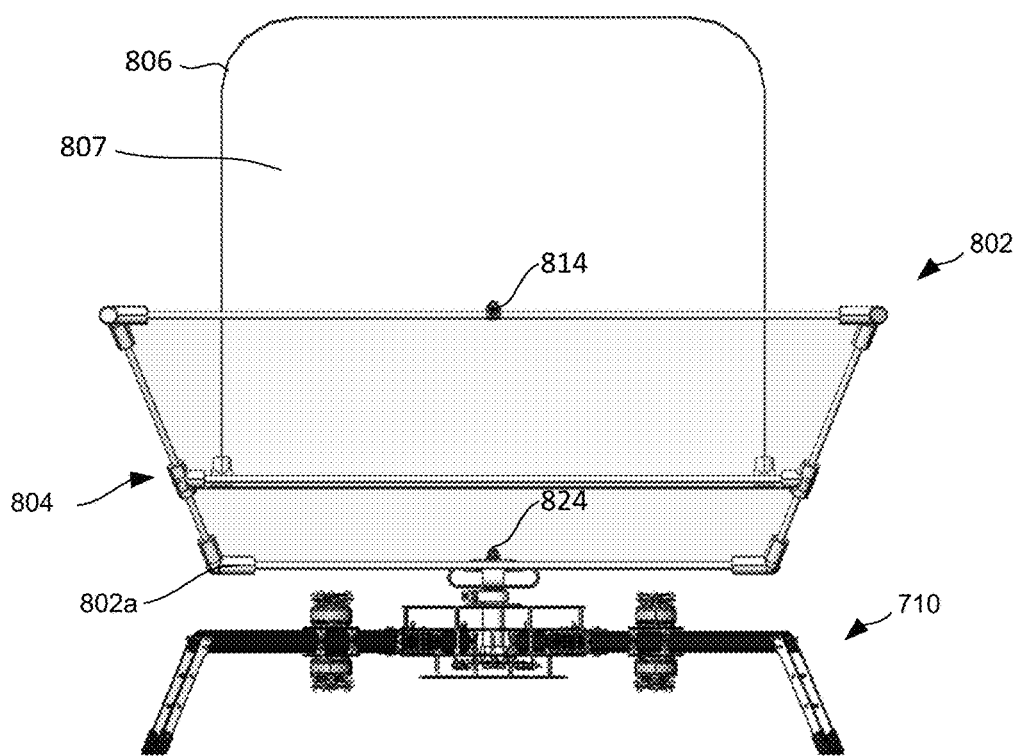

FIG. 8E shows net assembly 802 attached to UAV 710 from the front, including latch 806 in the open position so that net 807 is exposed and is likely to catch a target drone. Camera 814 and camera 824 (mounted to the back of bottom portion 802*a*) look forward (towards the viewer in this perspective) so that they can be used to guide UAV 710 and net assembly 802 to intercept a target drone and/or provide information about a target drone that may be used to modify flying parameters of the C-UAV. While not shown in FIG. 8E, elastic elements (e.g. similar to elastic elements 790*a-b* of FIG. 7A) may extend between corners of bottom portion 802*a* and arms of UAV 710. In some cases, a latch such as latch 806 may be removable so that a net assembly can be converted from a dynamic configuration (e.g. as shown in FIG. 8E) to a static configuration that does not have a latch. For example, a latch may be added to net assembly 772 described above to change its configuration to a dynamic configuration.

Figure 8F:
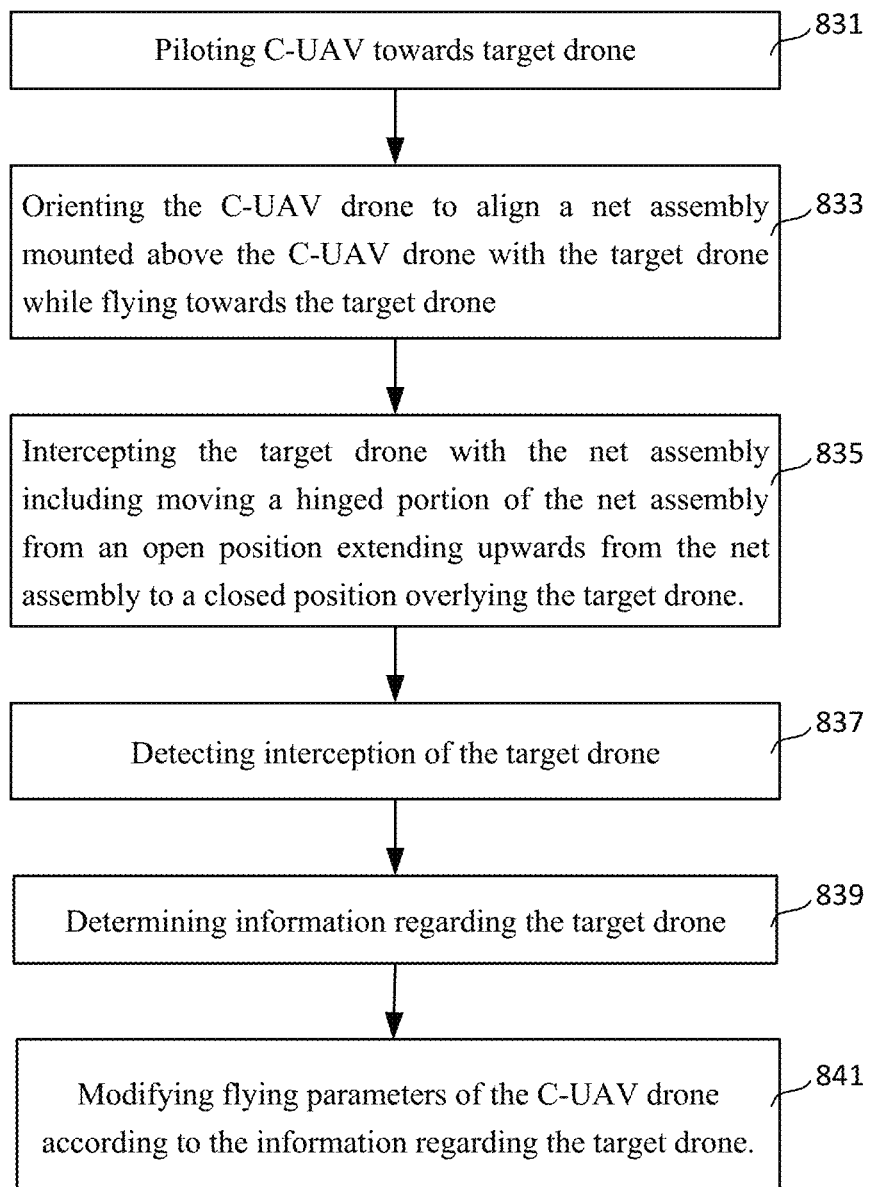

FIG. 8F illustrates an example of a method of using a C-UAV configured with a net assembly that includes a latch (e.g. net assembly 802 with latch 806 as shown in FIG. 8E). The method includes piloting the C-UAV drone towards the target drone 831, orienting the C-UAV drone to align a net assembly mounted above the C-UAV drone with the target drone while flying towards the target drone 833, and intercepting the target drone with the net assembly including moving a hinged portion (e.g. latch) of the net assembly from an open position extending upwards from the net assembly to a closed position overlying the target drone 835. The method further includes detecting interception of the target drone 837, determining information regarding the target drone 839 (e.g. weight) and modifying flying parameters of the C-UAV drone according to the information regarding the target drone 841.

An example of a drone includes: a drone chassis; a plurality of motors attached to the drone chassis; a plurality of propellers coupled to the plurality of motors; and a net assembly mounted above the drone chassis, the net assembly including an enclosure and a hinged portion that extends upwards from the enclosure in an open position and folds down in a closed position.

The drone hinged portion (latch) may include netting configured to entangle a target drone. The drone may include an entanglement net extending across the enclosure. The enclosure may include a bottom portion, a first side portion, a second side portion, a front portion, and a back portion each having enclosure netting attached to frame members. The bottom portion may include netting formed of monofilament nylon strands of a first diameter having a first spacing, the first side portion, the second side portion, the front portion and the back portion may include netting formed of monofilament nylon strands of a second diameter that is less than the first diameter and have a second spacing that is greater than the first spacing. The net assembly may include a first entanglement net extending across the enclosure and a second entanglement net extending across the hinged portion, the first and second entanglement nets formed of strands of monofilament nylon having a third spacing that is greater than the second spacing. The monofilament nylon strands of the bottom portion, the first side portion, the second side portion, the front portion and the back portion may be tightly strung and the monofilament nylon strands of the first and second entanglement nets may be loosely strung. The drone may include a quick-release mechanism coupling the net assembly to the drone chassis. The drone may include one or more strain gauges attached to one or more frame members of a frame of the net assembly to measure strain of the one or more frame members. The drone may include a dampener coupled to dampen shock or vibration between the net assembly and the drone chassis. The drone may include a plurality of elastic elements coupled between the net assembly and the drone chassis.

An example of a method of intercepting a target drone with a counter-unmanned aerial vehicle (C-UAV) drone includes: piloting the C-UAV drone towards the target drone; orienting the C-UAV drone to align a net assembly mounted above the C-UAV drone with the target drone while flying towards the target drone; and intercepting the target drone with the net assembly including moving a hinged portion of the net assembly from an open position extending upwards from the net assembly to a closed position overlying the target drone.

The may include: detecting interception of the target drone; determining information regarding the target drone; and modifying flying parameters of the C-UAV drone according to the information regarding the target drone. The hinged portion may be coupled to an actuator configured to move the hinged portion from the open position to the closed position in response to detecting interception of the target drone. The hinged portion may be configured to move from the open position to the closed position using at least one of: weight of the target drone and a latched spring that is unlatched by collision of the target drone and the hinged portion. Intercepting the target drone may include entangling propellers of the target drone in an entanglement net of the hinged portion. The net assembly may include one or more: strain gauges, cameras, and optical sensors.

An example of a Counter-Unmanned Aerial Vehicle (C-UAV) quadcopter includes: a quadcopter chassis; a first motor, a second motor, a third motor, and a fourth motor attached to the quadcopter chassis; a first propeller, a second propeller, a third propeller, and a fourth propeller coupled to the respective first, second, third, and fourth motors; and a net assembly mounted to the quadcopter chassis by a quick-release mechanism, the net assembly extending above the first, second, third, and fourth propellers, the net assembly including an enclosure and a hinged portion, the hinged portion configured to intercept a target drone in an open position and overly the target drone within the enclosure in a closed position.

The C-UAV quadcopter may include: a plurality of strain gauges or optical sensors attached to components of the net assembly to detect presence of the target drone in the net assembly; and one or more cameras mounted to the net assembly for First Person View (FPV) operation of the C-UAV quadcopter for intercepting the target drone. The C-UAV quadcopter may include control circuits configured to receive outputs of the plurality of strain gauges and outputs of the one or more cameras and to adjust flying parameters of the C-UAV quadcopter in response to the outputs.

Forward Dynamic Mount Configuration

While the above Figures illustrate an example of a net assembly that is mounted above a UAV (at a level above the chassis and propellers of the UAV), other configurations are possible. In some examples, a net assembly may be attached to a UAV so that it is at about the same level as the chassis and/or propellers and is laterally displaced from the UAV (e.g. in front or to one side).

Figure 9A:
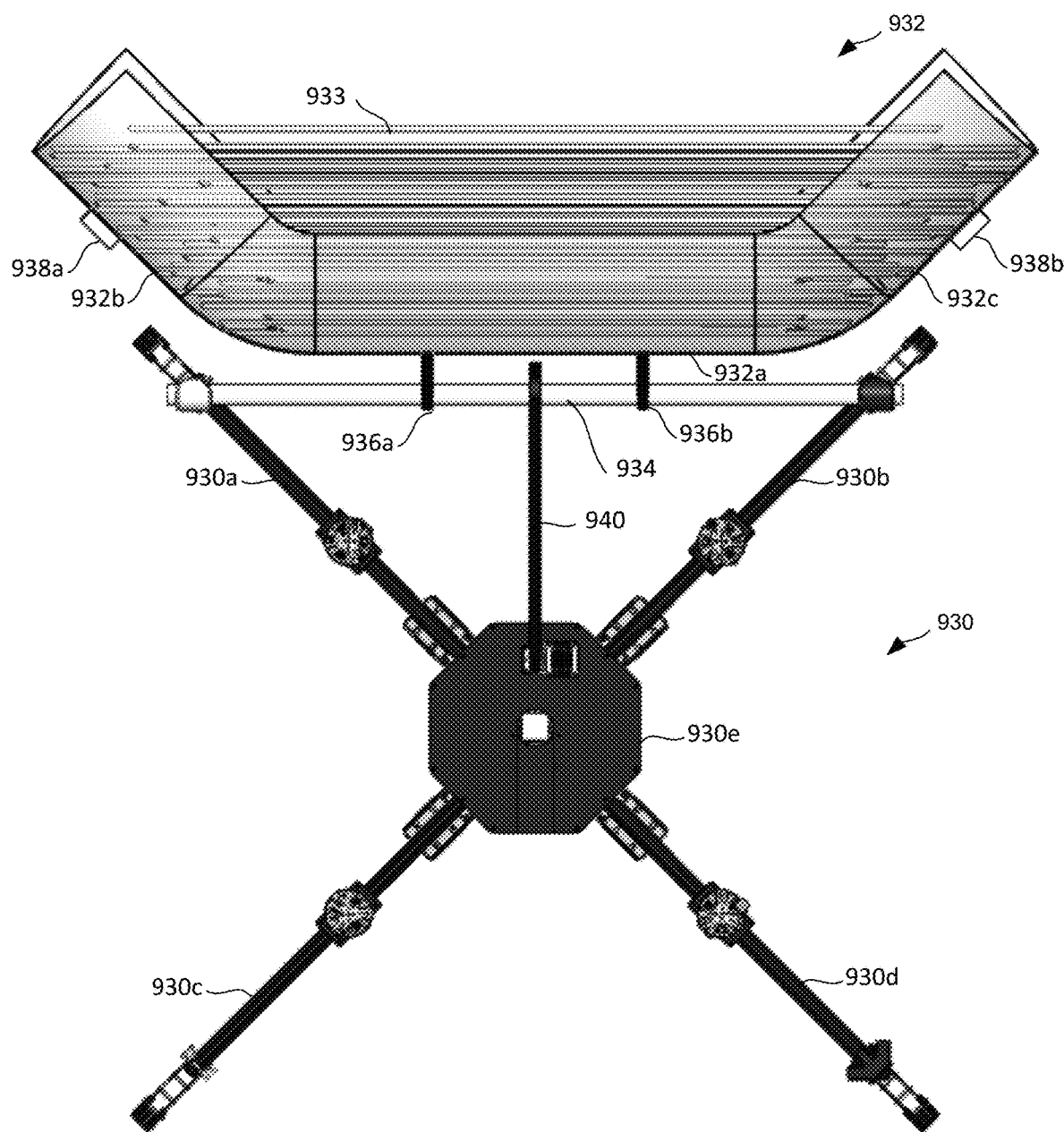
FIGS. 9A-H illustrate aspects of examples of a C-UAV with a rotatable net assembly.

FIG. 9A shows a top-down view of a UAV chassis 930 (additional UAV components including propellers are omitted for clarity) with net assembly 932 mounted in front of UAV chassis 930, i.e. ahead of UAV chassis 930 along the primary direction of travel. While a UAV such as a quadcopter may be capable of travelling in different directions and does not always have the same orientation, a particular orientation may be generally used, or preferred, so that when using this orientation, moving along the primary direction of travel, the net assembly extends ahead of the UAV and thus physically contacts any object (e.g. a target drone) before the UAV.

FIG. 9A shows UAV chassis 930 formed of four arms 930a-d that form a cross (form an X-shape in cross section along the horizontal plane illustrated) with a central portion 930e in the center of the cross. Four motors with respective propellers may be attached to arms 930a-d as previously shown in FIG. 7B (not shown in FIG. 9A for clarity) and other UAV components may be configured as described in any of the previous examples. A rod 934 (or axle) extends between ends of first arm 930a and second arm 930b and is attached to arms 930a-b so that rod 934 can rotate about its axis (i.e. rod 934 may be cylindrical or substantially cylindrical about an axis and may rotate about its axis). First bracket 936a and second bracket 936b attach rod 934 and net assembly 932 in a static manner (e.g. net assembly 932 rotates with rod 934 and is not free to rotate separately from rod 934). In some cases, strain gauges may be attached to brackets 936a-b or integrated with brackets 936a-b (and/or other components such as rod 934, frame elements of net assembly 932, arms 930a-d, etc.) to detect impact of a target drone with net assembly 932 and/or to provide information regarding a target drone after it is intercepted. Rod 934 may be formed of a suitable material and with suitable dimensions so that it is somewhat flexible and may absorb shock of impact of net assembly 932 and/or vibration from a target drone in net assembly 932 so that any such shock or vibration has a reduced effect on UAV chassis 930.

Net assembly 932 includes a net enclosure formed by a central portion 932a that extends parallel to rod 934 in the plane illustrated in FIG. 9A. A first wing portion 932b extends from the left end of central portion 932a and a second wing portion 932c extends from the right end of central portion 932a. Wing portions 932a-b form oblique angles with central portion 932a in this top-down view (e.g. 30-60 degrees). In some cases, other angles may be formed (e.g. wings may be angled at more than 60 degrees, at 90 degrees, or at less than 30 degrees). Strain gauges 938a-b are attached to first and second wing portions respectively in this example. In other examples, strain gauges may be located at different and/or additional locations of net assembly 932. An entanglement net 933 is attached to first and second wing portions 932a-b and extends across the opening along the front of net assembly 932. Central portion 932a, first wing portion 932b and second wing portion 932c may be formed of frame members of suitable material (e.g. carbon fiber, molded plastic, etc.) with enclosure netting attached to the frame members to form a net enclosure as previously described. Enclosure netting and entanglement netting may be configured according to any of the examples above or otherwise. An example of suitable enclosure netting is formed of monofilament nylon strands having a relatively large diameter (e.g. 1.5 mm) and may have relatively narrow spacing (e.g. ¼ inch spacing) between strands. These nylon strands may be tightly strung so that there is some tension on each strand and strands may cross at 90 degrees to form a pattern of squares (e.g. similar to a tennis racquet) or at some other angle to form a pattern of diamonds. Another example of enclosure netting uses monofilament nylon strands having a diameter of 0.5 mm with a spacing of 2 inches between strands and with strands crossing at 90 degrees to form a pattern of squares, or crossing obliquely to form a pattern of diamonds. Entanglement net 933 may be formed of suitable material such as monofilament nylon strands with a diameter of 0.5 mm and a spacing of 4 inches (e.g. wider spacing than enclosure netting). Strands may cross at 90 degrees to form a pattern of squares, may cross obliquely to form a pattern of diamonds, or may be in the form of parallel strands extending between first and second wing portions 923a-b (e.g. without interweaving of strands). Entanglement net 933 may be loose (e.g. hanging down under its own weight and with strands relaxed and hanging from frame members, e.g. attached to ends of wing portions 923a-b.

A belt 940 extends from a motor mounted to central portion 930*e* of UAV chassis 930 and is wound around a wheel attached to rod 934 so that the motor can turn rod 934 using belt 940 and thereby control rotation of rod 934 and net assembly 932. In other examples, a driveshaft, chain, or other component may be used to transmit torque from a motor to a rod or axle to provide controlled rotation of a net assembly. In another example, a pneumatic actuator or other actuator may be used to rotate net assembly 932.

Figure 9B:
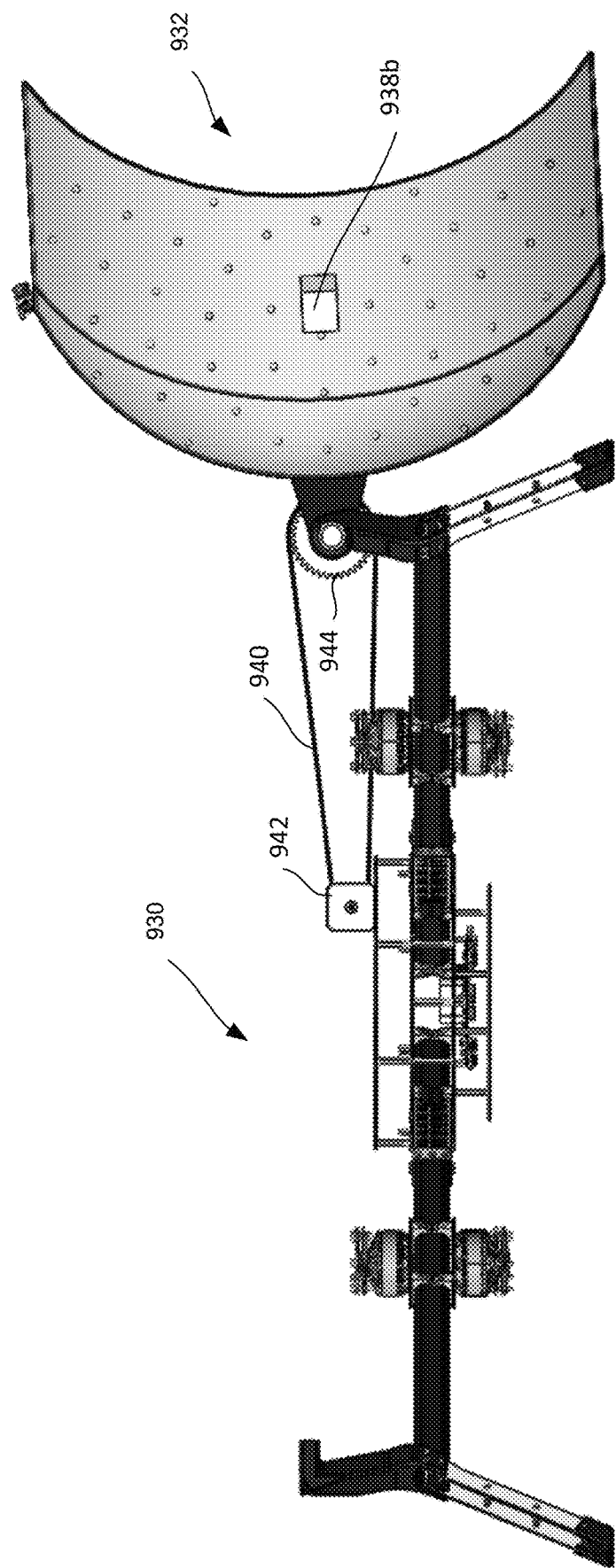

UAV chassis 930 and net assembly 932 are further illustrated in FIG. 9B, which shows a side-on view with the plane of UAV chassis 930 horizontal (e.g. UAV at rest on a horizontal surface). FIG. 9B shows that the enclosure formed by central portion 932*a*, first wing portion 932*b* and second wing portion 932*c* is crescent shaped in cross section so that it has an opening that faces outward from UAV chassis 930 (e.g. is curved so that the concave side of the curve faces away from UAV chassis 930). FIG. 9B also shows motor 942 (e.g. stepper motor, servo motor, or other suitable electric motor that may be controlled by control circuits of a UAV), which drives belt 940. Belt 940 is wound about wheel 944, which is statically (fixedly) attached to rod 934 so that turning wheel 944 causes rod 934 to turn. It will be understood that wheel 944 is concentric with rod 934 and its larger diameter allows motor 942 to more easily turn rod 934 than if belt 940 were directly wound about rod 934 (an alternative arrangement, which may also be used). Motor 942 may be controlled by control circuits of a UAV so that the angle of net assembly 932 with respect to UAV chassis 930 may be controlled and changed during flight (or on the ground). In the view of FIG. 9B, the opening of net assembly 932 faces right (the primary direction of travel in this example) and faces substantially horizontally. This angle may be changed by control circuits controlling motor 942. While not shown in FIG. 9B, net assembly 932 may include a quick release mechanism allowing rapid attachment/detachment from UAV chassis 930.

Figure 9C:
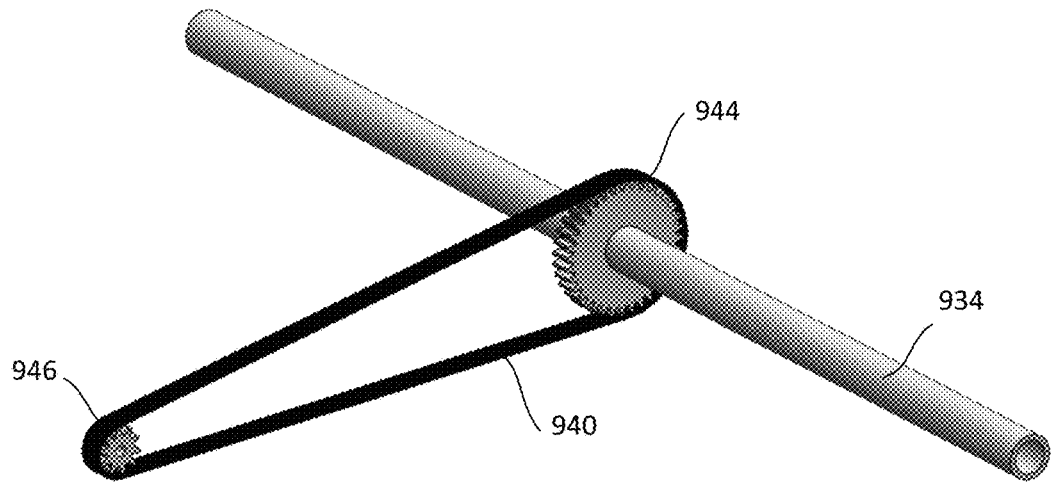

FIG. 9C shows a more detailed view of certain components of the rotation mechanism that orients net assembly 932 including rod 934, wheel 944, belt 940, and wheel 946, which may be attached to motor 942, e.g. attached directly to rotor of an electric motor so that wheel 946 turns with the rotor. As illustrated in FIG. 9C, wheel 944 and wheel 946 may have cogs (or teeth) that engage corresponding features of belt 940 to provide traction and prevent slippage when motor 942 rotates. In other examples, a chain, driveshaft or other component may be used to transmit torque from motor 942 to net assembly 932.

Figure 9D:
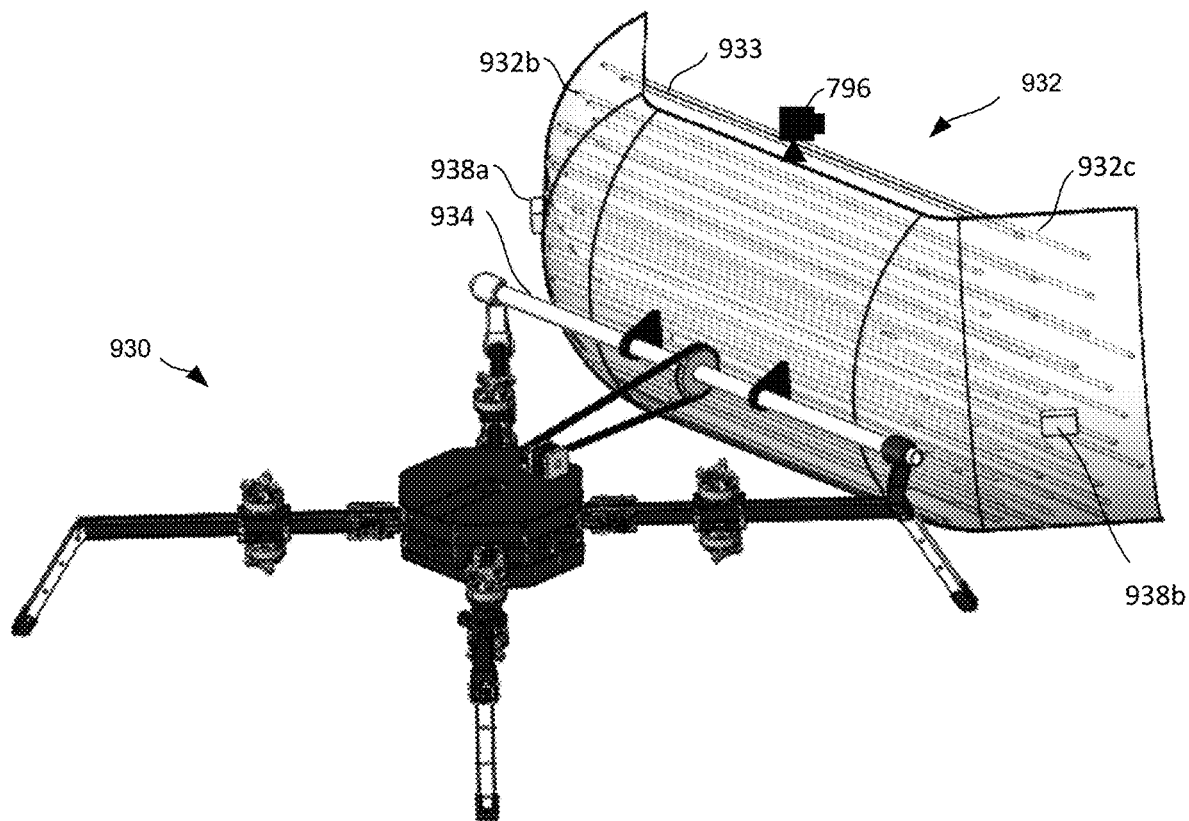

FIG. 9D shows a perspective view (from above right and from behind UAV chassis 930) including net assembly 932, with entanglement net 933 extending across the outward facing opening of net assembly 932 (facing forward along the primary direction of travel). Strain gauges 938*a*-*b* are shown attached to first and second wing portions 932*b*, 932*c* respectively and additional strain gauges may be attached at other locations (e.g. brackets 936*a*-*b*). Rod 934, which connects UAV chassis 930 and net assembly 932 is shown extending parallel to the plane of UAV chassis 930 to allow net assembly 932 to rotate and change its angle with respect to UAV chassis 930. Also shown in FIG. 9D is camera 948, which is attached to a frame member of net assembly 932 so that it is directed forward along the primary direction of travel and may be used to facilitate FPV flying. More than one camera may be mounted to net assembly 932 including paired cameras forming stereoscopic cameras that may be used by CV circuits. Strain gauges such as strain gauges 938*a*-*b*, cameras such as camera 796, and other sensors (e.g. optical sensors) may detect interception of a target drone and/or may provide signals used to determine information regarding the target drone that may be used to modify flying parameters of a C-UAV according to the information.

Figure 9E:
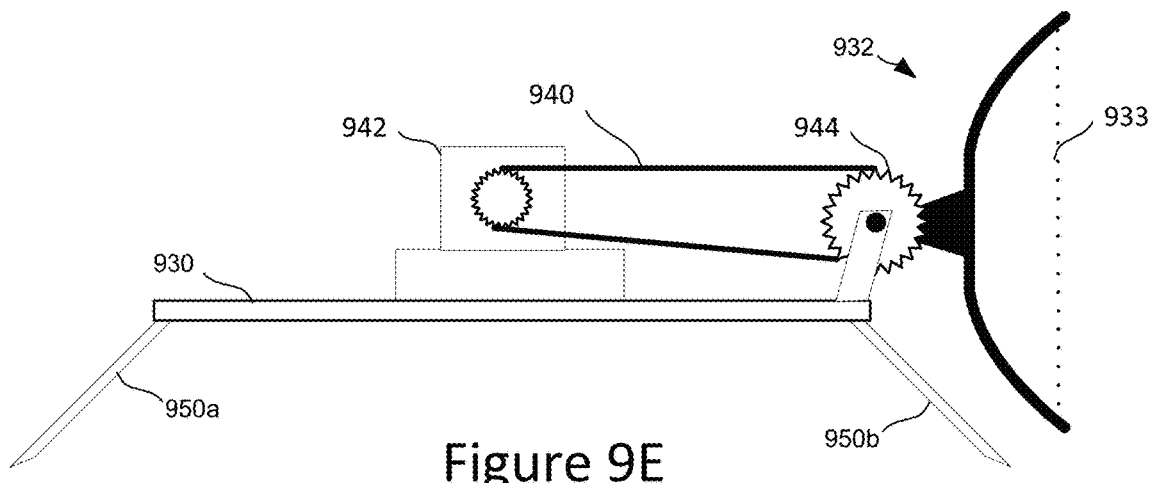
Figure 9F:
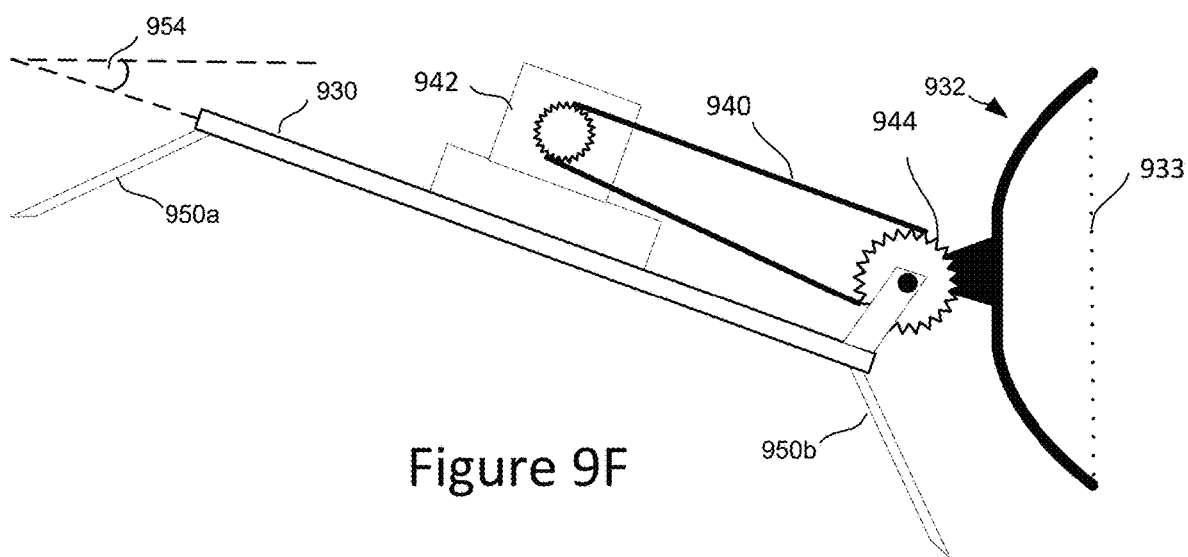

FIGS. 9E-F illustrate an example of a method of operation that includes rotating net assembly 932 about the axis of rod 934 to maintain a desired orientation of net assembly 932. FIG. 9E shows motor 942 attached to UAV chassis 930 so that it can drive belt 940 and thus rotate wheel 944 and thereby rotate net assembly 932. FIG. 9E shows UAV chassis 930 with its plane extending horizontally (e.g. when legs 950*a*-*b* are on a level surface or when hovering). Net assembly 932 may be considered to be aligned with the plane of UAV chassis 930 in this view because the opening of net assembly 932 (opening where entanglement net 933 extends) is facing horizontally outward from UAV chassis 930. Entanglement net 933 may be substantially vertical in this configuration. In some cases, this may be a default position for net assembly 932. At certain times net assembly 932 may be rotated from this position, e.g. to facilitate interception of a target drone and its capture in net assembly 932. For example, during flight, a drone may fly with a negative angle of pitch (e.g. in a nose-down orientation) so that thrust propels the drone forwards as well as upwards. In some cases, net assembly 932 may be rotated to counteract the angle of pitch and maintain the orientation of net assembly 932 so that its opening remains facing substantially horizontally.

FIG. 9F shows UAV chassis 930 having a negative angle of pitch 954 (e.g. during flight towards the right, along its primary direction of travel). In order to compensate for this negative pitch and maintain net assembly 932 in a desired orientation, net assembly 932 may be rotated upwards through an angle equal to the angle of pitch 954 (e.g. if angle of pitch 954 is minus 20 degrees then net assembly 932 may be raised upwards by 20 degrees with respect to the plane of UAV chassis 930). In this way, the opening of net assembly 932 faces along the primary direction of travel with entanglement net 933 substantially vertical as in FIG. 9E and thus may be aligned for interception of a target drone.

Figure 9G:
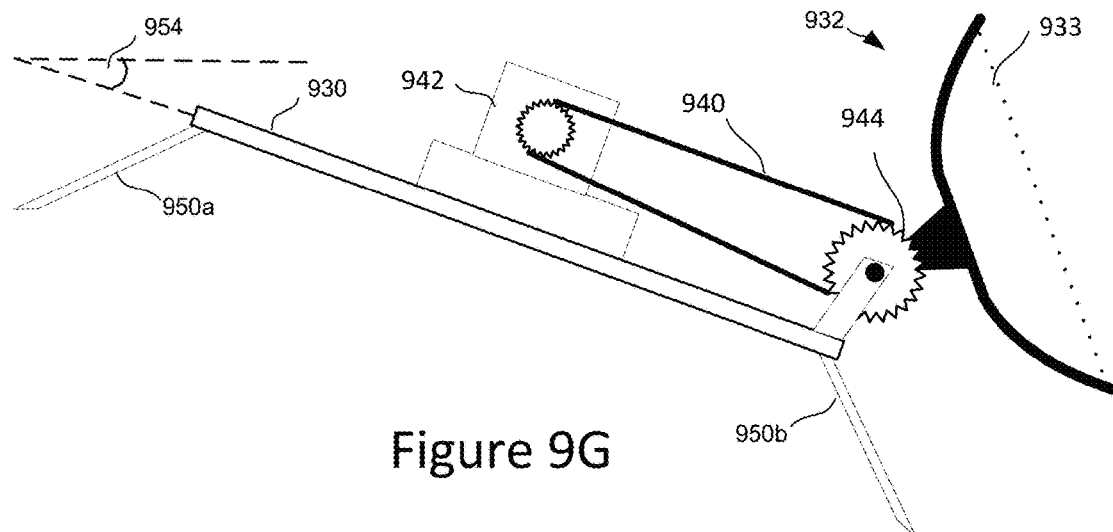

In other examples, it may be desirable to rotate net assembly 932 through a different angle. For example, FIG. 9G shows net assembly 932 angled upwards by an angle that is greater than angle of pitch 954 so that the opening of net assembly 932 where entanglement net 933 extends faces upwards. This may allow interception of a target drone in a manner that scoops the target drone into net assembly 932 and reduces the risk of the target drone (or fragments of the target drone) dropping. This configuration may also facilitate approaching a drone from a non-horizontal angle (e.g. a C-UAV drone may approach a drone at an angle from below or above and net assembly 932 may be rotated accordingly).

Figure 9H:
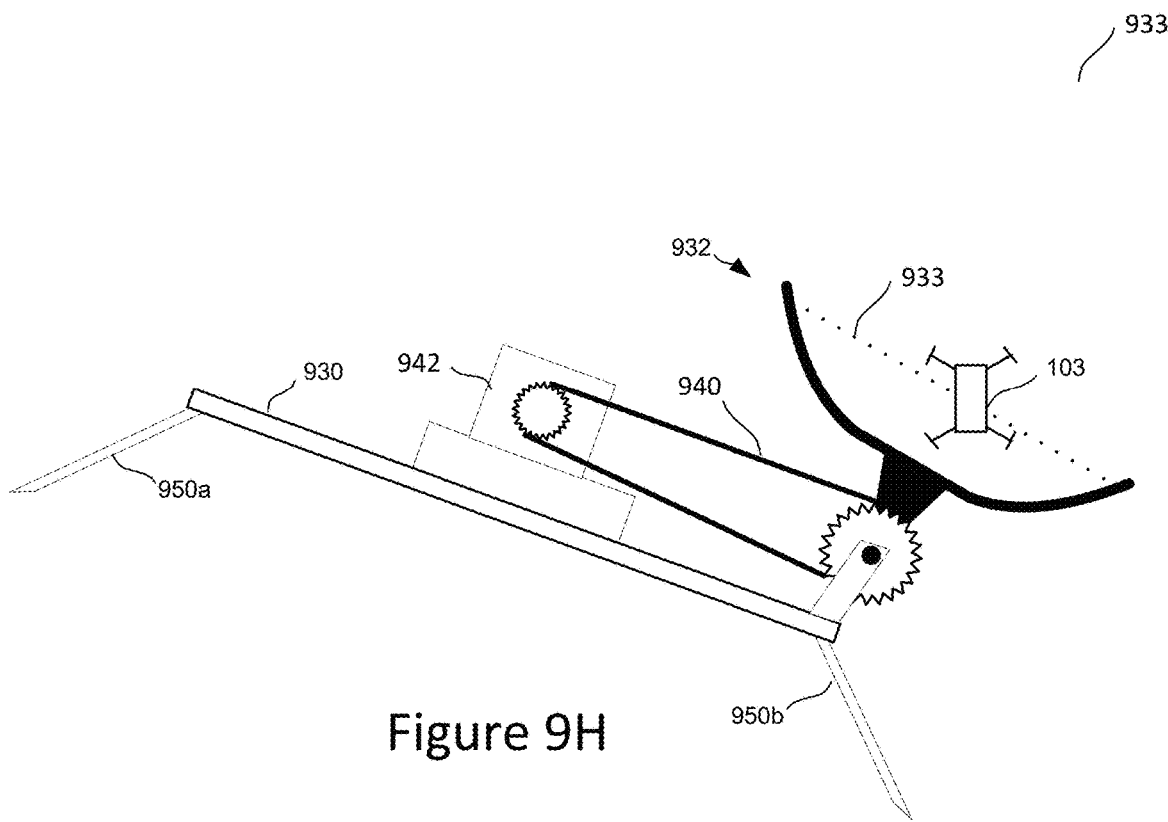

In addition to facilitating interception of a target drone, rotation of net assembly 932 may be used during and after interception to facilitate maintaining a captured target drone in place. FIG. 9H illustrates an example of target drone 103 captured in net assembly 932 (e.g. entangled in entanglement net 933. Net assembly 932 is angled upwards in this example so that it opens upwards and thus extends below target drone 103. This may reduce the risk that target drone 103 falls (or that any fragments fall) and thereby improve safety. When interception of a target drone is detected (e.g. from signals produced by one or more strain gauge, camera, optical sensor, or other sensor) control circuits may cause motor 942 to increase the angle of tilt of net assembly 932 as illustrated so that a target drone is securely held. While this example shows a rotating net assembly, a static net assembly may be similarly mounted to the front of a UAV, e.g. the rotation mechanism may be omitted in some examples.

Figure 10:
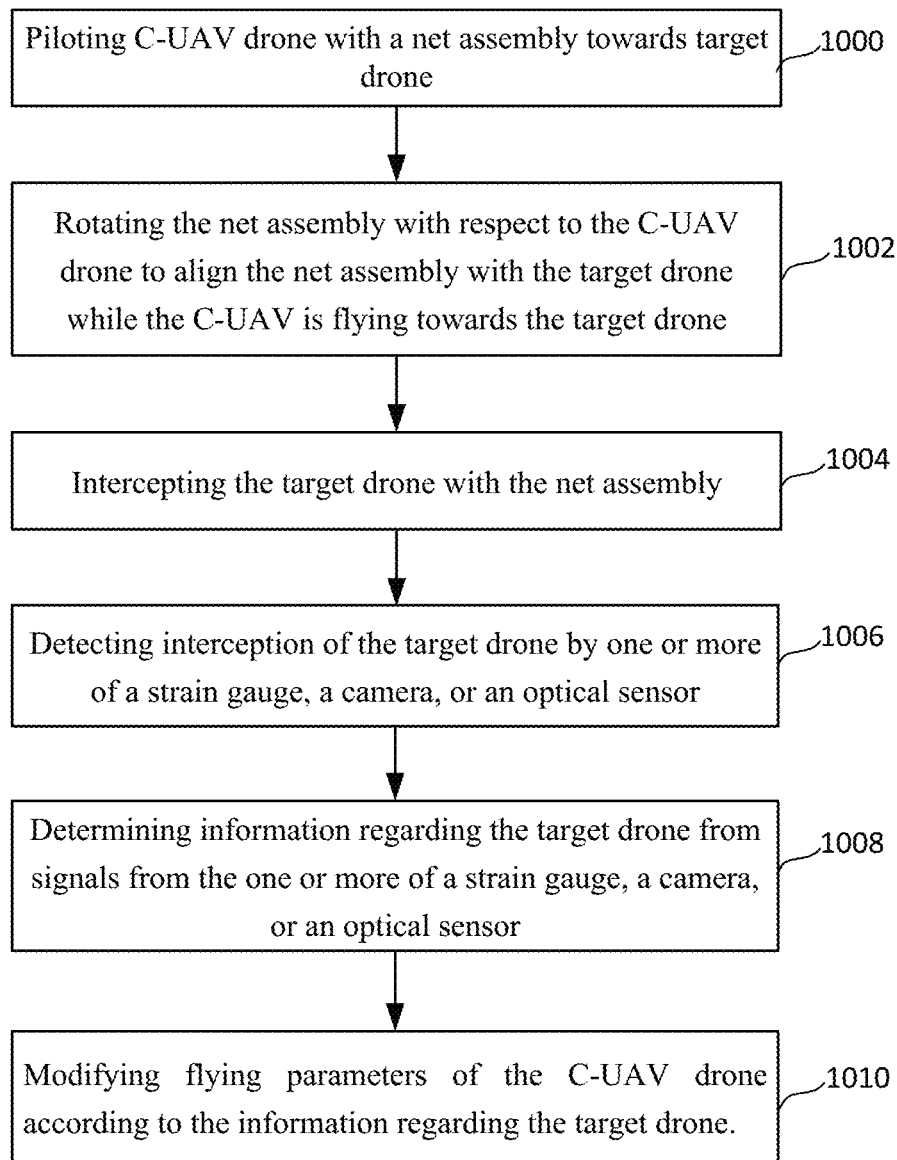
FIG. 10 illustrates a method of operating a C-UAV with a rotatable net assembly.

FIG. 10 illustrates a method that may be implemented using a C-UAV drone that has a rotatable net assembly (e.g. net assembly 932). The method includes piloting the C-UAV drone with a net assembly towards the target drone 1000, rotating the net assembly with respect to the C-UAV drone (e.g. using a motor attached to the C-UAV chassis) to align the net assembly with the target drone while the C-UAV is flying towards the target drone 1002 (e.g. to counteract negative pitch of the C-UAV) and intercepting the target drone with the net assembly 1004 (e.g. entangling the target drone in an entanglement net). The method further includes detecting interception of the target drone by one or more of a strain gauge, a camera, or an optical sensor 1006, determining information regarding the target drone from signals from the one or more of a strain gauge, a camera, or an optical sensor 1008, and modifying flying parameters of the C-UAV drone according to the information regarding the target drone 1010.

An example of a drone includes: a drone chassis extending along a plane; a plurality of motors attached to the drone chassis; a plurality of propellers coupled to the plurality of motors; and a net assembly mounted to the drone chassis, the net assembly including: a net enclosure rotatably mounted such that an outward facing opening of the enclosure is rotatable about an axis of rotation that is parallel to the drone chassis.

The drone may include a rotation mechanism configured to rotate the net enclosure with respect to the plane of the drone chassis. The rotation mechanism may include: a rod extending between arms of the drone chassis, the rod is statically attached to the net enclosure and rotatably attached to the drone chassis; and a motor coupled to the rod to control rotation of the rod and net enclosure with respect to the drone chassis. The motor may be mounted in a central portion of the drone chassis and may be coupled to the rod by a belt extending about a wheel that is attached to and concentric with the rod. The enclosure may be mounted laterally with respect to the drone chassis such that the plane of the drone chassis extends through the enclosure. The outward facing opening of the enclosure may be oriented along a primary direction of travel of the drone. The enclosure may include: a central portion that extends parallel to the axis of rotation between a first end and a second end and is substantially crescent shaped in cross section along a plane perpendicular to the axis of rotation; and first and second wing portions that extend outward from the first end and the second end of the central portion at an oblique angle to the central portion. The central portion and the first and second wing portions may include a frame and enclosure netting attached to the frame. The net assembly may include an entanglement net attached to the first and second wing portions, the entanglement net extending across the outward facing opening. The enclosure netting may be formed of strands of monofilament nylon having a first spacing and first tension and the entanglement net may be formed of strands of monofilament nylon having second a spacing that is greater than the first spacing and second tension that is less than the first tension.

An example of a method of intercepting a target drone with a counter-unmanned aerial vehicle (C-UAV) drone includes: piloting the C-UAV drone with a net assembly towards the target drone; rotating the net assembly with respect to the C-UAV drone to align the net assembly with the target drone while the C-UAV is flying towards the target drone; and intercepting the target drone with the net assembly.

When the C-UAV is flying towards the target drone it may have a negative pitch and rotating the net assembly according to the method may at least partially counteract the negative pitch of the C-UAV. The net assembly may include an opening along a primary direction of travel of the C-UAV and intercepting the target drone may include aligning the opening with the target drone while the C-UAV is flying such that the target drone enters the opening. The net assembly may include an entanglement net extending across the opening and intercepting the target drone may include entangling the target drone in the entanglement net. The C-UAV may include a chassis extending along a plane and rotating the net assembly with respect to the C-UAV may include using a motor attached to the chassis to rotate the net assembly about an axis of rotation that extends parallel to the plane. The method may further include: detecting interception of the target drone by one or more of a strain gauge, a camera, or an optical sensor; determining information regarding the target drone from signals from the one or more of a strain gauge, a camera, or an optical sensor; and modifying flying parameters of the C-UAV drone according to the information regarding the target drone.

An example of a Counter-Unmanned Aerial Vehicle (C-UAV) quadcopter includes: a quadcopter chassis extending along a plane, the quadcopter chassis having a first arm, a second arm, a third arm, and a fourth arm forming an X-shape in cross section along the plane; a first motor, a second motor, a third motor, and a fourth motor respectively attached to the first, second, third, and fourth arms of the quadcopter chassis; a first propeller, a second propeller, a third propeller, and a fourth propeller coupled to the respective first, second, third, and fourth motors; a net assembly rotatably attached to ends of the first and second arms of the quadcopter chassis; and a motor attached to the quadcopter chassis, the motor coupled to the net assembly to rotate the net assembly with respect to the plane of the quadcopter chassis.

The net assembly may include: a central portion that extends parallel to an axis of rotation of the net assembly between a first end and a second end and is substantially crescent shaped in cross section along a plane perpendicular to the axis of rotation; first and second wing portions that extend outward from the first and second ends of the central portion at an oblique angle to the central portion; and an entanglement net attached to the first and second wing portions, the entanglement net extending parallel to the central portion and in front of the central portion along a primary direction of travel of the C-UAV. The C-UAV quadcopter may include: one or more strain gauges or optical sensors attached to components of the net assembly to detect presence of a target drone in the net assembly; one or more cameras mounted to the net assembly for First Person View (FPV) operation of the C-UAV for intercepting the target drone; and control circuits configured to receive outputs of the one or more strain gauges or optical sensors and outputs of the one or more cameras and to adjust flying parameters of the C-UAV quadcopter in response to the outputs. The control circuits may be further configured to determine pitch of the C-UAV and control the motor to rotate the net assembly to counteract the pitch such that the net assembly is substantially aligned for interception of a target drone.

Collapsible Top-Mount Configuration

Figure 11A:
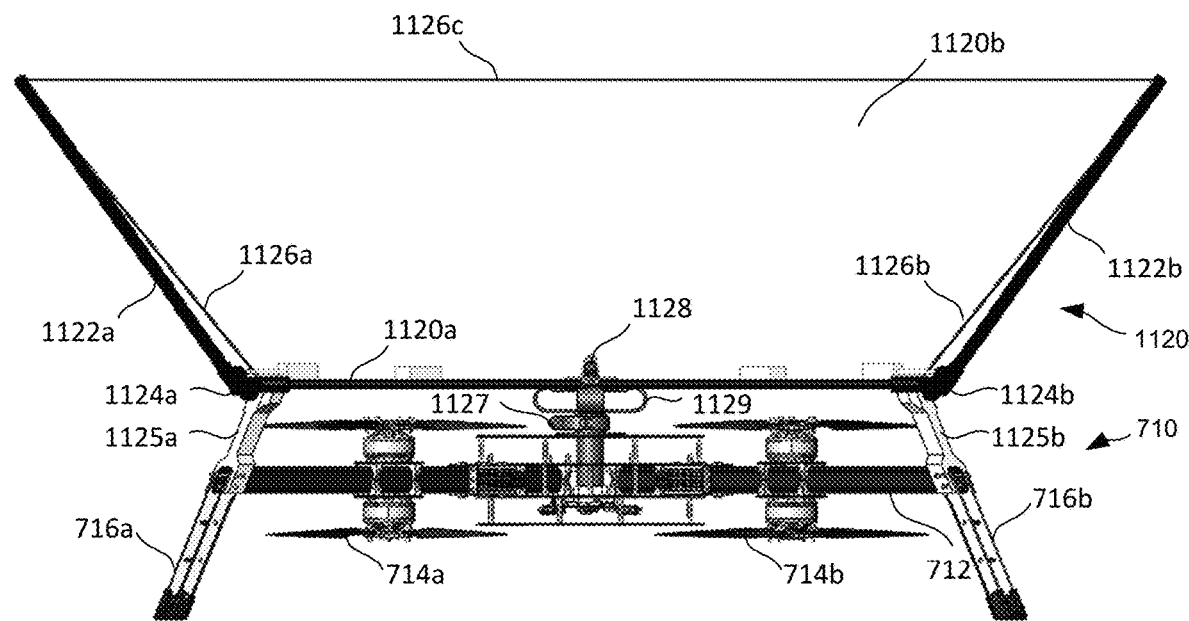
FIGS. 11A-J illustrate aspects of examples of a C-UAV with a collapsible net assembly.

FIG. 11A shows an example of a top-mounted net assembly 1120 that may be mounted to a UAV (e.g. UAV 710 as shown here, or another UAV such as any of the UAVs previously discussed) that may be configured for C-UAV operation so that it extends above propellers of the UAV (e.g. in a manner similar to net assembly 722 and net assembly 802). Net assembly 1120 includes a bottom portion 1120a (floor) that is similar to bottom portions 772a and 802a as previously shown and may include frame members forming a square with cross bars between corners of the square in an X configuration (e.g. as shown in FIG. 7B). One or more strain gauges may be attached to cross bars of bottom portion 1120a (e.g. as illustrated in FIG. 7F) and/or other frame members of net assembly 1120. Bottom portion 1120a may be similarly aligned with a UAV and may be similarly attached using a dampener 1129 (e.g. like dampener 786), elastic elements 1125a-b (e.g. similar to elastic elements 790a-b), and a quick release component 1127 (similar to quick release component 784) coupling net assembly 1120 to chassis 712 of UAV 710 as illustrated in FIGS. 7H-I. Net assembly 1120 is generally symmetric from front to back and from side to side so that (unlike net assembly 722) the front, back, and side portions are similar in size and shape. Thus, while FIG. 11A shows net assembly 1120 and UAV 710 from the front, these may look similar in side-view or from the rear. While UAV 710 includes lower propellers 714a-b in addition to propellers over quadcopter chassis 712 (and includes legs 716a-b to provide clearance) net assembly 1120 may be used with a wide variety of UAVs and the example shown here is for illustration only (e.g. different quadcopters, drones, UAVs may be equipped with net assembly 1120).

In addition to bottom portion 1120a, net assembly 1120 includes front portion 1120b, which extends between first upright frame member 1122a and second upright frame member 1122b. Front portion 1120b may be attached to the tops of first and second upright frame members 1122a-b and may also be attached to bottom portion 1120a at locations inboard of where first and second upright frame members 1122a-b attach to bottom portion 1120a by means of articulating joints 1124a and 1124b respectively. Articulating joints 1124a-b (e.g. hinges, flexible couplings, or other articulating joints) allow upright frame members to articulate inwards by rotating (inwards towards the central axis of net assembly 1120, which extends vertically from the center of bottom portion 1120a) from the open position shown (forming an angle of approximately 120 degrees with respect to bottom portion 1120a) to a closed position (e.g. less than 90 degrees, for example, 30 degrees or less). To provide force to move upright frame members 1122a-b, one or more elastic components may be provided in net assembly 1120. For example, FIG. 11A shows elastic components 1126a and 1126b extending along edges of front portion 1120b such that they exert force on upright frame members 1122a-b that can help to pull upright frame members 1122a-b inwards. In addition, elastic component 1126c extends along the top of front portion 1120b and also exerts force on tops of upright frame members 1122a-b that tends to pull them inwards (i.e. tends to rotate them about articulating joints 1124a-b so that they converge.

Figure 11B:
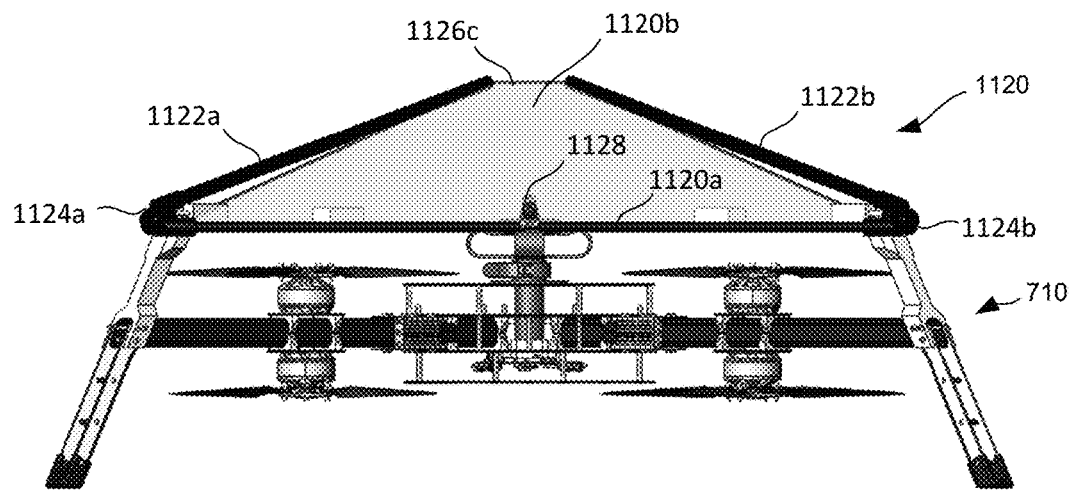

FIG. 11B illustrates net assembly 1120 in a closed position with upright frame members inclined inwards (approximately 30 degrees from bottom portion 1120a). Articulating joints 1124a-b allow upright frame members 1122a-b to articulate between the open position of FIG. 11A to the closed position of FIG. 11B and elastic components (or other components such as springs, magnets, pneumatic actuators, electromechanical actuators, or other actuating mechanisms) provide force to move upright frame members 1122a-b and thus move front portion 1120b. In addition, side and back portions may be similarly moved between positions so that an enclosure that is formed by front, back, and side portions may have a relatively large top opening in the open position and this opening may be reduced in the closed position. In this way, a target drone may be captured within such an enclosure, thereby preventing escape of the target drone and/or portions of the drone (e.g. fragments resulting from collision).

Changing from the open position to the closed position may be triggered by a triggering event such as detection of a target drone in, or in close proximity to net assembly 1120. Components such as one or more camera, one or more strain gauge, one or more sensor, or other component may provide signals that are used to detect the presence of a drone in proximity to net assembly 1120 (e.g. in a position where closing net assembly 1120 results in capture of the target drone).

One or more camera may be mounted to net assembly 1120. For example, FIGS. 11A-B show camera 1128 attached to the center of bottom portion 1120a (e.g. where cross beams intersect). Alternatively or additionally, cameras may be placed at other locations on net assembly 1120 and/or quadcopter 710. In some cases, pairs of cameras are used to form stereoscopic cameras (e.g. for use with CV and AI control as described above). Camera 1128 may be used to fly drone 710 (e.g. providing FPV ability) and/or may be used to detect interception of a target drone.

One or more strain gauge may be mounted to net assembly 1120. For example, strain gauges may be attached to cross beams of bottom portion 1120a (e.g. as shown in FIG. 7F). In an example, strain gauges may be integrated with articulating joints such as articulating joints 1124a-b so that when force is applied on an upright frame member, a strain gauge detects the force, which may be used as an indicator that a target drone has been intercepted. It will be understood that (in this and other net assembly configurations) an output from a single strain gauge may be sufficient to indicate interception of a target drone in some cases. In some cases, outputs from multiple strain gauges may be combined to indicate interception of a target drone. For example, strain gauges may be averaged, more than a predetermined number of strain gauges may reach a threshold output to indicate interception, differences between strain gauge outputs may be used, or strain gauge outputs may be combined in some other way. Strain gauge outputs may be combined with one or more camera output and/or sensor output so that detection of interception may be based on multiple outputs using one or more different technologies.

Sensors, such as optical sensors may be used to detect a target drone. For example, an optical beam may extend across net assembly 1120 so that interruption of the beam indicates interception of a target drone. In other examples, reflection of a beam (optical, radar, lidar, sonic or other beam) from a target drone may be used to detect interception.

Figure 11C:
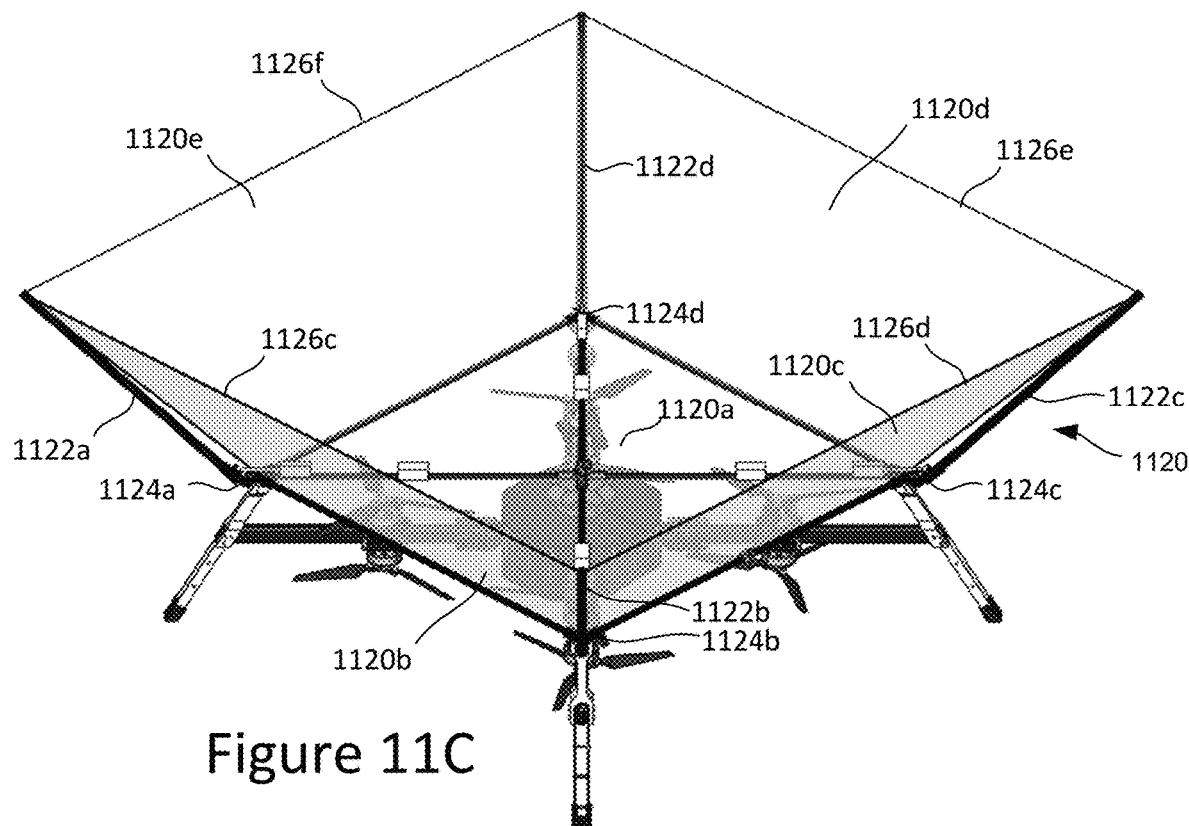
Figure 11D:
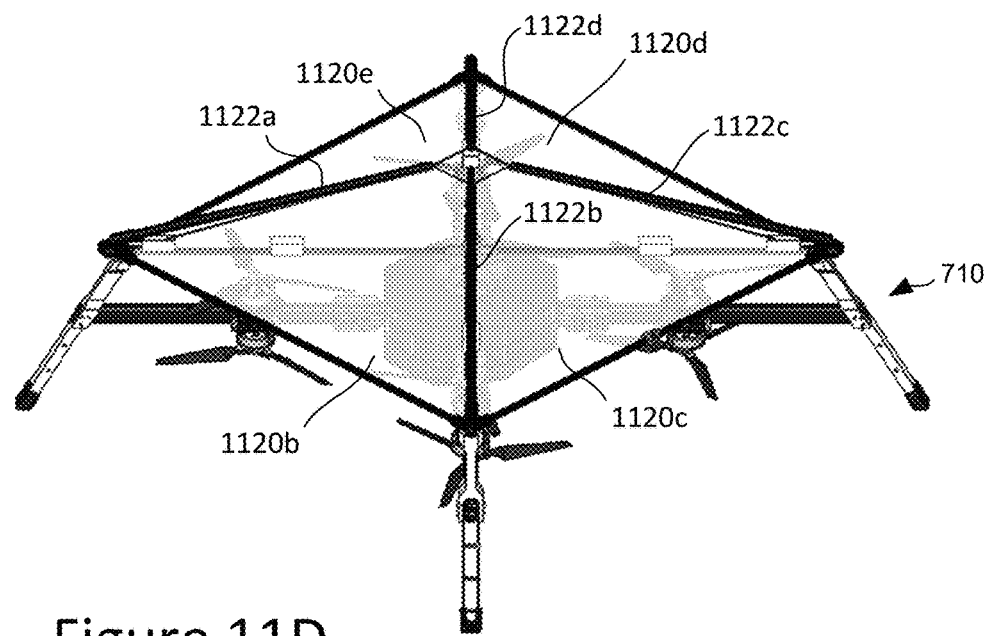

FIGS. 11C-D provide further illustration of net assembly 1120 in the open and closed positions respectively showing additional portions of net assembly 1120 that were not visible in FIGS. 11A-B. In addition to first and second upright frame members 1122a-b shown in FIGS. 11A-B, FIGS. 11C-D show third upright frame member 1122c and fourth upright frame member 1122d coupled to bottom portion 1120a by articulating joints 1124c and 1124d respectively so that these too are articulating upright frame members. Each articulating joint 1124a-d allows its corresponding upright frame member to rotate inwards. Also shown in FIGS. 11C-D are a first side portion 1120c extending between the second upright frame member 1122b and third upright frame member 1122c, a back portion 1120d extending between the third upright frame member 1122c and fourth upright frame member 1122d, and a second side portion 1120e extending between the fourth upright frame member 1122d and the first upright frame member 1122a. Elastic components extend along the tops of these portions. In addition to elastic component 1126c, which extends along the upper edge of front portion 1120b, elastic component 1126d extends along the top of first side portion 1120c, elastic component 1126e extends along the top of back portion 1120d, and elastic component 1126f extends along the top of second side portion 1120e. Elastic components 1126c-f define an opening that extends across the top of net assembly 1120, which allows entry of a target drone into the enclosure formed by net assembly 1120. Elastic components 1126c-f (in combination with elastic components 1126a-b and similar elastic components attached to third and fourth upright frame members 1122c-d, which are not visible in this view) pull upright frame members 1122 inwards to transition net assembly 1120 from the open position to the closed position. While no netting extends across the top of net assembly 1120 in this example, in some cases, entanglement netting may extend across the top of net assembly 1120 similarly to entanglement net 972 (and with such entanglement netting, net assembly 1120 may be operated in a static mode, without rotating any frame members, similarly to net assembly 772).

FIG. 11D shows net assembly 1120 in the closed position from the same perspective as shown in FIG. 11A. It can be seen that upright frame members 1122a-d have rotated inwards so that their tops are close together (closer than in the open position and in this example, close to touching). The opening along the tops of portions 1120b-e is reduced from an opening having a first size (larger than bottom portion 1120a and larger than quadcopter 710, e.g. more than two feet wide) that allows a target drone to enter to a smaller second size that does not allow a target drone (or significant parts thereof) to exit (e.g. less than six inches wide).

Figure 11E:
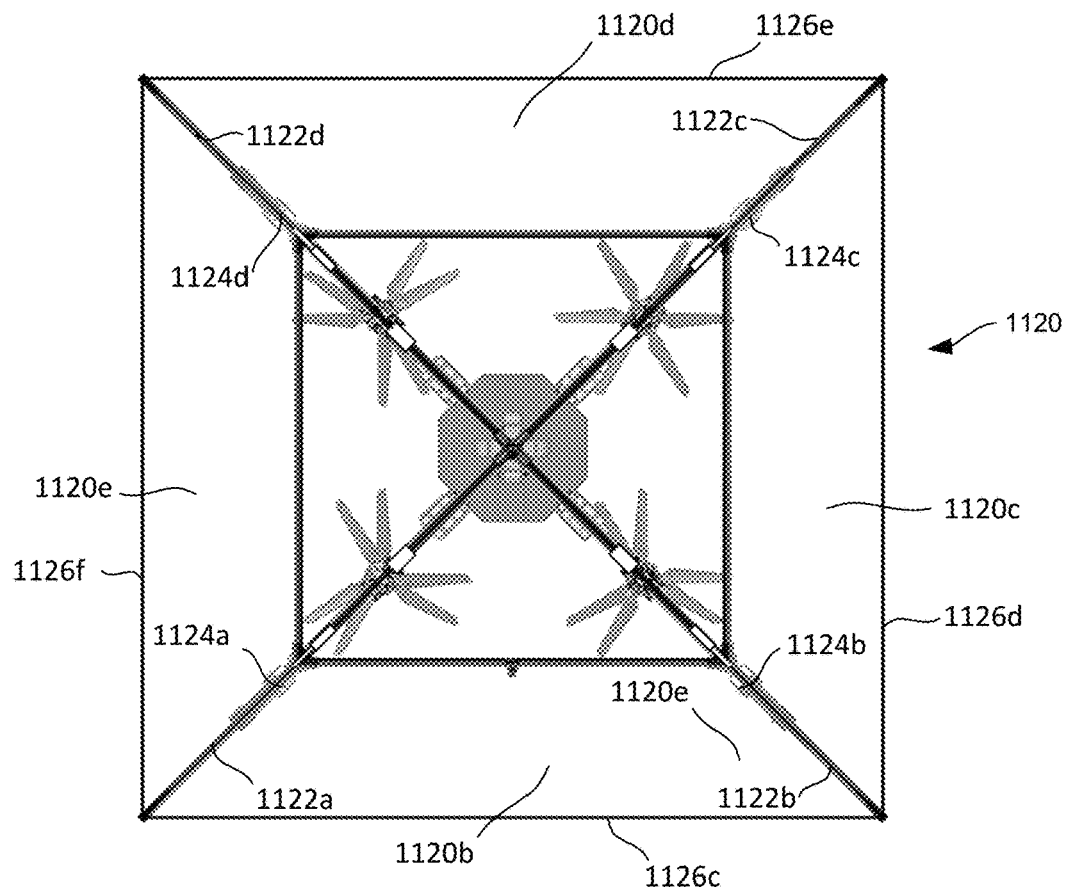
Figure 11F:
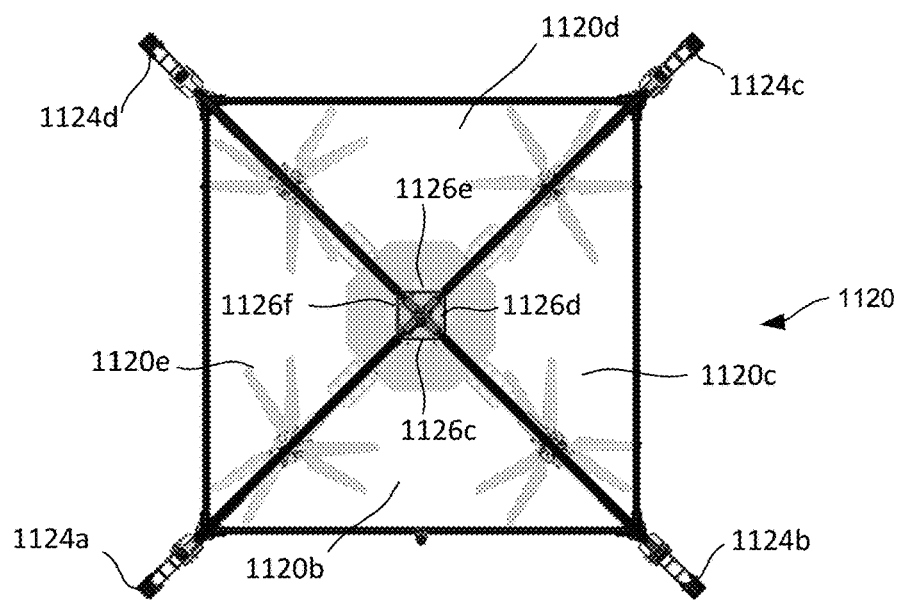

FIGS. 11E-F provide further illustration of net assembly 1120 in top-down view in the open and closed positions respectively. Articulating joints 1124a-d allow corresponding upright frame members 1122a-d to rotate inwards. Also shown in FIGS. 11E-F are front portion 1120b extending between first upright frame member 1122a and second upright frame member 1122b, first side portion 1120c extending between the second upright frame member 1122b and third upright frame member 1122c, back portion 1120d extending between the third upright frame member 1122c and fourth upright frame member 1122d, and a second side portion 1120e extending between the fourth upright frame member 1122d and the first upright frame member 1122a. Elastic components 1126c-f extend along the tops of these portions. Elastic component 1126c extends along the upper edge of front portion 1120b, elastic component 1126d extends along the top of first side portion 1120c, elastic component 1126e extends along the top of back portion 1120d, and elastic component 1126f extends along the top of second side portion 1120e. Elastic components 1126c-f define an opening that extends across the top of net assembly 1120 (opening facing up in this top-down view) and pull upright frame members 1122a-d inwards to transition net assembly 1120 from the open position to the closed position.

FIG. 11F shows net assembly 1120 in the closed position from the same top-down perspective as shown in FIG. 11E. Upright frame members 1122a-d have rotated inwards so that they overlie cross beams of bottom portion 1120a and are not separately visible. The opening formed by elastic components 1126c-f along the tops of portions 1120b-e is reduced from a large opening that allows a target drone to enter to a much smaller opening that does not allow a target drone (or significant parts thereof) to escape. Front portion 1120b, first side portion 1120c, back portion 1120d, and second side portion 1120e become inclined inwards as upright frame members 1122a-d to which they are attached rotate inwards. Front portion 1120b, first side portion 1120c, back portion 1120d, and second side portion 1120e extend over bottom portion 1120a in this top-down view so that an enclosure between bottom portion 1120a below and front portion 1120b, first side portion 1120c, back portion 1120d, and second side portion 1120e above can hold a target drone during and after interception. The shapes of front portion 1120b, first side portion 1120c, back portion 1120d, and second side portion 1120e may change during this transition from a trapezoid shape with an upper edge longer than its lower edge to a nearly triangular shape with a very short upper edge (lower edge where it joins bottom portion 1120a remains the same).

Appropriate material may be used for netting of bottom, front, back and side portions 1120a-e, which are each formed of a panel of netting extending between frame members. For example, bottom portion 1120a may be formed of enclosure netting while front, back, and side portions 1120b-e are formed of entanglement netting. Such enclosure netting and entanglement netting may be configured according to any of the examples above or otherwise. An example of suitable enclosure netting of bottom portion 1120a is formed of monofilament nylon strands having a relatively large diameter (e.g. 1.5 mm) and may have relatively narrow spacing (e.g. ¼ inch spacing) between strands. These nylon strands may be tightly strung so that there is some tension on each strand and strands may cross at 90 degrees to form a pattern of squares (e.g. similar to a tennis racquet) or at some other angle to form a pattern of diamonds. Another example of enclosure netting uses monofilament nylon strands having a diameter of 0.5 mm with a spacing of 2 inches between strands and with strands crossing at 90 degrees to form a pattern of squares or crossing obliquely to form a pattern of diamonds. Entanglement netting used for front, back, and side portions 1120b-e may be formed of suitable material such as monofilament nylon strands with a diameter of 0.5 mm and a spacing of 4 inches (e.g. wider spacing than enclosure netting). Strands may cross at 90 degrees to form a pattern of squares, may cross obliquely to form a pattern of diamonds, or may be in the form of parallel strands extending between upright frame members (e.g. without interweaving of strands). Entanglement net may be loose (e.g. hanging down under its own weight and with strands relaxed and hanging from upright frame members. When in the closed position or transitioning from the open position to the closed position, such entanglement netting may become looser and thus facilitate entanglement of a target drone.

Elastic components such as elastic components 1126a-f may be formed of any suitable elastic material such as elastic chord (e.g. shock chord) and may extend in any suitable configuration. More than one elastic component may be formed from a given length of such elastic chord, e.g. a single piece of chord may extend along the tops of front, back, and side portions 1120*b-e* to form elastic components 1126*c-f*. Other components such as springs, pneumatic actuators, electromechanical actuators, or other actuating mechanisms may be used instead of, or in combination with elastic components to effectuate transition of a net assembly from the open position to the closed position. In general, returning a net assembly from the closed position to the open position may be performed manually, e.g. on the ground, to remove a target drone that is captured. In some cases, a mechanism may be included to return a net assembly to the open position from the closed position without manual intervention. Thus, a C-UAV drone with a net assembly that closes without capturing a target drone may return to the open position without landing (i.e. may transition from the closed position to the open position in-flight) so that the C-UAV may attempt to capture a target drone more than once without landing. Suitable pneumatic, electromechanical or other actuating mechanism may be provided to effectuate such a transition, which may be performed in response to a command from a user (via remote-control) or from control circuits of a UAV (including AI controller circuits).

Closing of net assembly 1120 (transitioning from the open position to the closed position) may occur when a target drone is intercepted (e.g. as detected by one or more of a camera, strain gauge, or sensor) and may be performed by any suitable components. An example of such a component is an electromechanical actuator that may maintain an upright frame member in an open position as appropriate and may change to allow the upright frame member to rotate inwards to the closed position in response to command or signal.

Figure 11G:
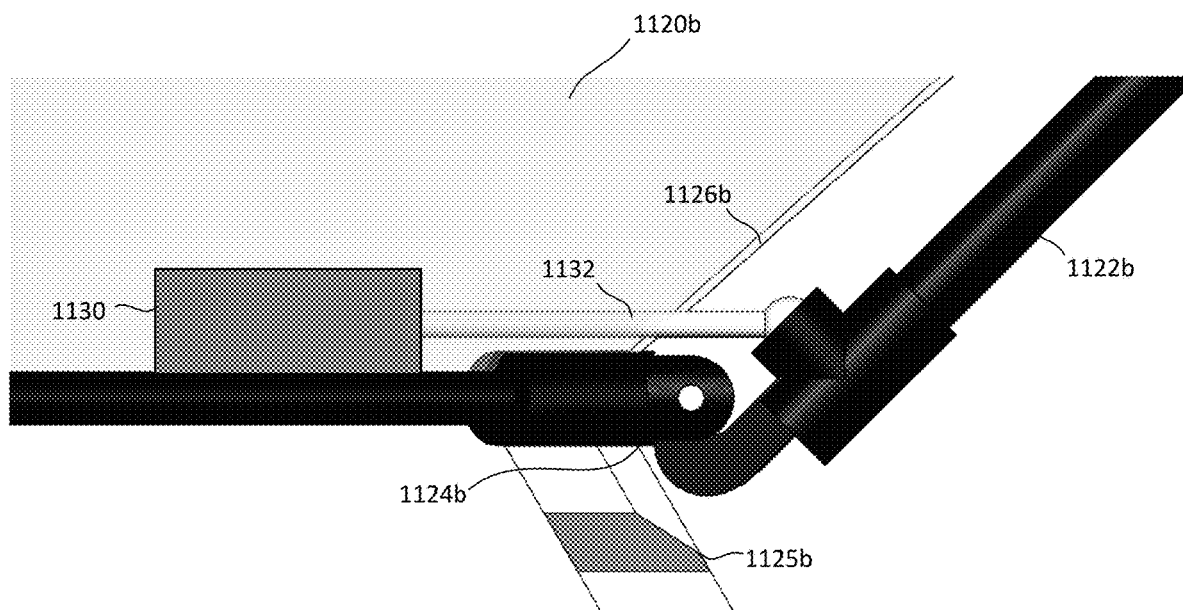
Figure 11H:
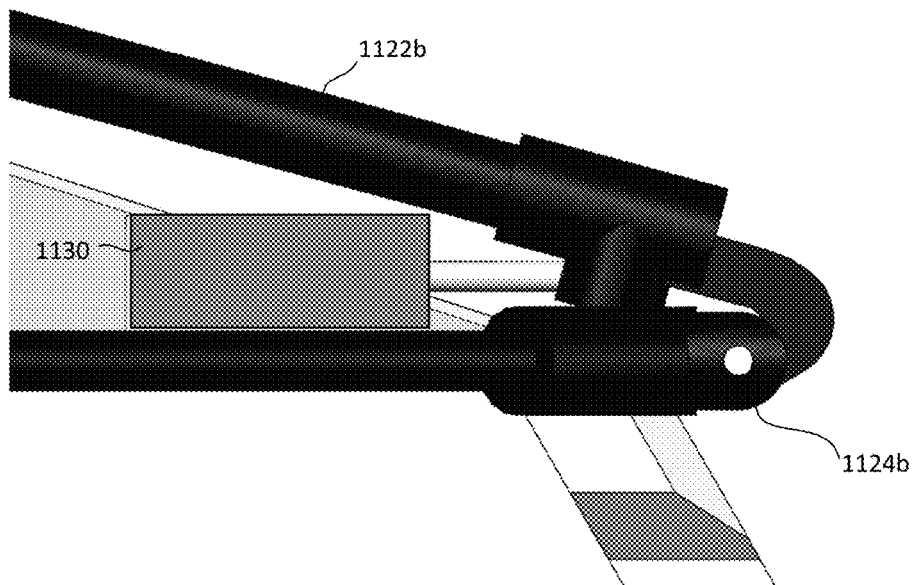

FIGS. 11G-H show details of an example electromechanical actuator that is used in combination with an articulating joint to facilitate transitioning between an open position and a closed position. FIG. 11G shows electromechanical actuator 1130 that is extended so that arm 1132 extends outwards from the body of electromechanical actuator 1130 to maintain upright frame member 1122*b* in the open position. This in turn maintains front portion 1120*b* extending so that it inclines outwards from the center of net assembly 1120. The end of arm 1132 has a ball that engages with a corresponding depression in upright frame member 1122*b* thus physically connecting electromechanical actuator 1130 and upright frame member 1122*b*. Electromechanical actuator 1130 may maintain this position until a signal is received causing electromechanical actuator 1130 to retract arm 1132, thereby allowing elastic component 1126*b* and other elastic components to rotate the top of upright frame member 1122*b* inwards about articulating joint 1124*b*.

FIG. 11H shows upright frame member 1122*b* in the closed position (corresponding to FIG. 11B), with arm 1132 retracted to allow elastic components to pull upright frame member 1122*b* inwards. It will be understood that all upright frame members may have similar electromechanical actuators so that all upright frame members may rotate at the same time thereby collapsing front, back, and sides of net assembly 1120. Signals to four actuators coupled to upright frame members 1122*a-d* may be synchronized (or a common signal may be sent) so that all upright frame members close together in response to capture of a target drone and thereby cause upright frame members to articulate inwards.

Figure 11I:
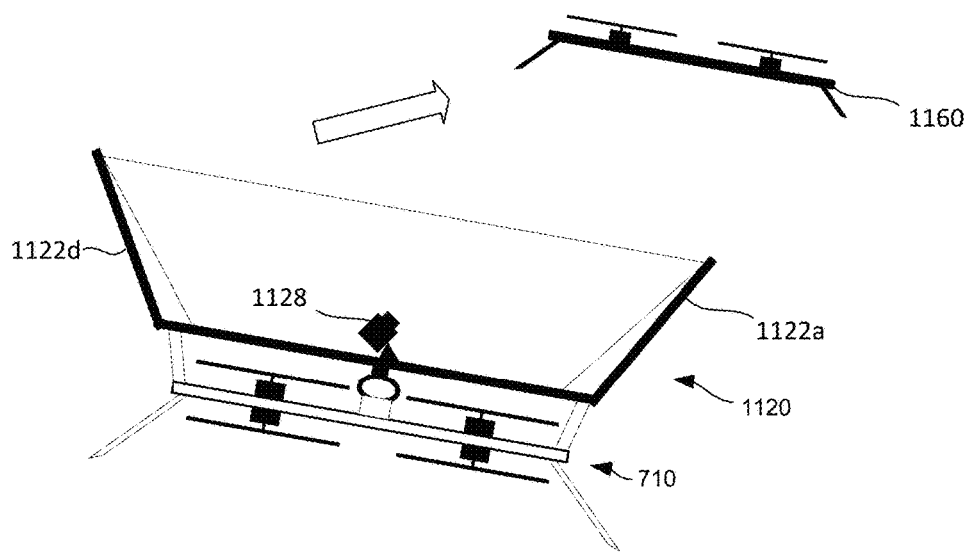
Figure 11J:
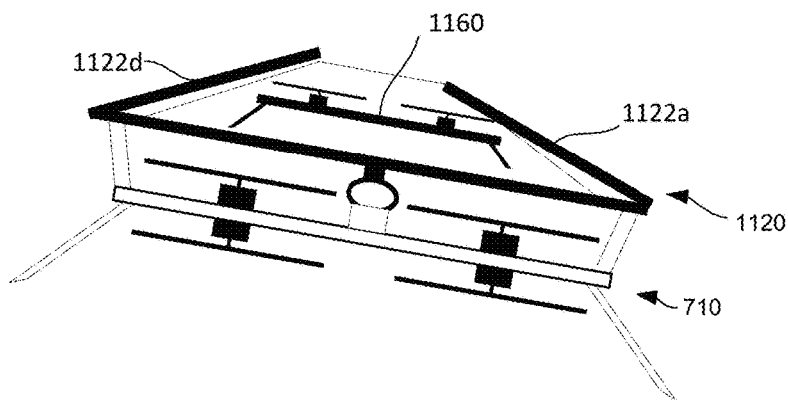

FIGS. 11I-J illustrate an example of capture of a target drone 1160 by UAV 710 configured with net assembly 1120 (configured as a C-UAV). FIG. 11I shows UAV 710 flying towards target drone 1160 so that it approaches target drone 1160 from below. Thus, the opening at the top of net assembly 1120 faces target drone 1160. For example, camera 1128 may be used to pilot UAV 710 to align net assembly 1120 with target drone 1160 during approach (e.g. provided to a user or CV circuits). Net assembly 1120 is in the open position with upright frame members 1122*a*, 1122*d* extending outward and providing a large opening at the top of net assembly 1120 (e.g. held at this angle by electromechanical actuators).

FIG. 11J shows UAV 710 and net assembly 1120 after interception of target drone 1160. When camera 1128 and/or other cameras, strain gauges, sensors detect that target drone 1160 is intercepted (e.g. the presence of the target drone is detected within the net assembly) net assembly 1120 collapses to the closed position shown in FIG. 11J by rotating upright frame members 1122*a*, 1122*d* (and other upright frame members) inwards to narrow the opening formed and enclose target drone 1160 within the enclosure formed by the bottom, front, back, and side portions of net assembly 1120. Entanglement of propellers of target drone 1160 may occur before or during inward rotation of upright frame members, which draws netting of front, back, and side portions inwards towards the propellers of target drone 1160. With target drone 1160 captured in net assembly 1120 in this way, UAV 710 may fly to ground and net assembly 1120 may be removed (using a quick release mechanism) with target drone 1160 inside.

Figure 12:
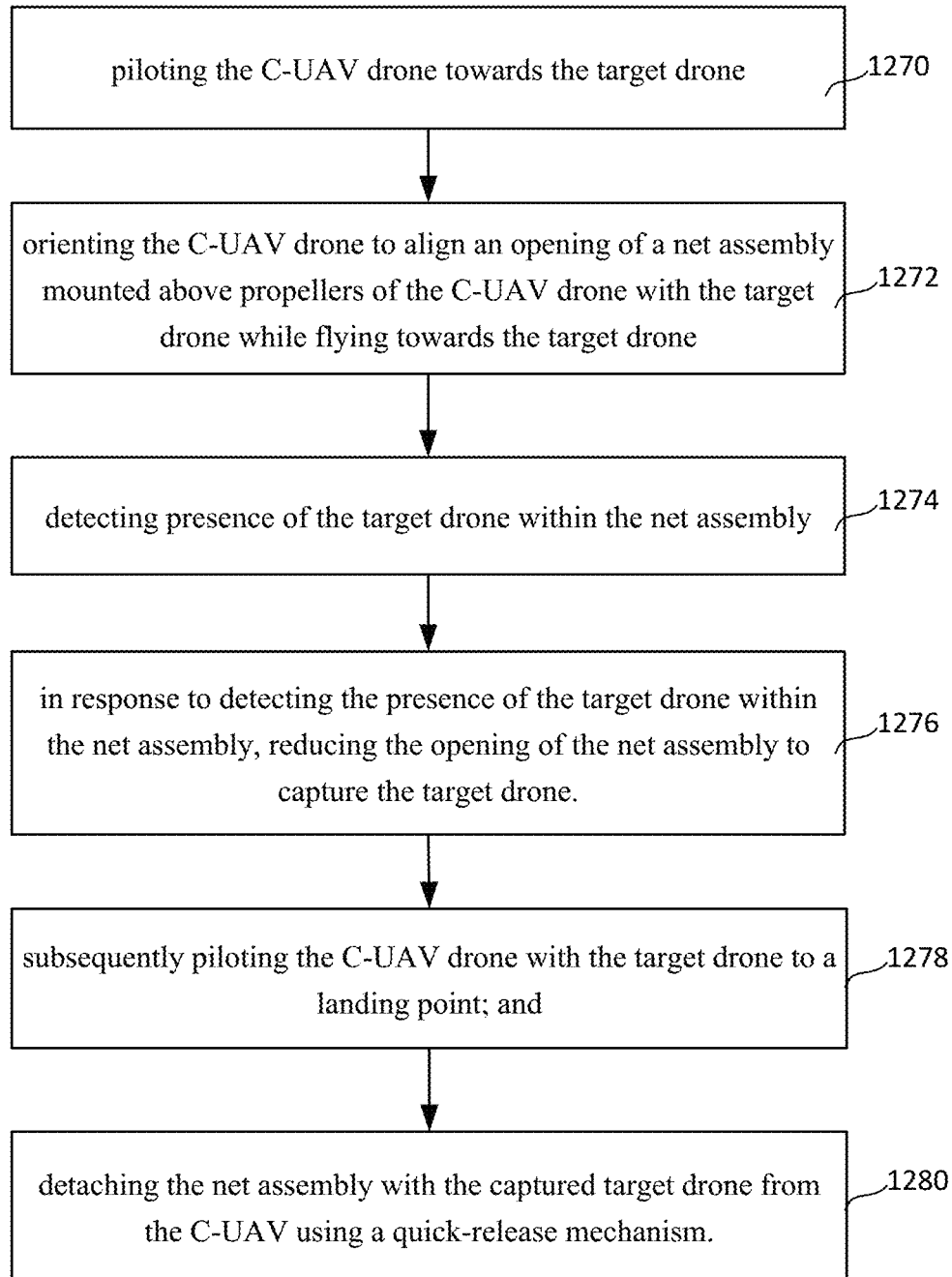
FIG. 12 illustrates a method of operating a C-UAV with a collapsible net assembly.

FIG. 12 illustrates a method of intercepting a target drone with a C-UAV drone (e.g. UAV 710 configured with net assembly 1120). The method includes piloting the C-UAV drone towards the target drone 1270 and orienting the C-UAV drone to align an opening of a net assembly mounted above propellers of the C-UAV drone with the target drone while flying towards the target drone 1272. The method further includes detecting presence of the target drone within the net assembly 1274 (e.g. using output of one or more of a camera, a strain gauge, a sensor or other device attached to net assembly 1120) and in response to detecting the presence of the target drone within the net assembly, reducing the opening of the net assembly to capture the target drone 1276 (e.g. by providing signals to actuators to cause upright frame members to rotate inwards). The method additionally includes subsequently piloting the C-UAV drone with the target drone to a landing point 1278 and detaching the net assembly with the captured target drone from the C-UAV using a quick-release mechanism 1280.

Figure 13:
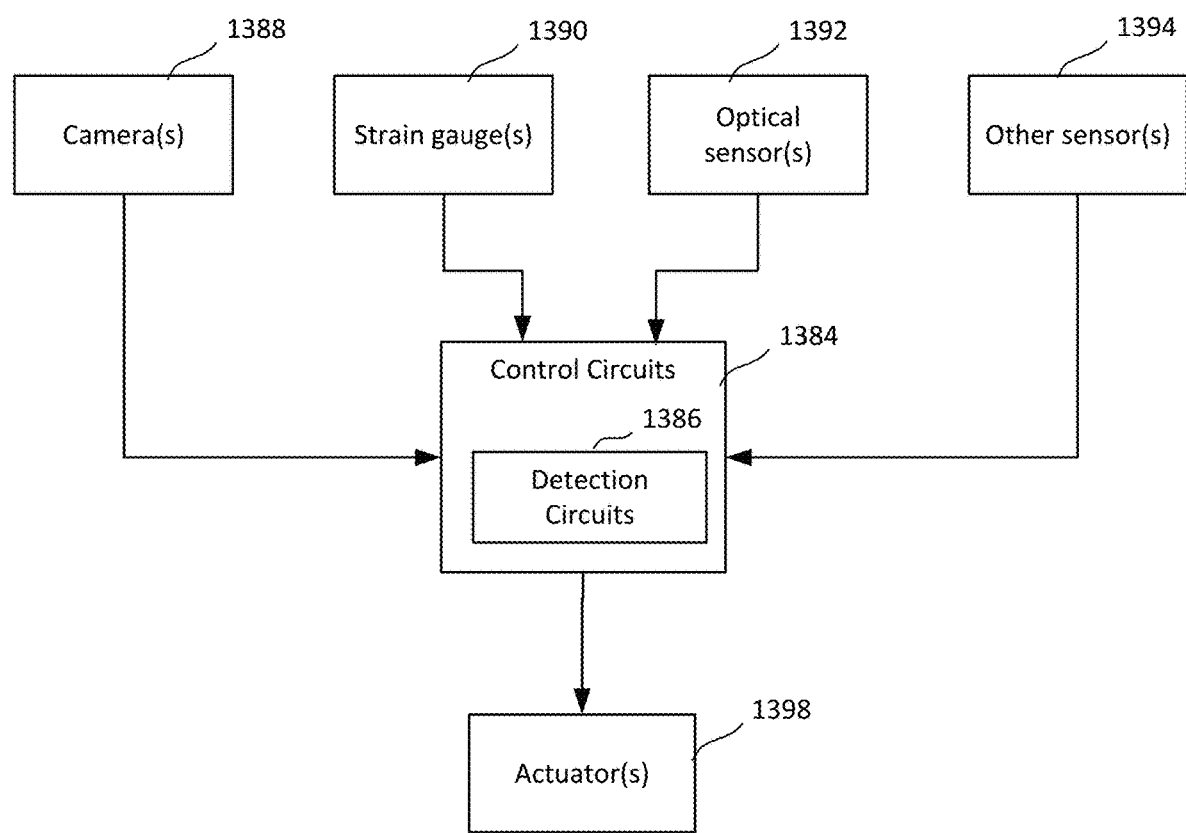
FIG. 13 illustrates an example of components that may be used to intercept a target drone in a net assembly with moving parts.

FIG. 13 illustrates an example of certain components that may be used in one or more methods above. In some cases (e.g. in examples shown in FIGS. 8A-E, 9A-H, and 11A-J) one or more component may be moved by an actuator in response to detection of a target drone (e.g. detection of collision with a target drone, imminent collision, presence of a target drone within or partially within a target drone). FIG. 13 illustrates control circuits 1384 that include detection circuits 1386, which are configured to detect such a triggering event. Detection circuits 1386 may be formed by dedicated circuits or may be formed by circuits that are configured by firmware or software to perform certain functions. For example, detection circuits may be formed in a flight controller (e.g. flight controller 211) in an AI controller (e.g. AI controller 330) or some other controller in a UAV. Detection circuits 1386 receive signals from one or more cameras 1388, one or more strain gauges 1390, one or more optical sensors 1392, and one or more other sensors (e.g. acoustic sensors, radar, lidar) 1394, which may be attached to a net assembly and/or UAV. Detection circuits 1386 use one or more of these signals to determine when a target drone is intercepted. When this determination is positive (interception is determined to have occurred) one or more actuators 1398 are triggered (e.g. when they receive a predetermined input, they change to from the extended position to the retracted position).

While this example shows cameras, strain gauges, optical sensors, and other sensors, it will be understood that these are for illustration and fewer components may be used (e.g. a single camera, strain gauge, optical or other sensor may be sufficient in some cases). Implementation can use any combination of one or more of these components. Detection circuits 1386 may combine these signals in various ways so that false-positive results are avoided. For example, a camera signal indicating interception may be confirmed by a strain gauge and detection may require both. Strain gauge readings may be averaged or otherwise combined so that one outlier reading does not trigger actuation. Similar combination may be applied to optical and other sensor signals. When detection circuits 1386 determine that interception has occurred, a signal is sent to actuator(s) 1398 to cause movement of the actuator(s) to thereby move one or more component of a net assembly (e.g. closing of latch 806, rotation of net assembly 932, or closing of net assembly 1120).

An example of a drone includes: a drone chassis; a plurality of motors attached to the drone chassis; a plurality of propellers coupled to the plurality of motors, the plurality of propellers extending above the drone chassis; and a net assembly mounted to the drone chassis, the net assembly extending above the plurality of propellers, the net assembly including a bottom portion and a plurality of upright frame members that are mounted to the bottom portion by a plurality of articulating joints.

The bottom portion may be substantially square, the plurality of upright frame members may include an upright frame member mounted at each corner of the bottom portion, a front portion of the net assembly extending between a first upright frame member and a second upright frame member, a first side portion extending between the second upright frame member and a third upright frame member, a back portion extending between the third upright frame member and a fourth upright frame member, and a second side portion extending between the fourth upright frame member and the first upright frame member. The drone may include elastic components attached to the plurality of upright frame members to move the plurality of upright frame members from an open position that maintains an opening between upper edges of the front portion, first side portion, back portion, and second side portion at a first size to a closed position that reduces the opening to a second size that is less than the first size. The drone may include a plurality of actuating mechanisms configured to maintain the plurality of upright frame members in the open position and in response to a predetermined input cause the plurality of upright frame members to articulate inwards. The drone may include one or more camera or strain gauge, wherein the predetermined input to cause the plurality of upright frame members to articulate inwards is generated in response to outputs from one or more camera or strain gauge. The bottom portion may include netting formed of monofilament nylon strands of a first diameter having a first spacing, the front portion, the first side portion, the back portion, and the second side portion may include netting formed of monofilament nylon strands of a second diameter that is less than the first diameter and have a second spacing that is greater than the first spacing. The drone may include a quick-release mechanism coupling the net assembly to the drone chassis.

The drone may include one or more strain gauges attached to the plurality of articulating joints to measure strain and detect interception of a target drone in the net assembly. The drone may include a dampener coupled between the net assembly and the drone chassis and one or more elastic components coupled between the net assembly and the drone chassis to reduce transmission of vibration from the net assembly to the drone chassis.

An example of a method of intercepting a target drone with a counter-unmanned aerial vehicle (C-UAV) drone includes piloting the C-UAV drone towards the target drone; orienting the C-UAV drone to align an opening of a net assembly mounted above propellers of the C-UAV drone with the target drone while flying towards the target drone; detecting presence of the target drone within the net assembly; and in response to detecting the presence of the target drone within the net assembly, reducing the opening of the net assembly to capture the target drone.

Detecting the presence of the target drone within the net assembly may include receiving output from one or more of a camera, a strain gauge, or a sensor attached to the net assembly. Reducing the opening of the net assembly may include providing signals to a plurality of actuators that are physically connected to upright frame members of the net assembly to cause the upright frame members to rotate inwards towards a central axis of the net assembly. The net assembly may include a bottom portion extending over propellers of the C-UAV drone and a front portion, a back portion, and side portions extending upwards from edges of the bottom portion to form an enclosure and reducing the opening of the net assembly may include inclining the front portion, back portion and side portions inwards to reduce the size of the enclosure.

The method may include subsequently piloting the C-UAV drone with the target drone to a landing point; and detaching the net assembly with the captured target drone from the C-UAV using a quick-release mechanism. The net assembly may include a camera and orienting the C-UAV drone to align the net assembly with the target drone may include using a First-Person View (FPV) provided by the camera.

An example of a Counter-Unmanned Aerial Vehicle (C-UAV) quadcopter includes: a quadcopter chassis; a first motor, a second motor, a third motor, and a fourth motor attached to the quadcopter chassis; a first propeller, a second propeller, a third propeller, and a fourth propeller coupled to the respective first, second, third, and fourth motors above the quadcopter chassis; and a net assembly mounted to the quadcopter chassis, the net assembly extending above the first, second, third, and fourth propellers, the net assembly including: a plurality of articulating upright frame members configured to spread outward in an open position and to collapse inward in a closed position; one or more of a strain gauge, a camera, or a sensor configured to detect presence of a target drone in the net assembly; and one or more actuators configured to cause the plurality of articulating upright frame members to transition from the open position to the closed position in response to detection of the presence of the target drone in the net assembly.

The C-UAV quadcopter may include control circuits configured to receive outputs of the one or more of a strain gauge, a camera, or a sensor and to adjust flying parameters of the C-UAV quadcopter in response to the outputs. The C-UAV quadcopter may include a plurality of elastic components physically connected to the plurality of articulating upright frame members to apply force to the plurality of articulating upright frame members to move the plurality of articulating upright frame members from the open position to the closed position. The C-UAV quadcopter may include a quick-release mechanism coupling the net assembly to the quadcopter chassis. The C-UAV quadcopter may include a dampener coupled between the net assembly and the quadcopter chassis and one or more elastic elements coupled between the net assembly and the quadcopter chassis to reduce transmission of vibration from the net assembly to the quadcopter chassis.

For purposes of this document, it should be noted that while various examples are given with specific combinations of components and specific configurations, in general, components used in one example may also be used in other examples and configurations may be combined. Thus, for example different net assemblies may be combined with a single C-UAV drone. Components from one example or a net assembly above may be combined with components of another example, e.g. a rotation mechanism may be added to any of the net assemblies above and any of the camera, strain gauge, optical sensor or other sensor configurations shown may be used with any of the net assemblies.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. A drone comprising:
a drone chassis extending along a plane;
a plurality of motors attached to the drone chassis;
a plurality of propellers coupled to the plurality of motors; and
a net assembly mounted to the drone chassis, the net assembly including:
a net enclosure that is mounted laterally with respect to the drone chassis and is rotatably mounted such that an outward facing opening of the enclosure is rotatable about an axis of rotation that is parallel to the plane of the drone chassis.

2. The drone of claim 1 further comprising a rotation mechanism configured to rotate the net enclosure with respect to the plane of the drone chassis.

3. The drone of claim 2 wherein the rotation mechanism includes:
a rod extending between arms of the drone chassis, the rod is statically attached to the net enclosure and rotatably attached to the drone chassis; and
a motor coupled to the rod to control rotation of the rod and net enclosure with respect to the drone chassis.

4. The drone of claim 3 wherein the motor is mounted in a central portion of the drone chassis and is coupled to the rod by a belt extending about a wheel that is attached to and concentric with the rod.

5. The drone of claim 1 wherein the enclosure is mounted such that the plane of the drone chassis extends through the enclosure.

6. The drone of claim 1 wherein the outward facing opening of the enclosure is oriented along a primary direction of travel of the drone.

7. The drone of claim 1 wherein the enclosure includes:
a central portion that extends parallel to the axis of rotation between a first end and a second end and is substantially crescent shaped in cross section along a plane perpendicular to the axis of rotation; and
first and second wing portions that extend outward from the first end and the second end of the central portion at an oblique angle to the central portion.

8. The drone of claim 7 wherein the central portion and the first and second wing portions include a frame and enclosure netting attached to the frame.

9. The drone of claim 8 wherein the net assembly further comprises an entanglement net attached to the first and second wing portions, the entanglement net extending across the outward facing opening.

10. The drone of claim 8 wherein the enclosure netting is formed of strands of monofilament nylon having a first spacing and first tension and the entanglement net is formed of strands of monofilament nylon having a second spacing that is greater than the first spacing and second tension that is less than the first tension.

11. A method of intercepting a target drone with a counter-unmanned aerial vehicle (C-UAV) drone comprising:
piloting the C-UAV drone with a net assembly towards the target drone, the net assembly having an opening along a primary direction of travel of the C-UAV;
rotating the net assembly with respect to the C-UAV drone to align the net assembly with the target drone while the C-UAV is flying towards the target drone; and
intercepting the target drone with the net assembly by aligning the opening with the target drone while the C-UAV is flying such that the target drone enters the opening.

12. The method of claim 11 wherein, when the C-UAV is flying towards the target drone it has negative pitch and rotating the net assembly at least partially counteracts the negative pitch of the C-UAV.

13. The method of claim 11 wherein the net assembly further includes an entanglement net extending across the opening and intercepting the target drone includes entangling the target drone in the entanglement net.

14. The method of claim 11 wherein the C-UAV includes a chassis extending along a plane and rotating the net assembly with respect to the C-UAV includes using a motor attached to the chassis to rotate the net assembly about an axis of rotation that extends parallel to the plane.

15. The method of claim 11 further comprising:
   detecting interception of the target drone by one or more of a strain gauge, a camera, or an optical sensor;
   determining information regarding the target drone from signals from the one or more of a strain gauge, a camera, or an optical sensor; and
   modifying flying parameters of the C-UAV drone according to the information regarding the target drone.

16. A Counter-Unmanned Aerial Vehicle (C-UAV) quadcopter comprising:
   a quadcopter chassis extending along a plane, the quadcopter chassis having a first arm, a second arm, a third arm, and a fourth arm forming an X-shape in cross section along the plane;
   a first motor, a second motor, a third motor, and a fourth motor respectively attached to the first, second, third, and fourth arms of the quadcopter chassis;
   a first propeller, a second propeller, a third propeller, and a fourth propeller coupled to the respective first, second, third, and fourth motors;
   a net assembly rotatably attached to ends of the first and second arms of the quadcopter chassis; and
   a motor attached to the quadcopter chassis, the motor coupled to the net assembly to rotate the net assembly with respect to the plane of the quadcopter chassis.

17. The C-UAV quadcopter of claim 16 wherein the net assembly includes:
   a central portion that extends parallel to an axis of rotation of the net assembly between a first end and a second end and is substantially crescent shaped in cross section along a plane perpendicular to the axis of rotation;
   first and second wing portions that extend outward from the first and second ends of the central portion at an oblique angle to the central portion; and
   an entanglement net attached to the first and second wing portions, the entanglement net extending parallel to the central portion and in front of the central portion along a primary direction of travel of the C-UAV.

18. The C-UAV quadcopter of claim 16 further comprising:
   one or more strain gauges or optical sensors attached to components of the net assembly to detect presence of a target drone in the net assembly;
   one or more cameras mounted to the net assembly for First Person View (FPV) operation of the C-UAV for intercepting the target drone; and
   control circuits configured to receive outputs of the one or more strain gauges or optical sensors and outputs of the one or more cameras and to adjust flying parameters of the C-UAV quadcopter in response to the outputs.

19. The C-UAV quadcopter of claim 18 wherein the control circuits are further configured to determine pitch of the C-UAV and control the motor to rotate the net assembly to counteract the pitch such that the net assembly is substantially aligned for interception of a target drone.

\* \* \* \* \*